(12) United States Patent
Moon et al.

(10) Patent No.: US 12,089,038 B2
(45) Date of Patent: Sep. 10, 2024

(54) METHOD AND APPARATUS FOR PERFORMING AUTHORIZATION FOR UNMANNED AERIAL SYSTEM SERVICE IN WIRELESS COMMUNICATION SYSTEM

(71) Applicant: Samsung Electronics Co., Ltd., Suwon-si (KR)

(72) Inventors: Sangjun Moon, Suwon-si (KR); Jungshin Park, Suwon-si (KR); Yoonseon Han, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 961 days.

(21) Appl. No.: 17/035,633

(22) Filed: Sep. 28, 2020

(65) Prior Publication Data
US 2021/0099870 A1    Apr. 1, 2021

(30) Foreign Application Priority Data

Sep. 30, 2019    (KR) .................. 10-2019-0121211

(51) Int. Cl.
| | |
|---|---|
| *H04W 12/06* | (2021.01) |
| *B64C 39/02* | (2023.01) |
| *H04W 8/08* | (2009.01) |
| *H04W 48/16* | (2009.01) |
| *H04W 60/00* | (2009.01) |

(52) U.S. Cl.
CPC ........... *H04W 12/06* (2013.01); *B64C 39/024* (2013.01); *H04W 8/08* (2013.01); *H04W 48/16* (2013.01); *H04W 60/00* (2013.01)

(58) Field of Classification Search
CPC ....... H04W 12/06; H04W 8/08; H04W 48/16; H04W 60/00; B64C 39/024
See application file for complete search history.

(56) References Cited

U.S. PATENT DOCUMENTS

| | | |
|---|---|---|
| 9,955,349 B1 | 4/2018 | McClintock et al. |
| 2015/0370533 A1 | 12/2015 | Johnson |
| (Continued) | | |

FOREIGN PATENT DOCUMENTS

| | | |
|---|---|---|
| EP | 3 494 718 A1 | 6/2019 |
| WO | 2019/079286 A1 | 4/2019 |

OTHER PUBLICATIONS

"3rd Generation Partnership Project; Technical Specification Group Services and System Aspects; Enhancement for Unmanned Aerial Vehicles; Stage 1 (Release 17)", 3GPP TR 22.829 V17.1.0 (Sep. 2009), 47 pages.

(Continued)

*Primary Examiner* — Paul E Callahan

(57) ABSTRACT

Disclosed are a communication scheme and a system thereof for converging IoT technology and a 5G communication system for supporting a high data transmission rate beyond that of a 4G system. The disclosure can be applied to intelligent services (for example, services related to a smart home, smart building, smart city, smart car, connected car, health care, digital education, retail business, security, and safety) based on the 5G communication technology and the IoT-related technology. Disclosed is a method of performing authorization related to an unmanned aerial system (UAS) service in a wireless communication system.

12 Claims, 31 Drawing Sheets

(56) References Cited

U.S. PATENT DOCUMENTS

| | | | |
|---|---|---|---|
| 2018/0324662 A1 | 11/2018 | Phuyal et al. | |
| 2019/0077506 A1 | 3/2019 | Shaw et al. | |
| 2020/0077327 A1* | 3/2020 | Duan | H04W 76/11 |
| 2020/0250993 A1 | 8/2020 | Li et al. | |
| 2020/0336901 A1* | 10/2020 | Zhu | H04W 12/37 |
| 2022/0369363 A1* | 11/2022 | Ferdi | B64C 39/024 |

OTHER PUBLICATIONS

International Search Report dated Dec. 15, 2020 in connection with International Patent Application No. PCT/KR2020/012480, 3 pages.
"3rd Generation Partnership Project; Technical Specification Group Services and System Aspects; Remote Identification of Unmanned Aerial Systems; Stage 1 (Release 16)", 3GPP TR 22.825 V16.0.0 (Sep. 2018), 22 pages.
Yaliniz et al., "Is 5G Ready for Drones: A Look Into Contemporary and Prospective Wireless Networks From A Standardization Perspective", IEE Wireless Communication, Feb. 2019, 10 pages.
"3rd Generation Partnership Project; Technical Specification Group Services and System Aspects; Unmanned Aerial System (UAS) support in 3GPP; Stage 1; Release 16", 3GPP TS 22.125 V16.3.0 (Sep. 2019), 10 pages.
Supplementary European Search Report dated Jul. 8, 2022 in connection with European Patent Application No. 20 87 2430, 11 pages.

\* cited by examiner

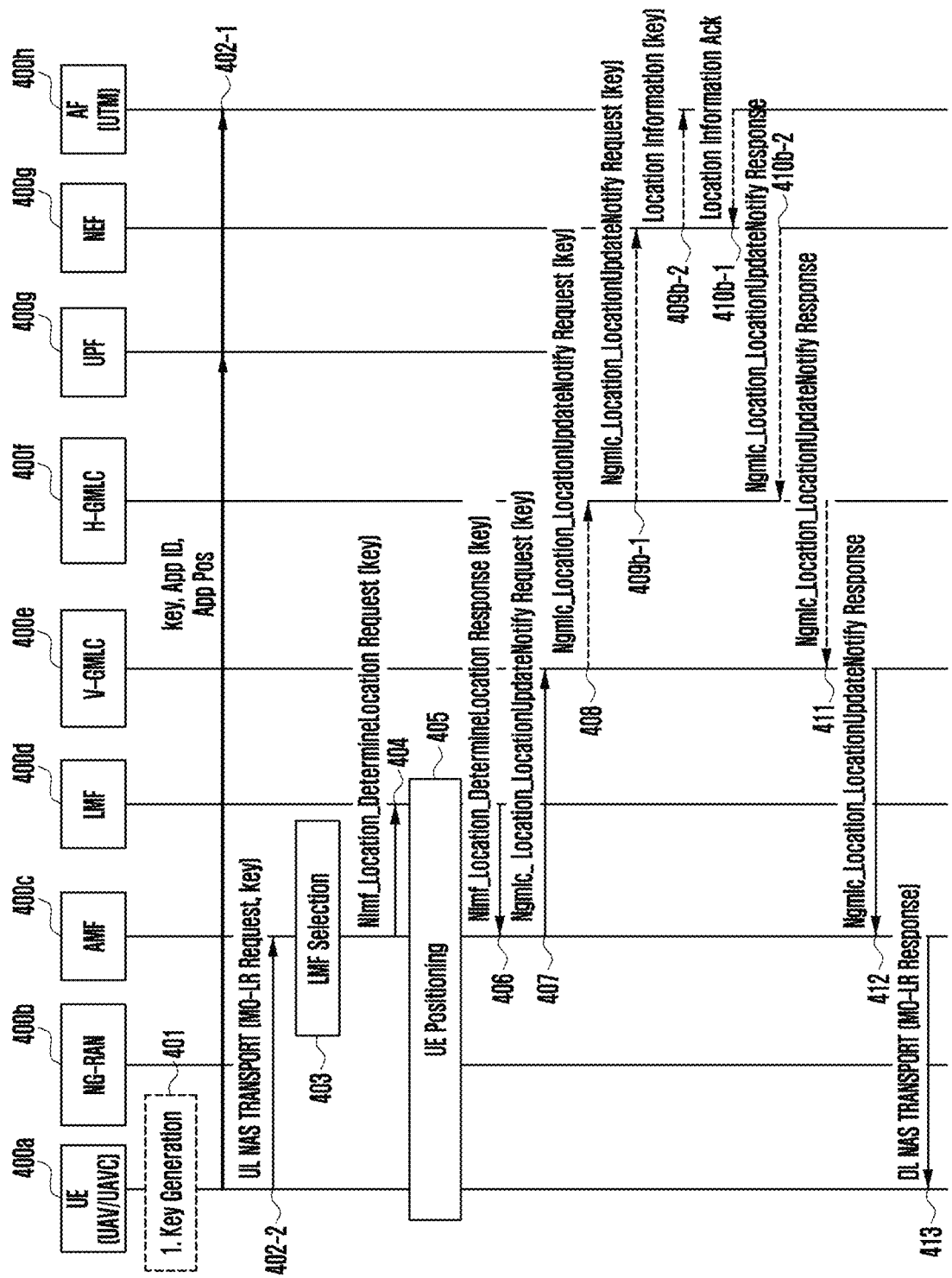

The initial network access authentication and authorization

◄──► : DATA / Control traffic

───── : UAS-network traffic

METHOD AND APPARATUS FOR PERFORMING AUTHORIZATION FOR UNMANNED AERIAL SYSTEM SERVICE IN WIRELESS COMMUNICATION SYSTEM

CROSS-REFERENCE TO RELATED APPLICATION

This application is based on and claims priority under 35 U.S.C. § 119 to Korean Patent Application No. 10-2019-0121211 filed on Sep. 30, 2019 in the Korean Intellectual Property Office, the disclosure of which is herein incorporated by reference in its entirety.

BACKGROUND

1. Field

An unmanned aerial system (UAS) refers to a combination of an unmanned aerial vehicle (UAV) and a UAV controller (UAVC). A network device performing a UAS traffic management (UTM) function provides UAS identification, UAS tracking, and authorization, enforcement, and regulation of UAS operation and stores information required for UAS operation.

The disclosure relates to a wireless communication network, and more particularly to provision of communication between a UAV and a UAVC and between a UAS and UTM through a 3GPP network (5GS or 5G system).

2. Description of Related Art

In order to meet wireless data traffic demands, which have increased since commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in a mmWave band (for example, a 60 GHz band) is being considered. In the 5G communication system, technologies such as beamforming, massive MIMO, Full-Dimensional MIMO (FD-MIMO), array antennas, analog beamforming, and large-scale antennas are under discussion with the goal of mitigating a propagation path loss in the mmWave band and increasing a propagation transmission distance. Further, the 5G communication system has developed technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi-carrier (FBMC), non-orthogonal multiple access (NOMA), and sparse code multiple access (SCMA).

Meanwhile, the Internet has evolved from a human-oriented connection network, in which humans generate and consume information, into the Internet of things (IoT), in which distributed components such as objects exchange and process information. Internet-of-Everything (IoE) technology, in which big-data processing technology is combined with IoT technology through connection with a cloud server or the like, has emerged. In order to implement the IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create new value in peoples' lives may be provided. The IoT may be applied to fields such as those of a smart home, a smart building, a smart city, a smart car, a connected car, a smart grid, health care, a smart home appliance, or high-tech medical services through the convergence of conventional information technology (IT) and various industries.

Accordingly, various attempts to apply 5G communication to IoT networks are being made. For example, 5G communication technologies such as a sensor network, machine-to-machine (M2M) communication, and machine-type communication (MTC) are implemented using beamforming, MIMO, and array-antenna schemes. The application of a cloud RAN as big-data processing technology is an example of convergence of 5G technology and IoT technology.

The above information is presented as background information only to assist with an understanding of the disclosure. No determination has been made, and no assertion is made, as to whether any of the above might be applicable as prior art with regard to the disclosure.

SUMMARY

A method of effectively transmitting UAS information of a UAV or a UAVC to UTM for verifying application-level information as network-level information is provided.

In a wireless communication system according to various embodiments, a method by which a UE (UAV/UAVC) transmits application-level information through a control plane (CP) and a network transmits 3GPP network-level information through a control plane (CP) simultaneously (simultaneous delivery) or continuously (concatenated delivery) is provided.

In a wireless communication system according to various embodiments, a method by which a UAV transmits application-level information through a user plane (UP) and a network transmits 3GPP network-level information through a control plane (CP) simultaneously or continuously using a common key between the UE (UAV) and the network is provided.

According to an embodiment of the present disclosure, a method of an authorization for an unmanned aerial system (UAS) service performed by an access and mobility management function (AMF) entity in a wireless communication system comprises performing an authentication for a terminal based on a registration procedure of the terminal for a network; determining whether an authentication for the UAS service is required to the terminal based on a subscription information of the terminal and in case that the authentication for the UAS service is required to the terminal, providing a service level identity and a network level identity of the terminal to a server for managing the UAS service.

According to an embodiment of the present disclosure, a method of an authorization for an unmanned aerial system (UAS) service performed by a session management function (SMF) entity in a wireless communication system comprises receives, from an access and mobility management function (AMF) entity, a first request for a flight authorization of a terminal authenticated for the UAS service and transmitting, to a server for managing the UAS service, a second request for the flight authorization of the terminal, the second request including a service level identity, a network level identity and location information of the terminal.

According to an embodiment of the present disclosure, an access and mobility management function (AMF) entity for an authorization for an unmanned aerial system (UAS) service in a wireless communication system comprises a transceiver, and a controller coupled with the transceiver and configured to control to: perform an authentication for a terminal based on a registration procedure of the terminal for a network, determine whether an authentication for the UAS service is required to the terminal based on a subscription information of the terminal, and in case that the authentication for the UAS service is required to the terminal, provide a service level identity and a network level identity of the terminal to a server for managing the UAS service.

According to an embodiment of the present disclosure, a session management function (SMF) entity for an authorization for an unmanned aerial system (UAS) service in a wireless communication system comprises a transceiver and a controller coupled with the transceiver and configured to control to receive, from an access and mobility management function (AMF) entity, a first request for a flight authorization of a terminal authenticated for the UAS service, and transmit, to a server for managing the UAS service, a second request for the flight authorization of the terminal, the second request including a service level identity, a network level identity and location information of the terminal.

Through the disclosure, it is possible to simplify a process of transmitting information related to a UAS and reduce a delay time between the information related to the UAS and information transmitted from a network, and thus a network device performing UTM can reduce a delay time for verifying the information related to the UAS on the basis of the information transmitted from the network.

In verification of location information, a decrease in a delay time between information results in an increase in accuracy, and accordingly, the UTM may more precisely manage the location of a UAV Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a process in which the UE transmits application-level information through a user plane (UP) and 3GPP network-level information through a CP using a generated common key according to various embodiments;

DETAILED DESCRIPTION

Figure 1A:
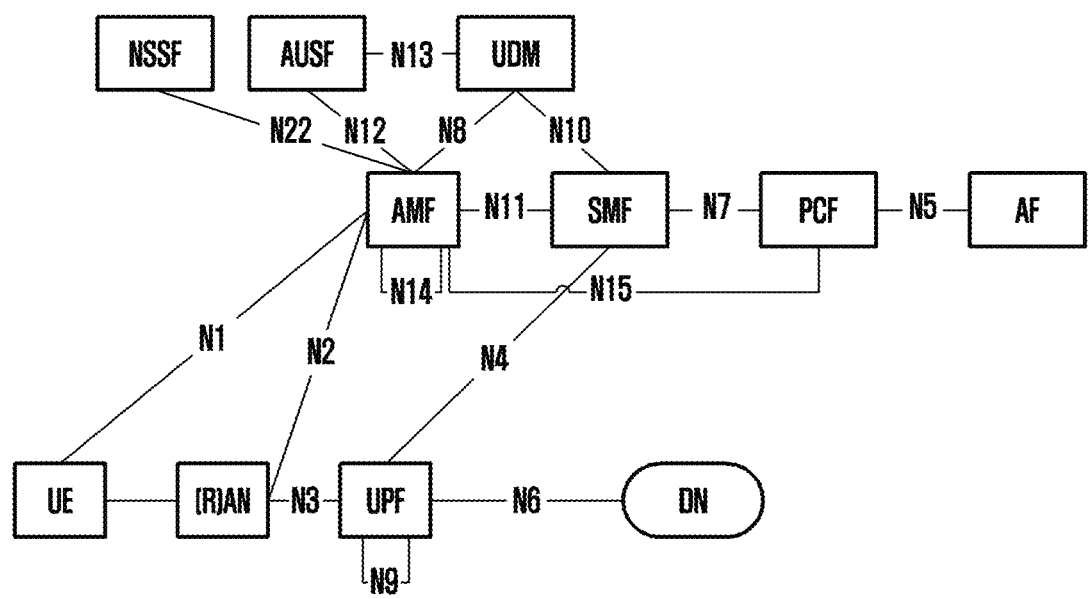
FIG. 1A illustrates the 5G system architecture.

FIGS. 1A through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Advantages and features of the disclosure and methods of achieving the same will become clear with reference to the accompanying drawings and embodiments described below in detail. However, the disclosure is not limited to the following embodiments, and may be implemented in various different forms, and the embodiments are provided to make the disclosure complete and to completely inform those skilled in the art of the scope of the disclosure, and the disclosure is defined only by the scope of the claims. Through the specification, the same reference numeral refers to the same element.

It will be understood that each block of the flowchart illustrations and combinations of the flowchart illustrations can be implemented by computer program instructions. These computer program instructions may be loaded onto a general-purpose computer, special-purpose computer, or processor of other programmable data-processing apparatuses, such that the instructions which execute on the computer or the processor of other programmable data-processing apparatuses create a means for implementing the functions specified in the flowchart block(s). These computer program instructions may also be stored in a computer-readable memory that can direct a computer or other programmable data-processing apparatus to function in a particular manner such that the instructions stored in the computer-available or computer-readable memory produce an article of manufacture including, instructions for implementing the function specified in the flowchart block(s). The computer program instructions may also be loaded onto a computer or other programmable data-processing apparatus to cause a series of operational steps to be performed on the computer or other programmable data-processing apparatus to produce a computer-implemented process such that the instructions executed on the computer or other programmable data-processing apparatus provide steps for implementing the functions specified in the flowchart block(s).

In this regard, each block may represent a nodule, segment, or portion of code, which includes one or more executable instructions for implementing the specified logical function(s). It should also be noted that, in some alternative implementations, the functions noted in the blocks may occur out of the order. For example, two blocks shown in succession may, in fact, be executed substantially concurrently, or the blocks may sometimes be executed in the reverse order, depending upon the functionality involved.

The term "unit" used in the embodiments refers to a software or hardware component such as a field-programmable gate array (FPGA) or an application-specific integrated circuit (ASIC), and the "unit" may play roles. However, a "unit" is not limited to software or hardware. A "unit" may be configured to be present in an addressable storage medium, and may also be configured to run on one or more processors. Accordingly, for example, the "unit" includes software components, object-oriented software components, components such as class components and task components, processors, functions, attributes, procedures, subroutines, segments of program code, drivers, firmware, microcode, circuits, data, databases, data structures, tables, arrays, and parameters. Components and functions provided in the "unit" may be combined into a smaller number of components and "units" or divided into a larger number of components and "units". In addition, components and "units" may be implemented to run on one or more CPUs in a device or secure multimedia card. The "unit" may include one or more processors in embodiments.

Hereinafter, the principle of operation of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be used below are terms defined in consideration of the functions in the disclosure, and may differ according to users, intentions of users, or customs. Therefore, the definitions of the terms should be made based on the contents throughout the specification.

Terms for identifying access nodes in the following description, terms referring to network entities, terms referring to messages, terms referring to interfaces between network entities, and terms referring to various pieces of identification information are used for convenience of description. Therefore, the disclosure is not limited to the terminologies provided below, and other terms that indicate subjects having equivalent technical meanings may be used.

The UE may include a user equipment (UE), a mobile station (MS), a cellular phone, a smart phone, a computer, a multimedia system capable of performing a communication function, or an unmanned aerial vehicle/UAV controller (UAVC). Of course, the disclosure is not limited thereto.

For convenience of description, the disclosure uses terms and names defined in 5GP and NR standards, which are the latest standards among existing communication standards defined by the $3^{rd}$-generation partnership project (3GPP). However, the disclosure is not limited by the terms and names, and may be equally applied to a wireless communication network following another standard. Particularly, the disclosure may be applied to 3GPP 5GS/NR ($5^{th}$-generation mobile communication standard).

Particular terms used in the following description are provided for helping understanding of the disclosure, and the use of particular terms may be changed to other forms without departing from the scope of the technical idea of the disclosure.

First, the terms used in this specification will be defined.

FIG. 1A illustrates the 5G system architecture.

Terms for identifying access nodes in the following description, terms referring to network entities, terms referring to messages, terms referring to interfaces between network entities, and terms referring to various pieces of identification information are used for convenience of description. Therefore, the disclosure is not limited to the terminologies provided below, and other terms that indicate subjects having equivalent technical meanings may be used.

For convenience of description, the disclosure uses terms and names defined in long-term evolution (LTE) and new radio (NR) standards of the $3^{rd}$-generation partnership project (3GPP). However, the disclosure is not limited to the above terms and names, and may be equally applied to a system according to another standard.

In the specification, the base station (BS) is a terminal node of a network directly communicating with the UE. In this document, a particular operation performed by the BS may be performed by an upper node of the BS. That is, it will be apparent that various operations performed for communication with the UE in a network including a plurality of network nodes including the BS may be performed by the BS or by network nodes other than the BS. The "base station (BS)" may also be referred to as a "fixed station", "node B", "evolved node B (eNB)", "base transceiver system (BTS)", or "access point (AP)". The "terminal" may be stationary or portable, and may also be referred to as a "user equipment (UE)", "mobile station (MS)", "user terminal (UT)", "mobile subscriber station (MSS)", "subscriber station (SS)", "advanced mobile station (AMS)", wireless terminal (WT)", "machine-type communication (MTC) device", "machine-to-machine (M2M) device", and "device-to-device (D2D) device".

Hereinafter, a downlink (DL) refers to communication from a BS to a UE, and an uplink (UL) refers to communication from a UE to a BS. In the downlink, a transmitter may be a part of the BS, and a receiver may be a part of the UE. In the uplink, a transmitter may be a part of the UE, and a receiver may be a part of the BS.

Particular terms used in the following description are provided for helping understanding of the disclosure, and the use of particular terms may be changed to other forms without departing from the scope of the technical idea of the disclosure.

Embodiments may be supported by standard documents disclosed in at least one of the wireless access systems IEEE 802, 3GPP, and 3GPP2. That is, in order to clearly show the technical idea of the disclosure, steps or parts that are not described in the embodiments may be supported by the documents. Further, all terms disclosed in this document may be defined as set forth in the standard documents.

In order to make the description clear, the following description is made on the basis of a 3GPP $5^{th}$-generation (5G) system, but the technical features of the disclosure are not limited thereto.

The terms used in this document may be defined as follows.

Evolved packet system (EPS): refers to a network system including an evolved packet core (EPC), which is an Internet protocol (IP)-based packet-switched core network, LTE, and a UTRAN, that is, an evolved network of a universal mobile telecommunications system (UMTS).

eNodeB: refers to a BS of an EPS network, which is installed outdoors, and the coverage of which is a macro cell.

International mobile subscriber identity (IMSI): refers to a user identity internationally and uniquely allocated by a mobile communication network.

Public land mobile network (PLMN): refers to a network configured to provide a mobile communication service to individuals, which may be divided for each operator.

5G system (5GS): refers to a system including a 5G access network (AN), a 5G core network, and a user equipment (UE).

5G access network (5G-AN) (or AN): refers to an access network including a new generation radio access network (NG-RAN) connected to a 5G core network and/or a non-3GPP AN (non-5G access network).

New generation radio access network (NG-RAN) (or RAN): refers to a radio access network having common features of connection to a 5GC and supporting one or more of the following options:

1) Standalone new radio,
2) New radio that is an anchor supporting E-UTRA expansion,
3) Standalone E-UTRA (for example, eNodeB),
4) An anchor supporting new radio expansion.

5G core network (5GC): refers to a core network connected to a 5G access network.

Network function (NF): refers to a processing function adopted by 3GPP or defined by 3GPP within the network, and the processing function includes defined functional behavior and an interface defined in 3GPP.

NF service: refers to a function exposed by the NF through a service-based interface and consumed by other authenticated NF(s).

Network slice: refers to a logical network providing particular network capability(es) and network characteristic(s).

Network slice instance: refers to a set of NF instance(s) configuring a disposed network slice and required resource(s) (for example, calculation, storage, and networking resources).

Protocol data unit (PDU) connectivity service: refers to a service providing exchange of PDU(s) between the UE and the data network.

PDU connectivity service: refers to a service providing exchange of PDU(s) between the UE and the data network.

PDU session: refers to association between the UE and the data network providing a PDU connectivity service, and the association type may be an Internet protocol (IP), Ethernet, or unstructured.

Non-access stratum (NAS): refers to a functional layer for exchanging signaling and traffic messages between the UE and the core network in an EPS and a 5GS protocol stack, which has a main function of supporting mobility of the UE and a session management procedure.

The 5G system is an evolved technology of the $4^{th}$-generation LTE mobile communication technology, and supports extended LTE (eLTE) and non-3GPP (for example, wireless local area network (WLAN)) access as an extended technology of new radio access technology (RAT) and long-term evolution (LTE) through evolution of the conventional mobile communication network structure or cleanstate structure.

The 5G system is defined based on services, and interaction between network functions (NFs) within architecture for the 5G system may be indicated by two types below.

Reference point representation: indicates interaction between NF services within NFs described by point-to-point reference point (for example, N11) between two NFs (for example, AMF and SMF).

Service-based representation: network functions (for example, AMF) within a control plane (CP) allow other authenticated network functions to access services thereof. The representation includes a point-to-point reference point as necessary.

The 5G system architecture to which the disclosure can be applied may be indicated using reference point representation.

The 5G system architecture may include various elements (that is, network functions (NFs), and FIG. 1 illustrates some of the functions corresponding to an authentication server function (AUSF), a (core) access and mobility management function (AMF), a session management function (SMF), a policy control function (PCF), an application function (AF), unified data management (UDM), a data network (DN), a user-plane function (UPF), a (radio) access network ((R)AN), and a user equipment (UE).

The respective NFs support the following functions.

The AUSF stores data for authenticating the UE.

The AMF may provide a function of providing access in units of UEs and managing mobility, and each UE may be basically connected to one AMF.

Specifically, the AMF supports functions such as signaling between CN nodes for movement between 3GPP access networks, termination of a radio access network (RAN) CP interface (that is, an N2 interface), termination of NAS signaling (N1), NAS signaling security (NAS ciphering and integrity protection), AS security control, registration management (registration area management), connection management, idle mode UE reachability (including control and performance of paging retransmission), mobility management control (subscription and policy), support for intra-system mobility and inter-system mobility, support for network slicing, SMF selection, lawful intercept (for an AMF event and interface to an LI system), provision of transmission of a Session Management (SM) message between the UE and the SMF, a transparent proxy for SM message routing, access authentication, access authorization including roaming authority check, provision of transmission of an SMS message between the UE and the SMSF, a Security Anchor Function (SAF), and/or Security Context Management (SCM).

Some or all of the functions of the AMF may be supported within a single instance of one AMF.

The DN is, for example, operator service, Internet access, or $3^{rd}$-party service. The DN transmits a downlink protocol data unit (PDU) to the UPF or receives a PDU transmitted from the UE from the UPF.

The PCF receives information on flow of packets from an application server and provides a function of determining a policy of mobility management and session management. Specifically, the PCF supports a function of supporting a unified policy framework for controlling network operation, providing a policy rule to allow CP function(s) (for example, the AMF, the SMF, and the like) to enforce the policy rule, and implementing a front end for accessing relevant subscription information to determine a policy within a user data repository (UDR).

The SMF may provide a session management function, and respective sessions may be managed by different SMFs if the UE has a plurality of sessions.

Specifically, the SMF supports functions of managing a session (for example, establishing, modifying, and releasing a session including maintenance of a tunnel between the UPF and the AN node), allocating and managing (including selective authentication of) a UE IP address, selecting and controlling a UP function, configuring traffic steering for routing traffic from the UPF to a proper destination, termination of an interface for policy control functions, trying a control part of a policy and quality of service (QoS), lawful intercept (for an SM event and an interface for an LI system), termination of an SM part of a NAS message, downlink data notification, an initiator of AN-specific SM information (transmitting N2 to the AN via the AMF), determining an SSC mode of a session, and roaming.

Some or all of the functions of the SMF may be supported within a single instance of one SMF.

The UDM stores subscription data and policy data of the user. The UDM includes two parts, that is, an application front end (FE) and a user data repository (UDR).

The FE includes a UDM FE that serves to process location management, subscription management, and credentials and a PCF that serves to control a policy. The UDR stores data required for functions provided by the UDM-FE and a policy profile required by the PCF. Data stored in the UDR includes user subscription data and policy data including a subscription ID, security credentials, access- and mobility-related subscription data, and session-related subscription data. The UDM-FD supports functions of accessing subscription information stored in the UDR, processing authentication credentials, handling user identification, authenticating, registering access/managing mobility, managing subscriptions, and managing an SMS.

The UPF transmits a downlink PDU received from the DN to the UE via the (R)AN and transmits an uplink PDU received from the UE to the DN via the (R)AN.

Specifically, the UPF supports functions of an anchor point for intra/inter RAT mobility, an external PDU session point of interconnection to a data network, packet routing and forwarding, a user-plane part of trying packet inspection and policy rule, lawful intercept, reporting an amount of traffic usage, an uplink classifier for supporting routing traffic flow to a data network, a branching point for supporting a multi-homed PDU session, handling QoS for a user plane (for example, packet filtering, gating, uplink/downlink rate), uplink traffic verification (SDF mapping between service data flow (SDF) and QoS flow), marking a transport level packet within uplink and downlink, buffering a downlink packet, and triggering a downlink data notification. Some or all of the functions of the UPF may be supported within a single instance of one UPF.

The AF mutually operates with a 3GPP core network to provide service (for example, supports functions of influencing an application on traffic routing, accessing network capability exposure, and interacting with a policy framework for controlling a policy).

The (R)AN is a new radio access network that supports both evolved UTRA (E-UTRA), which is an evolved version of the 4G radio access technology, and a new radio (NR) access technology (for example, gNB). In the drawings, NR-RAN refers to a radio access network supporting a new radio access (NR) technology.

The gNB supports functions for managing radio resources (that is, radio bearer control, radio admission control, connection mobility control, dynamic allocation of resources to the UE in uplink/downlink (that is, scheduling), compressing an Internet Protocol (IP) header, encrypting a user data stream and performing integrity protection, selecting the AMF in UE attachment when routing to the AMF is not determined on the basis of information provided to the UE, user-plane data routing to UPF(s), control-plane information routing to the AMF, setting and releasing connections, scheduling and transmitting a paging message (generated from the AMF), scheduling and transmitting system broadcast information (generated from operating and maintenance (O&M)), performing measurement for mobility and scheduling and configuring a measurement report, transport-level packet marking in uplink, managing sessions, supporting network slicing, managing QoS flow and performing mapping to a data radio bearer, supporting the UE in an inactive mode, distributing NAS messages, selecting a NAS node, sharing a radio access network, dual connectivity, and tight interworking between NR and E-UTRA.

The UE refers to a user device. The UE may be an unmanned aerial vehicle (UAV)/UAV controller (UAVC), a terminal, a mobile equipment (ME), a mobile station (MS), and the like. Further, the UE may be a portable device such as a notebook, a mobile phone, a personal digital assistant (PDA), a smartphone, or a multimedia device, or may be a device, which cannot be portable such as a personal computer (PC) or a vehicle-mounted device.

In the specification, an unstructured data storage network function (UDSF), a structured data storage network function (SDSF), a network exposure function (NEF), and an NF repository function (NRF) may interact with the UDSF, the NEF, and the NRF as necessary.

The NEF provides, for example, a $3^{rd}$ party, internal exposure/re-exposure, an application function, and means for safely exposing services and capabilities for edge computing, provided by 3GPP network functions. The NEF receives information (based on exposed capability(es) of other network function(s)) from other network function(s). The NEF may store received information as structuralized data through an interface standardized as a data storage network function. The stored information may be re-exposed to other network function(s) and application function(s) by the NEF and may be used for another purpose such as analysis.

The NRF supports a service discovery function. The NRF receives an NF discovery request from an NF instance and provides information on the discovered NF instance to the NF instance. Further, the NRF maintains available NF instances and service supported thereby.

The SDSF is a selective function for supporting a function of storing and retrieving information as data structured by any NEF.

The UDSF is a selective function for supporting a function of storing and retrieving information as data unstructured by an NF.

Meanwhile, the specification illustrates a reference model in the case in which the UE accesses one DN through one PDU session for convenience of description, but the disclosure is not limited thereto.

The UE may simultaneously access two (that is, local and central) data networks through multiple PDU sessions. At this time, two SMFs may be selected for different PDU sessions. However, each SMF may have a capability of controlling both the local UPF and the central UPF within the PDU session.

Further, the UE may simultaneously access two (that is, local and central) data networks within a single PDU session.

In the 3GPP system, a conceptual link connecting NFs within the 5G system is defined as a reference point. Reference points included in the 5G system architecture are listed below.

N1: reference point between UE and AMF

N2: reference point between (R)AN and AMF

N3: reference point between (R)AN and UPF

N4: reference point between SMF and UPF

N5: reference point between PCF and AF

N6: reference point between UPF and data network

N7: reference point between SMF and PCF

N24: reference point between PCF within visited network and PCF within home network N8: reference point between UDM and AMF N9: reference point between two core UPFs N10: reference point between UDM and SMF N11: reference point between AMF and SMF N12: reference point between AMF and AUSF N13: reference point between UDM and authentication server function (AUSF)

N14: reference point between two AMFs

N15: reference point between PCF and AMF in non-roaming scenario and reference point between PCF within visited network and AMF in roaming scenario N16: reference point between two SMFs (reference point between SMF within visited network and SMF within home network in roaming scenario)

N17: reference point between AMF and EIR

N18: reference point between any NF and UDSF

N19: reference point between NEF and SDSF

The wireless communication system according to various embodiments may include 5GS LCS architectures described in section 4.2 architectural reference model of 3GPP TS 23.273.

Figure 1B:
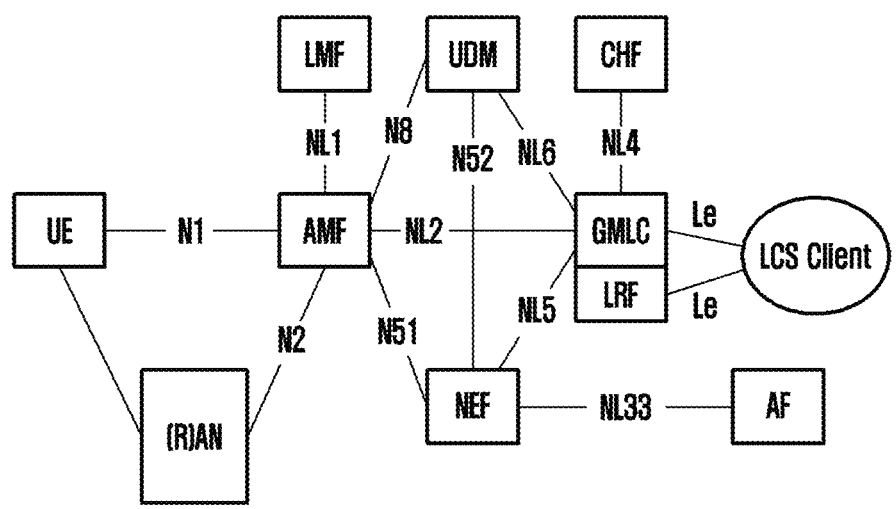
FIG. 1B illustrates the non-roaming reference architecture for location services.
Figure 1C:
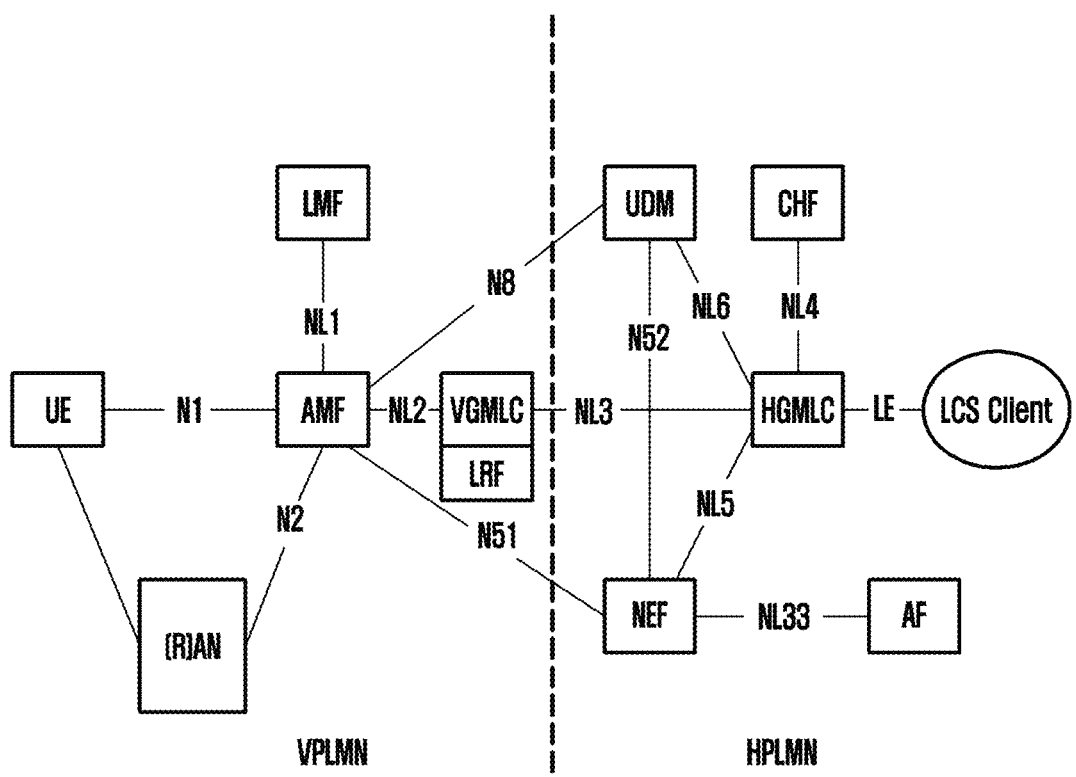
FIG. 1C illustrates the roaming reference architecture for location services.

FIG. 1B illustrates the non-roaming reference architecture for location services, and FIG. 1C illustrates the roaming reference for location services.

The 5G architecture shown in FIGS. 1B and 1C may further include an LMF and a GMLC.

Table 1 shows the GMLC, the LMF, and the AMF, which are NFs shown in FIGS. 1B and 1C.

TABLE 1

4.3.3 Gateway Mobile Location Centre, GMLC
The Gateway Mobile Location Centre (GMLC) contains functionality required to support LCS. In one PLMN, there may be more than one GMLC.
A GMLC is the first node an external LCS client accesses in a PLMN (i.e., the Le reference point is supported by the GMLC). AFs and NFs may access GMLC directly or via NEF. The GMLC may request routing information and/or target UE privacy information from the UDM via the Nudm interface. After performing authorization of an external LCS client or AF and verifying target UE privacy, a GMLC forwards a location request to either a serving AMF using Namf interface or to a GMLC in another PLMN using the Ngmlc interface in the case of a roaming UE.
The target UE's privacy profile settings may always be checked in the UE's home PLMN prior to delivering a location estimate.
The "Visited GMLC" (VGMLC) is the GMLC, which is associated with the serving node of the target UE.
The "Home GMLC" (HGMLC) is the GMLC residing in the target UE's home PLMN, which is responsible for the control of privacy checking of the target UE.
Additional functions which may be performed by a GMLC to support location services include the following.
At an HGMLC, determine the serving AMF for a target UE when there is more than one serving AMF.
At an HGMLC, determine whether to attempt a second location request for a target UE from a different AMF when location information returned by a first AMF does not meet QoS requirements and there is more than one serving AMF.
At an HGMLC, support location requests from an external LCS client or NEF for a 5GC-MT-LR and deferred 5GC-MT-LR for periodic, triggered and UE available location events.
At an HGMLC, forward location requests for a roaming UE to a VGMLC or serving AMF in the VPLMN based on deployment configurations.
At an HGMLC, receive event reports from a VGMLC or LMF for a deferred 5GC-MT-LR for periodic or triggered location and return to an external LCS client or NEF.
At an HGMLC, support cancelation of a periodic or triggered location.
At an HGMLC, receive location information from an VGMLC for a 5GC-MO-LR and forwards to an LCS client or an AF (via NEF) if requested by the UE.
At a VGMLC, receive location requests from an HGMLC for a roaming UE and forward to a serving AMF.
At a VGMLC, receive event reports from an LMF for a deferred 5GC-MT-LR for periodic or triggered location for a roaming UE and forward to an HGMLC.
At a VGMLC, receive location information from an AMF for a 5GC-MO-LR and forwards to an HGMLC.
4.3.7 Access and Mobility Management Function, AMF
The AMF contains functionality responsible for managing positioning for a target UE for all types of location request. The AMF is accessible to the GMLC and NEF via the Namf interface, to the RAN via the N2 reference point, and to the UE via the N1 reference point.
Functions which may be performed by an AMF to support location services include the following.
Initiate an NI-LR location request for a UE with an IMS emergency call.
Receive and manage location requests from a GMLC for a 5GC-MT-LR and deferred 5GC-MT-LR for periodic, triggered and UE available location events.
Receive and manage location requests from a UE for a 5GC-MO-LR.
Receive and manage Event Exposure request for location information from an NEF.
Select an LMF, optionally taking into account UE access type(s), serving AN node, network slicing, QoS, LCS client type, RAN configuration information, LMF capabilities, LMF load. LMF location, indication of either a single event report or multiple event reports, duration of event reporting.
Receive updated privacy requirements from a UE and transfer to a UDR via UDM.
Support cancelation of periodic or triggered location reporting for a target UE.
Support change of a serving LMF for periodic or triggered location reporting for a target UE.
4.3.8 Location Management Function, LMF
The LMF manages the overall co-ordination and scheduling of resources required for the location of a UE that is registered with or accessing 5GCN. It also calculates or verifies a final location and any velocity estimate and may estimate the achieved accuracy. The LMF receives location requests for a target UE from the serving AMF using the Nlmf interface.
The LMF interacts with the UE in order to exchange location information applicable to UE assisted and UE based position methods and interacts with the NG-RAN, N3IWF or TNAN in order to obtain location information.
Additional functions which may be performed by an LMF to support location services include the following.
Support a request for a single location received from a serving AMF for a target UE.

TABLE 1-continued

Support a request for periodic or triggered location received from a serving AMF
for a target UE.
Determine position methods based on UE and PLMN capabilities, QoS and LCS
client type.
Report UE location estimates directly to a GMLC for periodic or triggered location
of a target UE.
Support cancelation of periodic or triggered location for a target UE.
4.5 Service-Based Interfaces to Support Location Services
The 5GSLCS architecture contains the following service-based interfaces for
Location Services:
Nlmf: Service-based interface exhibited by LMF.
Ngmlc: Service-based interface exhibited by GMLC.

The UAS according to various embodiments refers to a combination of the UAV and the UAVC. The UAV is an aircraft without a human pilot on board, and is controlled by a ground-based UAVC and sometimes has a predetermined automatic navigation function.

The 3GPP network may provide communication between the UAV and the UAVC. The 3GPP network provides all of communication between the UAV and the UAVC for command & control (C2) and communication between the UAS and the 3GPP network or a network server for uplink/downlink data.

A network device performing UAS traffic management (UTM) provides identification of the UAS, tracking of the UAS, and authorization, enforcement, and regulation of operation of the UAS. The UTM is used to store data required for the UAS operation.

When receiving a request from an authorized user such as an air traffic control organization or a public-safety-related organization, the network device performing the UTM may provide an ID or metadata of the UAV or the UAVC. For example, the network device performing the UTM may be an example of a network device performing an application function (AF). The AF according to various embodiments mutually operates with a 3GPP core network to provide service (for example, supports functions of influencing an application on traffic routing, accessing network capability exposure, and interacting with a policy framework for controlling a policy).

The network device performing the UTM may directly receive required information from the UAV/UAVC or may receive the corresponding information from the 3GPP network. The information which the UTM directly receives from the 3GPP network is information guaranteed by a network operator and thus is reliable. Accordingly, the network device performing UTM may verify the information received from the UAV/UAVC (hereinafter, referred to as application-level information) on the basis of the information (hereinafter, referred to as network-level information) received from the 3GPP network, thereby identifying whether the information is false.

The application-level information includes the GPS measurement location measured by the UAV or the UAVC, and the 3GPP network-level information includes the cell reference measurement location.

Figure 2A:
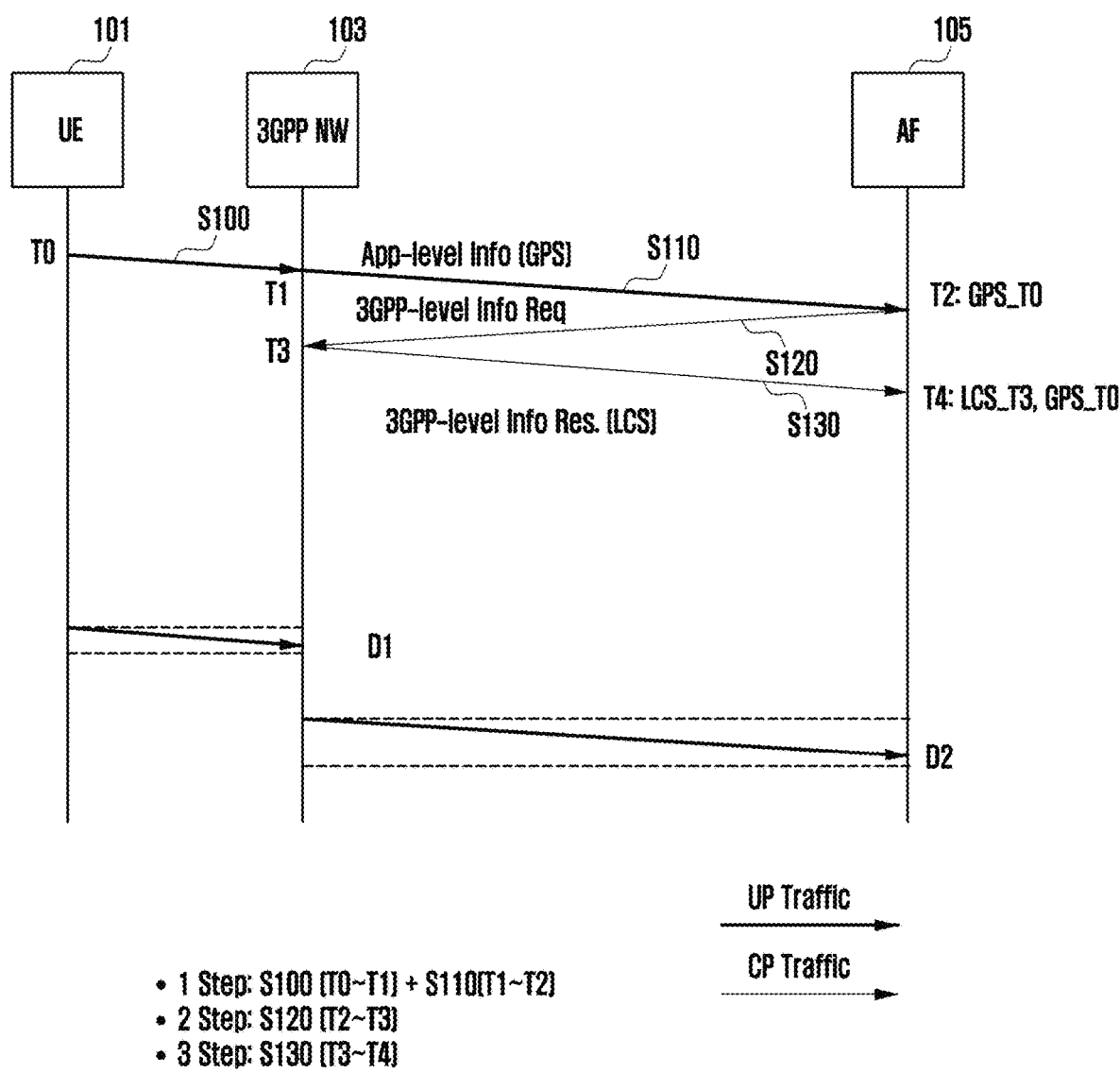
FIG. 2A illustrates the conventional information transmission process.

FIG. 2A illustrates the conventional information transmission process.

As illustrated in FIG. 2A, when a UAV/UAVC (UE) transmits application-level information including GPS-based location information to a network device performing UTM (AF) via a 3GPP network in the conventional UAS in S110, the network device performing UTM makes a request for location information of the UAV/UAVC (UE) to the 3GPP network to check the truth of the application-level information in S120 and receives a response thereto in S130.

In the process, the application-level information is transmitted between the UAV/UAVC and the network device performing UTM through a user plane (UP), and network-level information is transmitted between the 3GPP network and the network device performing UTM through a control plane (CP). At this time, the network device performing UTM receives GPS_T0, which is application-level information based on a time T0, at a time T2, and receives LCS_T3, which is 3GPP network-level information, based on a time T3 at a time T4.

As described above, through the conventional technology illustrated in FIG. 2A, the UAV/UAVC (UE) may transmit the application-level information to the UTM (AF) via the 3GPP network through the UP in step 1 (S100 and S110). For example, the application-level information may include information related to a global positioning system (GPS).

Further, in order to check the accuracy of the application-level information received from the UAV/UAVC (UE), the network device performing UTM (AF) may make a request for 3GPP network-level information to the 3GPP network through the CP in step 2 (S120) and receive the 3GPP network-level information in response thereto in step 3 (S130). For example, the 3GPP network-level information may include information related to a location service (LCS).

That is, the network device performing UTM (AF) is required to perform the 3-step process (steps 1 to 3) illustrated in FIG. 2A in order to verify the application-level information on the basis of the 3GPP network-level information, whereby an information transmission process may be complex and a delay between the application-level information and the 3GPP network-level information received by the network device performing UTM (AF) may be generated.

Figure 2B:
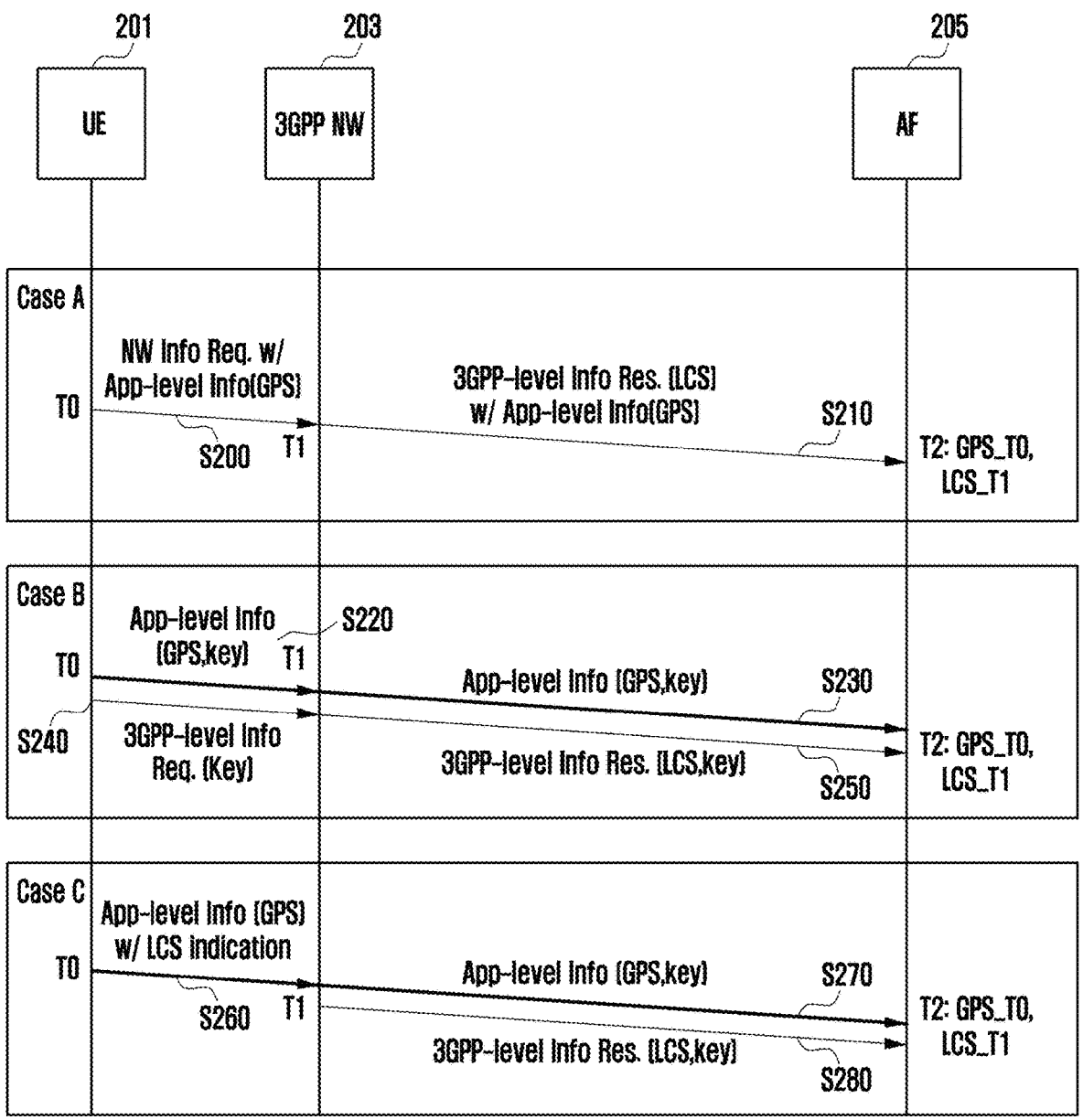
FIG. 2B illustrates an information transmission process according to various embodiments.

FIG. 2B illustrates an information transmission process according to various embodiments.

A method of transmitting and receiving information in a UAS according to various embodiments serves to verify application-level information that the network device performing UTM (AF) receives from the UAV/UAVC (UE) through the network through 3GPP network-level information received from the network, and it is possible to reduce a verification time by simultaneously or continuously receiving the application-level information and the 3GPP network-level information by the UTM.

The method of transmitting and receiving information in the UAS according to various embodiments may include various methods of simultaneously or continuously receiving the application-level information and the 3GPP network-level information through the network by the network device performing UTM.

As illustrated in FIG. 2B, the network device performing UTM may simultaneously acquire GPS_T0, which is application-level information based on a time T0, and LCS_T1, which is 3GPP network-level information based on a time T1, at a time T2.

While the prior art illustrated in FIG. 2A has the 3-step process, the information transmission method according to an embodiment illustrated in FIG. 2B may transmit reliable UAS information through only step 1 without steps 2 and 3, in which the network device performing UTM (AF) makes a request for 3GPP network-level information to the 3GPP network through the CP and receives the 3GPP network-level information in response thereto.

For example, the AF may be an external server or may be a server managed by an operator. This depends on whether a network operator provides a UTM service. In comparison between FIGS. 2A and 2B, the same information may be acquired through only step 1 without steps 2 and 3 of FIG. 2A in FIG. 2B.

That is, the prior art illustrated in FIG. 2A has the 3-step process, but the method according to an embodiment illustrated in FIG. 2B has only the 1-step process, and thus the information transmission process is simpler than the prior art.

According to the prior art illustrated in FIG. 2A, since App-level Info is acquired at the time T2 and 3GPP NW-level Info is acquired at the time T4, the time at which the 3GPP network-level information and the application-level information are finally acquired is the time T4. However, in the information transmission method according to an embodiment illustrated in FIG. 2B, since App-level Info is acquired at the time T2 and NW-level Info is acquired at the time T2, the 3GPP network-level information and the application-level information may be acquired at the time T2, earlier than the time T4.

When the provided technology illustrated in FIG. 2A is used, a reference time difference between the application-level information and the 3GPP network-level information may be reduced. When the prior art illustrated in FIG. 2A is used, the reference time of the application-level information is the time T0 and the reference time of the 3GPP network-level information is the time T3, and thus a reference time difference between two pieces of information is T3−T0 (D1+2*D2). However, when the provided technology illustrated in FIG. 2B is used, the reference time of the application-level information is the time T0 and the reference time of the 3GPP network-level information is the time T1, and thus a reference time difference between the two pieces of information is T1−T0 (1*D1). For example, D1 is a delay between the 3GPP network and the UAS, which is several ms. However, since UTM communicates with a plurality of 3GPP networks, D2 is a delay between the 3GPP network and a server of the network device performing UTM, which is scores to hundreds of ms.

In the case of location information, a reference time difference refers to a difference in the location, and thus the provided method illustrated in FIG. 2B may more precisely verify location information compared to the prior art illustrated in FIG. 2A. When the difference between 3GPP network-level location information (for example, LCS) and application-level location information (for example, GPS) is large, the UAV abuses the same, and the network device performing UTM is highly likely to fly in an area preset as a flight-restricted area.

The information transmission method according to the disclosure may include 3 approaches as illustrated in FIG. 2.

In case 1 illustrated in FIG. 2B, the UE (UAV/UAVC) directly adds application-level information to a CP-based process of transmitting 3GPP network-level information to the network device performing UTM.

For example, a field including application-level information may be added to a NAS message, which is a control-plane higher message.

As illustrated in case 1 of FIG. 2B, the UAV/UAVC (UE) according to various embodiments may transmit a NW info Req that makes a request for 3GPP network-level information along with application-level information to the 3GPP NW through the CP, and the 3GPP NW may simultaneously transmit a 3GPP network-level information Res corresponding to the received NW info Req and the application-level information to the network device performing UTM through the CP.

In case 2 illustrated in FIG. 2B, the key generated by the UE is used by the user plane (UP) and the CP in common, and the application-level information is transmitted to the network device performing the AF through the UP and the 3GPP network-level information is transmitted to the network device performing the AF through the CP, simultaneously or continuously.

FIG. 2B separately illustrates traffic of the UP and the CP to distinguish therebetween, but traffic of the UP and the CP may be simultaneously or continuously transmitted.

As illustrated in case 2 of FIG. 2B, the UAV/UAVC (UE) according to various embodiments may transmit the application-level information through the UP and the 3GPP-level info Req that makes a request for the 3GPP network-level information through the UP to the 3GPP NW by using the generated common key, and the 3GPP network may simultaneously or continuously transmit the application-level information through the UP and the 3GPP network-level information Res corresponding to the 3GPP network-level info Req through the CP to the network device performing UTM using the common key.

In case 3 illustrated in FIG. 2B, the UE modifies to insert the request for the 3GPP network-level information to the process in which the UE transmits the application-level information to the 3GPP network through a cellular Internet of Things (CIoT) 5GS optimization procedure for transmitting user traffic using a non-access stratum (NAS), and the network receiving the message generates a common key, and simultaneously or continuously performs a UP traffic transmission process including the application-level information and a CP traffic transmission process including the 3GPP network-level information.

Case 3 illustrated in FIG. 2B uses a CP optimization procedure of CIoT. A method of transmitting application-level data (UP data) through the CP in order to transmit a small amount of traffic has been defined, and a function of adding an LCS supporting tag/indication to simultaneously or continuously transmit the CP and the UP may be added.

FIG. 2B separately illustrates traffic of the UP and the CP for division therebetween, but traffic of the UP and the CP is simultaneously or continuously transmitted.

As illustrated in case 3 of FIG. 2B, the UAV/UAVC (UE) according to various embodiments may transmit a location service indicator (LCS indicator) along with the application-level information to the 3GPP NW through the CP, and the 3GPP NW may simultaneously or continuously transmit the application-level information through the UP and the 3GPP network-level information Res through the CP to the network device performing UTM by using the generated key.

Figure 3:
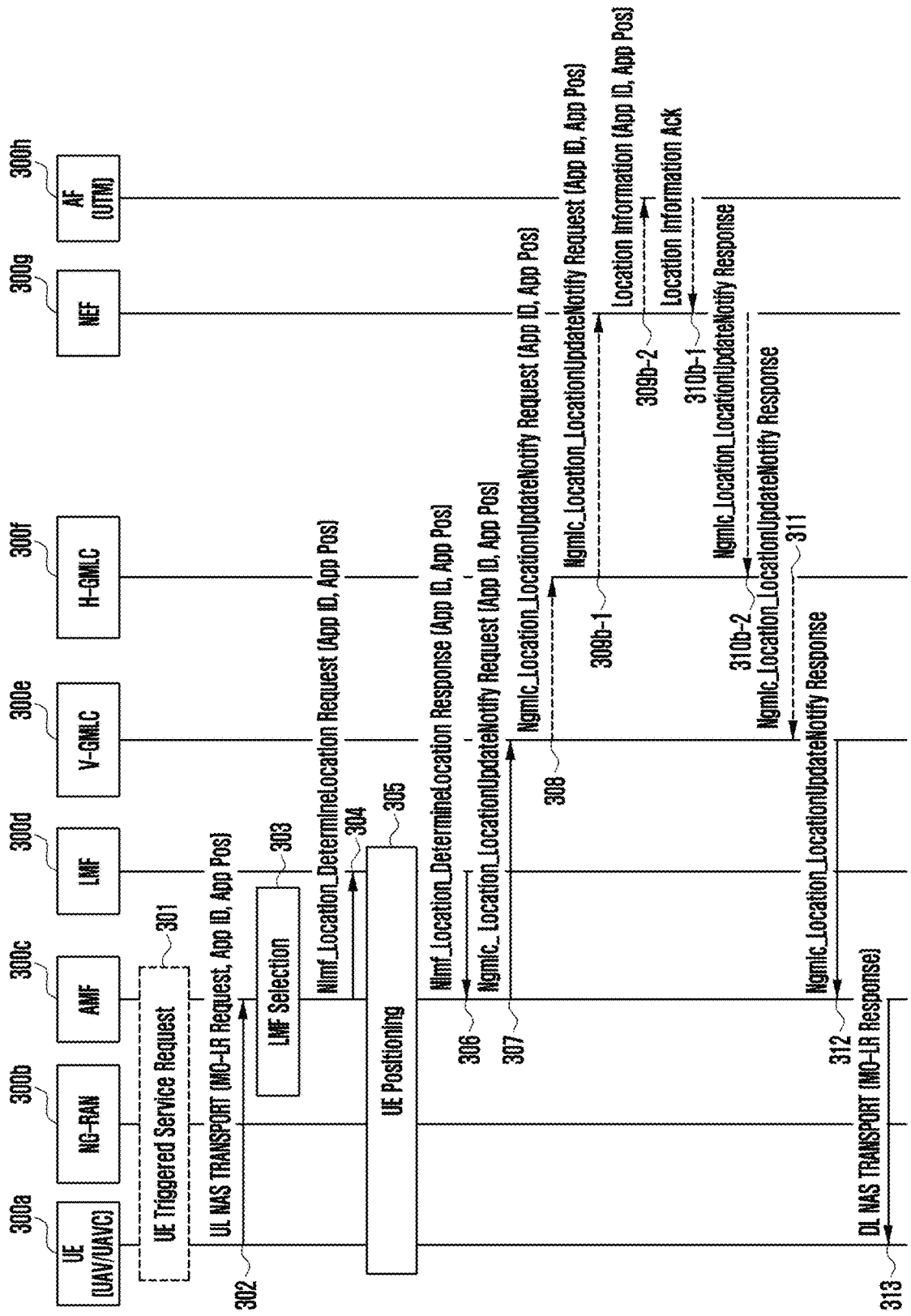
FIG. 3 illustrates a process of transmitting application-level information and 3GPP network-level information through a control plane (CP) according to various embodiments.

FIG. 3 illustrates a process of transmitting application-level information and 3GPP network-level information through a control plane (CP) according to various embodiments.

As illustrated in FIG. 3, a system according to various embodiments may include a UE, an NR-RAN, a network device (hereinafter, referred to as an AMF) performing an AMF, a network device (hereinafter, referred to as an LMF) performing an LMF, a network device (hereinafter, referred to as a V-GMLC) performing a V-GMLC, a network device (hereinafter, referred to as an H-GMLC) performing an H-GMLC, a network device (hereinafter, referred to as an NEF) performing an NEF, and a network device (hereinafter, referred to as an AF (UTM)) performing an AF (UTM).

FIG. 3 illustrates a method of transmitting together application-level information and 3GPP network-level information through the CP using a 5GC-MO-LR procedure.

In operation 301, the UE (UAV/UAVC) makes a radio connection to a network by transmitting a service request. When the UE has already made the radio connection, this process may be omitted.

Operation 301: If the UE is in a CM-IDLE state, the UE instigates the UE-triggered service request as defined in clause 4.2.3.2 of TS 23.502 [19] in order to establish a signaling connection with the AMF.

For example, when the UE is in a CM-IDLE state, the UE initiates a UE-triggered service request as defined in clause 4.2.3.2 of TS 23.502 [19] in order to establish a signaling connection with the AMF.

In operation 302, the UE makes a mobile-originated location request (MO-LR) through an uplink (UL) NAS transport message, and application-level information, for example, an app ID (service level ID) and an app pos (ex: GPS-based UE location), is included in the NAS message.

Operation 302: The UE sends an MO-LR request message included in a UL NAS TRANSPORT message. The MO-LR request may optionally include an LPP positioning message. Different types of location services can be requested: location estimate of the UE, location estimate of the UE to be sent to an LCS client or AF, or location assistance data. If the UE is requesting the UE's own location or that the UE's own location be sent to an LCS client or AF, this message carries LCS requested QoS information (e.g., accuracy, response time, LCS QoS Class), the requested maximum age of location and the requested type of location (e.g., "current location," "current or last known location"). If the UE is requesting that the UE's location be sent to an LCS client, the message may include the identity of the LCS client or the AF, and may include the address of the GMLC through which the LCS client or AF (via NEF) may be accessed. In addition, a service identity indicates which MO-LR service of the LCS client is requested by the UE may be included. The message also may include a pseudonym indicator to indicate a pseudonym may be assigned by the network and transferred to the LCS client as the UE's identity. If the UE is instead requesting location assistance data, the embedded LPP message specifies the type of assistance data and the positioning method for which the assistance data applies.

For an LCS 5GC-MO-LR requesting location transfer to an LCS client or AF, the AMF may assign a GMLC address, i.e., V-GMLC address, which is stored in the AMF. If a V-GMLC address is not available, the AMF may reject the location request. The AMF verifies the subscription profile of the UE and decides if the requested service is allowed or not.

In operation 303, the AMF selects a required location management function (LMF).

Operation 303: The AMF selects an LMF as described in TS 23.273 clause 5.1.

In operation 304, the AMF transmits a location request to the LMF. At this time, the app ID and the app pos, which are application-level information, may be included or omitted.

Operation 304: The AMF invokes the Nlmf_Location_DetermineLocation service operation towards the LMF. The service operation includes an LCS correlation identifier, the serving cell identity, the client type, an indication whether a location estimate, or location assistance data is requested and any embedded LPP message in the MO-LR request. If the UE's location is requested, the service request may include an indication if the UE supports LPP, the requested QoS and Supported GAD shapes. If location assistance data is requested, the embedded LPP message may convey the requested types of location assistance data. If any of the procedures in TS 23.273 clause 6.11.1 or 6.11.2 are used the service operation includes the AMF identity. Once an AMF has selected an LMF the AMF may continue to use that LMF for the duration of the session.

In operation 305, the LMF, the AMF, the RAN, and the UE perform a UE-positioning process as necessary. The process varies depending on the required location accuracy and delay time restrictions.

Operation 305: If the UE is requesting the UE's own location, the actions described in clause 6.11 are performed. If the UE is instead requesting location assistance data, the LMF transfers this data to the UE as described in TS 23.273 clause 6.11.1. The LMF determines the exact location assistance data to transfer according to the type of data specified by the UE, the UE location capabilities, and the current cell.

In operation 306, the LMF transmits information according to the required location accuracy and delay time restrictions to the AMF. Similar to operation 304, the app ID and the app pos may be included or omitted in the process.

Operation 306: When the location estimate best satisfying the requested QoS has been obtained or when the requested location assistance data has been transferred to the UE, the LMF returns the Nlmf_Location_DetermineLocation response towards the AMF. The service operation includes the LCS correlation identifier, the location estimate, if this was obtained, age and accuracy of the location estimate, and may include information about the positioning method.

If a location estimate was not successfully obtained, or if the requested location assistance data could not be transferred successfully to the UE, a failure cause is included in the service operation.

In operation 307, the AMF transmits a Ngmlc_Location_LocationUpdateNotify request to the gateway mobile location center (GMLC). At this time, the app ID and the app pos may be necessarily included.

Operation 307: If the location estimate was successfully obtained, the AMF invokes the Ngmlc_Location_LocationUpdateNotify service operation towards to the V-GMLC assigned in the operation 302. The service operation carries the identity of the UE, the event causing the location estimate (5GC-MO-LR) and the location estimate, age of the location estimate, obtained accuracy indication and the LCS QoS Class requested by the target UE. In addition, the service operation may include the pseudonym indicator, the identity of the LCS client, AF ID, the GMLC address and the service identity specified by the UE, if available.

In a roaming situation, the V-GMLC transmits the message to the H-GMLC in operation 308. At this time, the app ID and the app pos may be necessarily included.

Operation 308: If the UE did not request transfer of the UE's location to an LCS client or AF in operation 302, operations 308 to 311 are skipped. If the V-GMLC is same NF instance as H-GMLC this operation is skipped. Otherwise V-GMLC invokes the Ngmlc_Location_LocationUpdateNotify service operation towards to the H-GMLC (the V-GMLC may query the UDM of the UE to obtain the address of the H-GMLC) including the information received from the V-GMLC.

Although not illustrated in the drawings, if the wireless communication system of FIG. 3 includes an external client, operation 309a may be included.

Operation 309a: If the pseudonym indicator is included in the MO-LR location information, the H-GMLC assigns a pseudonym to the UE. If the identified LCS client is not accessible by the H-GMLC, operation 309a and operation 410a are skipped. Otherwise the GMLC transfers the location information to the LCS client, carrying the identity or the pseudonym of the UE, the event causing the location estimate (5GC-MO-LR), the service identity, if available, and the location estimate and age of the location estimate, in accordance with the LCS QoS Class requested by the target UE. If the UE requested LCS QoS class was assured, GMLC sends the result to the LCS client only if the result has been indicated to fulfill the requested accuracy. If the UE requested LCS QoS class was best effort, GMLC sends whatever result the GMLC received to the LCS client with an appropriate indication if the requested accuracy was not met.

In operation 309b-1, the H-GMLC transmits a Ngmlc_Location_LocationUpdateNotify service request to the NEF. At this time, the app ID and the app pos may be necessarily included.

Operation 309b-1: If the AF ID is included in step 1, the H-GMLC assigns the NEF address based on local configuration or via NRF and invokes Ngmlc_Location_LocationUpdateNotify service request towards the NEF, carrying the AF ID. The location information parameters sent within this service operation are same as the operation 309a.

In operation 309b-2, the NEF transmits location information to the AF. At this time, the app ID and the app pos may be necessarily included.

Operation 309b-2: If the identified AF is not accessible by the NEF, operation 309b-2 and operation 310b-1 are skipped. Otherwise, the NEF transfer the location information to the identified AF.

Although not illustrated in the drawings, if the wireless communication system of FIG. 3 includes an external client, operation 310a may be included.

Operation 310a: If the LCS client does not support MO-LR (for temporary or permanent reasons) or cannot handle the location estimate of the UE, e.g., the LCS client does not know the service identity, or the UE does not register to the LCS client, the LCS client has no corresponding data of the UE, the LCS client may return the location information ack message to the H-GMLC with a suitable error cause. Otherwise, the LCS client handles the location estimate according to the service identity, sends the GMLC or the H-GMLC the location information ack message signaling that the location estimate of the UE has been handled successfully.

Thereafter, via operations 310b-1, 310b-2, 311, 312, and 313, a response to the request message is transmitted to the NEF, the H-GMLC, the V-GMLC, the AMF, and the UE. In a non-roaming situation, the H-GMLC is the V-GMLC, and thus operation 311 is omitted.

Operation 310b-1: If the AF cannot handle the location estimate of the UE, e.g., the UE does not register to the AF, the AF has no corresponding data of the UE, the AF may return the location information ack message to the NEF with a suitable error cause. Otherwise, the AF handles the location estimate according to the service identity, sends the NEF the location information ack message signaling that the location estimate of the UE has been handled successfully.

Operation 310b-2: The NEF sends a Ngmlc_Location_LocationUpdateNotify service response towards the H-GMLC with the location information ack.

Operation 311: If the V-GMLC is same NF instance as H-GMLC this operation is skipped. If the identified LCS client or AF is not accessible, the H-GMLC sends aNgmlc_Location_LocationUpdateNotify service response to V-GMLC with an appropriate error cause. Otherwise, the response may include an acknowledgement. The message may specify whether the location estimate of the UE has been handled successfully by the identified LCS client or AF, and if not, the corresponding error cause obtained in step 10. In addition, the H-GMLC may record charging information both for the UE and inter-working revenues charges.

Operation 312: If the V-GMLC receives the MO-LR location information Acknowledgement from the H-GMLC, if the identified LCS client or AF is not accessible, the V-GMLC sends a Ngmlc_Location_LocationUpdateNotify service response to AMF with an appropriate error cause. Otherwise, the response may include an acknowledgement. The message may specify whether the location estimate of the UE has been handled successfully by the identified LCS client or AF, and if not, the corresponding error cause obtained in operation 309 or 310. In addition, the V-GMLC may record charging information both for the UE and inter-working revenue charges.

If the V-GMLC receives LocationUpdateNotify request from the AMF and the V-GMLC is not required to send to any LCS client or AF, the V-GMLC may record charging information for the UE and response the LocationUpdateNotify request to the AMF.

Operation 313: The AMF sends an MO-LR response message included in a DL NAS TRANSPORT message. The response carries any location estimate requested by the UE including the indication received from E-SMLC whether the obtained location estimate satisfies the requested accuracy or not, or an indicator whether a location estimate was successfully transferred to the identified LCS client or AF. If the location estimate was successfully transferred to the identified LCS client or AF, the MO-LR response message may specify whether the location estimate of the UE has been handled successfully by the identified LCS client or AF, and if not, the corresponding error cause obtained in operation 313. In addition, AMF may record charging information.

As illustrated in FIG. 3, the method of transmitting and receiving information according to various embodiments may include application-level information, for example, the app ID and the app pos (ex: GPS-based UE location) in the message that the UE transmits to the AF through the CP.

For example, as illustrated in FIG. 3, the app ID and the app pos may be transmitted through a CP-based message that the UE transmits to the AF (UTM) via the AMF, the GMLC, and the NEF.

Specifically, the application-level information, for example, the app ID and the app pos (ex: GPS-based UE location) may be included in the UL NAS transport message transmitted from the UE to the AMF, the app ID and the app pos may be included in the Ngmlc_Location_LocationUpdateNotify request message transmitted from the AMF to the GMLC, the app ID and the app pos may be included in the Ngmlc_Location_LocationUpdateNotify service request message transmitted from the GMLC to the NEF, and the app ID and the app pos may be included in the location information transmitted from the NEF to the AF (UTM).

That is, the UE may simultaneously transmit the application-level information, for example, the app ID and the app pos and the 3GPP network-level information, for example, the location information to the UTM through the message transmitted to the AF through the CP.

FIG. 4 illustrates a process in which the UE transmits application-level information through a user plane (UP) and 3GPP network-level information through a CP using a generated common key according to various embodiments.

The method of transmitting and receiving information according to various embodiments may simultaneously or continuously transmit application-level information through the UP and 3GPP network-level information through the CP to the UTM using the common key.

Figure 5:
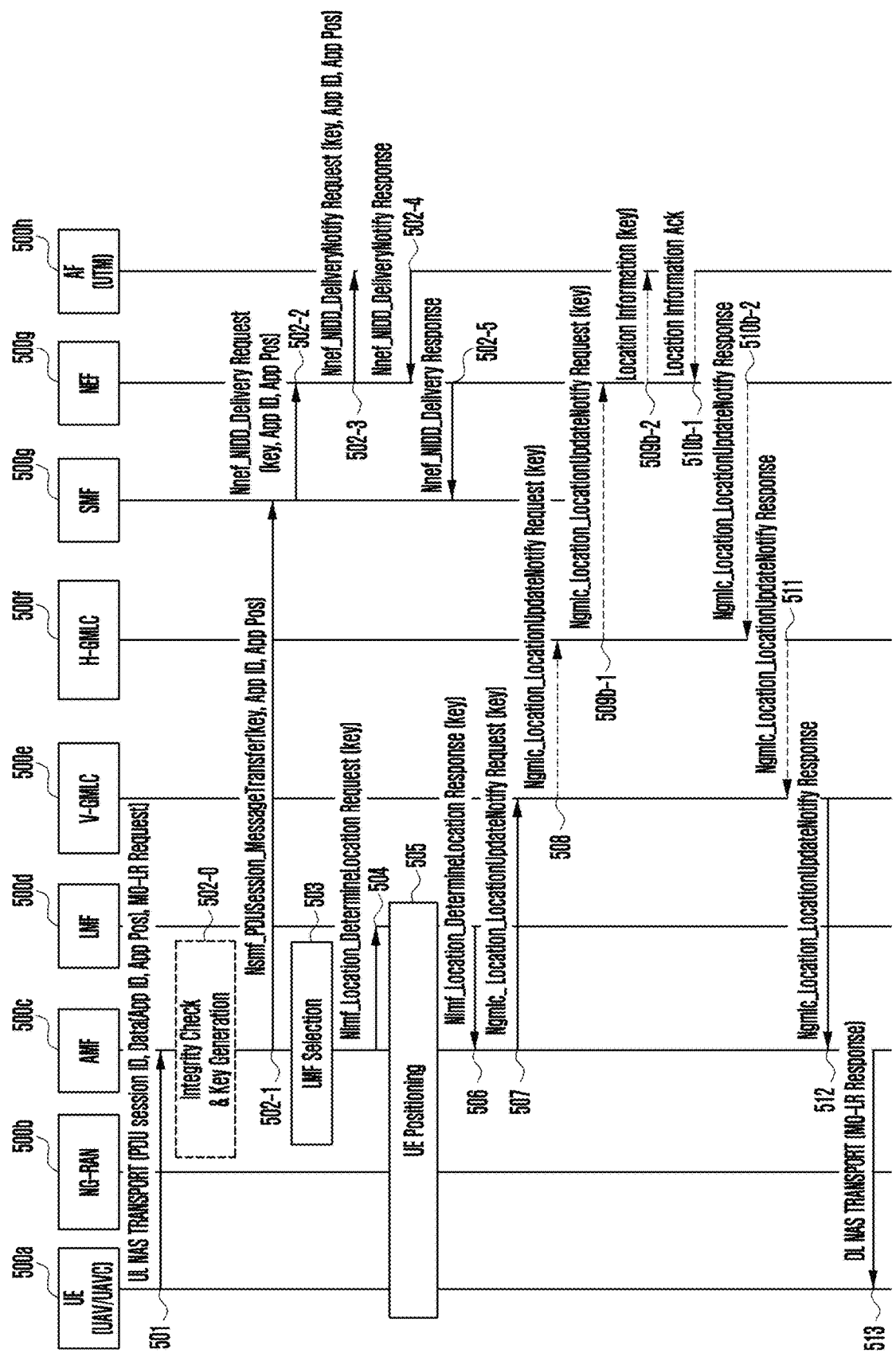
FIG. 5 illustrates a process in which the network transmits application-level information through UP and 3GPP network-level information through a CP using a generated common key according to various embodiments.

FIG. 4 illustrates an embodiment of the case in which the common key is generated by the UE, and FIG. 5 illustrates an embodiment of the case in which the common key is generated by the NW.

FIG. 4 illustrates a process in which the UE simultaneously or continuously transmits 3GPP network-level information and application-level information through a CP and a UP, respectively, using a generated key.

As illustrated in FIG. 4, the wireless communication system according to various embodiments may include a UE, an NR-RAN, an AMF, an LMF, a V-GMLC, an H-GMLC, a UPF, an NEF, and AF (UTM).

In operation 401, the UE generates a common key. The common key is needed to identify the correlation between information transmitted through the UP and information transmitted through the CP, and may be configured through, for example, concatenation of the current time of the UE and the app ID. The UE has a radio connection with the network due to making service requests as necessary. In operation 402-1, the UE transmits the key, the app ID, and the app pos to the AF through the UP.

In operation 402-2, the UE transmits a mobile-originated location request through the UL NAS transport message. At this time, the previously generated key is included. The process is performed simultaneously or continuously with operation 402-1.

Operation 402-2: The UE sends an MO-LR request message included in a UL NAS TRANSPORT message. The MO-LR request may optionally include an LPP positioning message. Different types of location services can be requested: location estimate of the UE, location estimate of the UE to be sent to an LCS client or AF, or location assistance data. If the UE is requesting the UE's own location or that the UE's own location be sent to an LCS client or AF, this message carries LCS requested QoS information (e.g., accuracy, response time, LCS QoS Class), the requested maximum age of location and the requested type of location (e.g., "current location," "current or last known location"). If the UE is requesting that the UE's location be sent to an LCS client, the message may include the identity of the LCS client or the AF, and may include the address of the GMLC through which the LCS client or AF (via NEF) may be accessed. In addition, a service identity indicates which MO-LR service of the LCS client is requested by the UE may be included. The message also may include a pseudonym indicator to indicate a pseudonym may be assigned by the network and transferred to the LCS client as the UE's identity. If the UE is instead requesting location assistance data, the embedded LPP message specifies the type of assistance data and the positioning method for which the assistance data applies.

For an LCS 5GC-MO-LR requesting location transfer to an LCS client or AF, the AMF may assign a GMLC address, i.e., V-GMLC address, which is stored in the AMF. If a V-GMLC address is not available, the AMF may reject the location request. The AMF verifies the subscription profile of the UE and decides if the requested service is allowed or not.

In operation 403, the AMF selects a required LMF.

Operation 403: The AMF selects an LMF as described in TS 23.273 clause 5.1.

In operation 404, the AMF transmits a location request to the LMF. At this time, the key may be included or omitted.

Operation 404: The AMF invokes the Nlmf_Location_DetermineLocation service operation towards the LMF. The service operation includes an LCS correlation identifier, the serving cell identity, the client type, an indication whether a location estimate, or location assistance data is requested and any embedded LPP message in the MO-LR request. If the UE's location is requested, the service request may include an indication if UE supports LPP, the requested QoS and Supported GAD shapes. If location assistance data is requested, the embedded LPP message may convey the requested types of location assistance data. If any of the procedures in TS 23.273 clause 6.11.1 or 6.11.2 are used the service operation includes the AMF identity. Once an AMF has selected an LMF the AMF may continue to use that LMF for the duration of the session.

In operation 405, the LMF, the AMF, the RAN, and the UE perform a UE positing process as necessary. The process varies depending on required location accuracy and delay time restrictions.

Operation 405: If the UE is requesting the UE's own location, the actions described in clause 6.11 are performed. If the UE is instead requesting location assistance data, the LMF transfers this data to the UE as described in TS 23.273 clause 6.11.1. The LMF determines the exact location assistance data to transfer according to the type of data specified by the UE, the UE location capabilities and the current cell.

In operation 406, the LMF transmits information according to the required location accuracy and delay time restrictions to the AMF. Similar to operation 404, the key may be included or omitted in operation 406.

Operation 406: When a location estimate best satisfying the requested QoS has been obtained or when the requested location assistance data has been transferred to the UE, the LMF returns the Nlmf_Location_DetermineLocation response towards the AMF. The service operation includes the LCS correlation identifier, the location estimate, if this was obtained, age and accuracy of the location estimate, and may include information about the positioning method.

If a location estimate was not successfully obtained, or if the requested location assistance data could not be transferred successfully to the UE, a failure cause is included in the service operation.

In operation 407, the AMF transmits Ngmlc_Location_LocationUpdateNotify to the GMLC. At this time, the key may be necessarily included.

Operation 407: If the location estimate was successfully obtained, the AMF invokes the Ngmlc_Location_LocationUpdateNotify service operation towards to the V-GMLC assigned in the step 2. The service operation carries the identity of the UE, the event causing the location estimate (5GC-MO-LR) and the location estimate, age of the location estimate, obtained accuracy indication and the LCS QoS Class requested by the target UE. In addition, the service operation may include the pseudonym indicator, the identity of the LCS client, AF ID, the GMLC address and the service identity specified by the UE, if available.

In a roaming situation, the V-GMLC transmits the message to the H-GMLC in operation 408. At this time, the key may be necessarily included.

Operation 408: If the UE did not request transfer of the UE's location to an LCS client or AF in operation 402-2, operations 408 to 411 are skipped. If the V-GMLC is same NF instance as H-GMLC this operation is skipped. Otherwise V-GMLC invokes the Ngmlc_Location_LocationUpdateNotify service operation towards to the H-GMLC (the V-GMLC may query the UDM of the UE to obtain the address of the H-GMLC) including the information received from the V-GMLC.

Although not illustrated in the drawings, if the wireless communication system of FIG. 4 includes an external client, operation 409a may be included.

Operation 409a: If the pseudonym indicator is included in the MO-LR location information, the H-GMLC assigns a pseudonym to the UE. If the identified LCS client is not accessible by the H-GMLC, operation 409a and operation 410a are skipped. Otherwise the GMLC transfers the location information to the LCS client, carrying the identity or the pseudonym of the UE, the event causing the location estimate (5GC-MO-LR), the service identity, if available, and the location estimate and age of the location estimate, in accordance with the LCS QoS Class requested by the target UE. If the UE requested LCS QoS class was Assured, GMLC sends the result to the LCS client only if the result has been indicated to fulfill the requested accuracy. If the UE requested LCS QoS class was best effort, GMLC sends whatever result the GMLC received to the LCS client with an appropriate indication if the requested accuracy was not met.

In operation 409b-1, the H-GMLC transmits a Ngmlc_Location_LocationUpdateNotify service request to the NEF. At this time, the key may be necessarily included.

Operation 409b-1: If the AF ID is included in step 1, the H-GMLC assigns the NEF address based on local configuration or via NRF and invokes Ngmlc_Location_LocationUpdateNotify service request towards the NEF, carrying the AF ID. The location information parameters sent within this service operation are same as the operation 409a.

In operation 409b-2, the NEF transmits location information to the AF. At this time, the key may be necessarily included.

Operation 409b-2: If the identified AF is not accessible by the NEF, operation 409b-2 and operation 410b-1 are skipped. Otherwise, the NEF transfer the location information to the identified AF.

Although not illustrated in the drawings, if the wireless communication system of FIG. 4 includes an external client, operation 410a may be included.

Operation 410a: If the LCS client does not support MO-LR (for temporary or permanent reasons) or cannot handle the location estimate of the UE, e.g., the LCS client does not know the service identity, or the UE does not register to the LCS client, the LCS client has no corresponding data of the UE, the LCS client may return the location information ack message to the H-GMLC with a suitable error cause. Otherwise, the LCS client handles the location estimate according to the service identity, sends the GMLC or the H-GMLC the location information ack message signaling that the location estimate of the UE has been handled successfully.

Thereafter, via operations 410b-1, 410b-2, 411, 412, and 413, a response to the request message is transmitted to the NEF, the H-GMLC, the V-GMLC, the AMF, and the UE. In a non-roaming situation, the H-GMLC is the V-GMLC, and thus operation 411 is omitted.

Operation 410b-1: If the AF cannot handle the location estimate of the UE, e.g., the UE does not register to the AF, the AF has no corresponding data of the UE, the AF may return the location information ack message to the NEF with a suitable error cause. Otherwise, the AF handles the location estimate according to the service identity, sends the NEF the location information ack message signalling that the location estimate of the UE has been handled successfully.

Operation 410b-2: The NEF sends a Ngmlc_Location_LocationUpdateNotify service response towards the H-GMLC with the location information ack.

Operation 411: If the V-GMLC is same NF instance as H-GMLC this operation is skipped. If the identified LCS client or AF is not accessible, the H-GMLC sends aNgmlc_Location_LocationUpdateNotify service response to V-GMLC with an appropriate error cause. Otherwise, the response may include an acknowledgement. The message may specify whether the location estimate of the UE has been handled successfully by the identified LCS client or AF, and if not, the corresponding error cause obtained in step 10. In addition, the H-GMLC may record charging information both for the UE and inter-working revenues charges.

Operation 412: If the V-GMLC receives the MO-LR location information Acknowledgement from the H-GMLC, if the identified LCS client or AF is not accessible, the V-GMLC sends a Ngmlc_Location_LocationUpdateNotify service response to AMF with an appropriate error cause. Otherwise, the response may include an acknowledgement. The message may specify whether the location estimate of the UE has been handled successfully by the identified LCS client or AF, and if not, the corresponding error cause obtained in operation 309 or 310. In addition, the V-GMLC may record charging information both for the UE and inter-working revenue charges.

If the V-GMLC receives LocationUpdateNotify request from the AMF and the V-GMLC is not required to send to any LCS client or AF, the V-GMLC may record charging information for the UE and response the LocationUpdateNotify request to the AMF.

Operation 413: The AMF sends an MO-LR response message included in a DL NAS TRANSPORT message. The response carries any location estimate requested by the UE including the indication received from E-SMLC whether the obtained location estimate satisfies the requested accuracy or not, or an indicator whether a location estimate was successfully transferred to the identified LCS client or AF. If the location estimate was successfully transferred to the identified LCS client or AF, the MO-LR response message may specify whether the location estimate of the UE has been handled successfully by the identified LCS client or AF, and if not, the corresponding error cause obtained in operation 313. In addition, AMF may record charging information. As illustrated in FIG. 4, in the method of transmitting and receiving information according to various embodiments, the UE may simultaneously or continuously transmit the app ID and the app pos to the AF (UTM) through the UP and the location information (for example, 3GPP network-level information) to the AF (UTM) through the CP using the common key generated by the UE.

Specifically, the UE may simultaneously or continuously transmit the key, the app ID, and the app pos to the AF (UTM) through the UP via the UPF, and the key and the local information (for example, 3GPP network-level information) to the UTM through the message transmitted to the AF through the CP.

For example, as illustrated in FIG. 4, the UE transmits the key generated by the UE and the application-level information, for example, the app ID and the app pos through an UP-based message transmitted to the AF (UTM) through the UPF.

Simultaneously or continuously therewith, the UE transmits a mobile-originated location request (MO-LR) through a UL NAS transport message, and transmits the key generated by the UE through a CP-based message transmitted to the AF (UTM) through the AMF, the GMLC, and the NEF.

Specifically, the MO-LR and the key may be included in the UL NAS transport message transmitted to the AMF, the key generated by the UE may be included in the Ngmlc_Location_LocationUpdateNotify request message transmitted from the AMF to the GMLC, the key may be included in the Ngmlc_Location_LocationUpdateNotify service request message transmitted from the GMLC to the NEF, and the location information and the key may be included in the CP-based message transmitted from the NEF to the AF (UTM).

That is, the UE may simultaneously or continuously transmit the key generated by the UE and the application-level information, for example, the app ID and the app pos to the AF (UTM) through the UPF and the 3GPP network-level information, for example, the location information and the key generated by the UE to the AF (UTM).

FIG. 5 illustrates a process of transmitting application-level information through the UP and 3GPP-level information through a CP using a common key generated by the network according to various embodiments.

The method of transmitting and receiving information according to various embodiments illustrated in FIG. 5 may further include an SMF.

FIG. 5 illustrates a process of simultaneously or continuously transmitting 3GPP network-level information and application-level information through a CP and a UP, respectively, using a key generated by the network.

In operation 501, the UE transmits a PDU session ID and data (app ID and app pos) through a UL NAS transport message and additionally transmits an MO-LR request. Prior to this, the UE establishes a radio connection with the network by making a service request as necessary.

Operation 501: The UE sends an MO-LR request message included in a UL NAS TRANSPORT message. The MO-LR request may optionally include an LPP positioning message. Different types of location services can be requested: location estimate of the UE, location estimate of the UE to be sent to an LCS client or AF, or location assistance data. If the UE is requesting the UE's own location or that the UE's own location be sent to an LCS client or AF, this message carries LCS requested QoS information (e.g., accuracy, response time, LCS QoS Class), the requested maximum age of location and the requested type of location (e.g., "current location," "current or last known location"). If the UE is requesting that the UE's location be sent to an LCS client, the message may include the identity of the LCS client or the AF, and may include the address of the GMLC through which the LCS client or AF (via NEF) may be accessed. In addition, a service identity indicates which MO-LR service of the LCS client is requested by the UE may be included. The message also may include a pseudonym indicator to indicate a pseudonym may be assigned by the network and transferred to the LCS client as the UE's identity. If the UE is instead requesting location assistance data, the embedded LPP message specifies the type of assistance data and the positioning method for which the assistance data applies.

For an LCS 5GC-MO-LR requesting location transfer to an LCS client or AF, the AMF may assign a GMLC address, i.e., V-GMLC address, which is stored in the AMF. If a V-GMLC address is not available, the AMF may reject the location request. The AMF verifies the subscription profile of the UE and decides if the requested service is allowed or not.

In operation 502-0, the AMF receiving the NAS message performs an integrity check on the PDU session ID and the data and generates a key. The key is needed to identify the correlation between information transmitted through the UP and information transmitted through the CP, and may be configured through, for example, concatenation of the current time of the AMF and a 3GPP ID (network level ID) of the UE.

In operation 502-1, the AMF transmits Nsmf_PDUSession_MessageTransfer containing the existing data and the key to the SMF.

In operation 502-2, the SMF transmits a Nnef_NIDD_Delivery request (key, app ID, and app pos) containing the key to the NEF.

In operation 502-3, the NEF transmits a Nnef_NIDD_DeliveryNotify request (key, app ID, and app pos) containing the key to the AF. In operation 502-4 and operation 502-5, responses to the requests from the NEF and the SMF are transmitted.

In operation 503, the AMF selects an LMF. The process is performed simultaneously with operation 502-1.

Operation 503: The AMF selects an LMF as described in TS 23.273 clause 5.1.

In operation 504, the AMF transmits a location request to the LMF. At this time, the key may be included or omitted.

Operation 504: The AMF invokes the Nlmf_Location_DetermineLocation service operation towards the LMF. The service operation includes an LCS correlation identifier, the serving cell identity, the client type, an indication whether a location estimate, or location assistance data is requested and any embedded LPP message in the MO-LR request. If the UE's location is requested, the service request may include an indication if UE supports LPP, the requested QoS and Supported GAD shapes. If location assistance data is requested, the embedded LPP message may convey the requested types of location assistance data. If any of the procedures in TS 23.273 clause 6.11.1 or 6.11.2 are used the service operation includes the AMF identity. Once an AMF has selected an LMF the AMF may continue to use that LMF for the duration of the session.

In operation 505, the LMF, the AMF, the RAN, and the UE perform a UE-positioning process as necessary. The process varies depending on the required location accuracy and delay time restrictions.

Operation 505: If the UE is requesting the UE's own location, the actions described in clause 6.11 are performed. If the UE is instead requesting location assistance data, the LMF transfers this data to the UE as described in TS 23.273 clause 6.11.1. The LMF determines the exact location assistance data to transfer according to the type of data specified by the UE, the UE location capabilities and the current cell.

In operation 506, the LMF transmits information according to the required location accuracy and delay time restrictions to the AMF. Similar to operation 504, the key may be included or omitted in operation 506.

Operation 506: When a location estimate best satisfying the requested QoS has been obtained or when the requested location assistance data has been transferred to the UE, the LMF returns the Nlmf_Location_DetermineLocation response towards the AMF. The service operation includes the LCS correlation identifier, the location estimate, if this was obtained, age and accuracy of the location estimate, and may include information about the positioning method.

If a location estimate was not successfully obtained, or if the requested location assistance data could not be transferred successfully to the UE, a failure cause is included in the service operation.

In operation 507, the AMF transmits Ngmlc_Location_LocationUpdateNotify to the GMLC. At this time, the key may be necessarily included.

Operation 507: If the location estimate was successfully obtained, the AMF invokes the Ngmlc_Location_LocationUpdateNotify service operation towards to the V-GMLC assigned in the operation 501. The service operation carries the identity of the UE, the event causing the location estimate (5GC-MO-LR) and the location estimate, age of the location estimate, obtained accuracy indication and the LCS QoS Class requested by the target UE. In addition, the service operation may include the pseudonym indicator, the identity of the LCS client, AF ID, the GMLC address and the service identity specified by the UE, if available.

In a roaming situation, the V-GMLC transmits the message to the H-GMLC in operation 508. At this time, the key may be necessarily included.

Operation 508: If the UE did not request transfer of the UE's location to an LCS client or AF in operation 501, operations 508 to 511 are skipped. If the V-GMLC is same NF instance as H-GMLC this operation is skipped. Otherwise V-GMLC invokes the Ngmlc_Location_LocationUpdateNotify service operation towards to the H-GMLC (the V-GMLC may query the UDM of the UE to obtain the address of the H-GMLC) including the information received from the V-GMLC.

Although not illustrated in the drawings, if the wireless communication system of FIG. 5 includes an external client, operation 509a may be included.

Operation 509a: If the pseudonym indicator is included in the MO-LR location information, the H-GMLC assigns a pseudonym to the UE. If the identified LCS client is not accessible by the H-GMLC, operation 509a and operation 510a are skipped. Otherwise the GMLC transfers the location information to the LCS client, carrying the identity or the pseudonym of the UE, the event causing the location estimate (5GC-MO-LR), the service identity, if available, and the location estimate and age of the location estimate, in accordance with the LCS QoS Class requested by the target UE. If the UE requested LCS QoS class was assured, GMLC sends the result to the LCS client only if the result has been indicated to fulfill the requested accuracy. If the UE requested LCS QoS class was best effort, GMLC sends whatever result the GMLC received to the LCS client with an appropriate indication if the requested accuracy was not met.

In operation 509b-1, the H-GMLC transmits a Ngmlc_Location_LocationUpdateNotify service request to the NEF. At this time, the key may be necessarily included.

Operation 509b-1: If the AF ID is included in step 1, the H-GMLC assigns the NEF address based on local configuration or via NRF and invokes Ngmlc_Location_LocationUpdateNotify service request towards the NEF, carrying the AF ID. The location information parameters sent within this service operation are same as the operation 509a.

In operation 509b-2, the NEF transmits location information to the AF. At this time, the key may be necessarily included.

Operation 509-2: If the identified AF is not accessible by the NEF, operation 509b-2 and operation 510b-1 are skipped. Otherwise, the NEF transfer the location information to the identified AF.

Although not illustrated in the drawings, if the wireless communication system of FIG. 5 includes an external client, operation 510a may be included.

Operation 510a: If the LCS client does not support MO-LR (for temporary or permanent reasons) or cannot handle the location estimate of the UE, e.g., the LCS client does not know the service identity, or the UE does not register to the LCS client, the LCS client has no corresponding data of the UE, the LCS client may return the location information ack message to the H-GMLC with a suitable error cause. Otherwise, the LCS client handles the location estimate according to the service identity, sends the GMLC or the H-GMLC the location information ack message signaling that the location estimate of the UE has been handled successfully.

Thereafter, via operations 510b-1, 510b-2, 511, 512, and 513, a response to the request message is transmitted to the NEF, the H-GMLC, the V-GMLC, the AMF, and the UE. In a non-roaming situation, the H-GMLC is the V-GMLC, and thus operation 511 is omitted.

Operation 510b-1: If the AF cannot handle the location estimate of the UE, e.g., the UE does not register to the AF, the AF has no corresponding data of the UE, the AF may return the location information ack message to the NEF with a suitable error cause. Otherwise, the AF handles the location estimate according to the service identity, sends the NEF the location information ack message signaling that the location estimate of the UE has been handled successfully.

Operation 510b-2: The NEF sends a Ngmlc_Location_LocationUpdateNotify service response towards the H-GMLC with the location information ack.

Operation 511: If the V-GMLC is same NF instance as H-GMLC this operation is skipped. If the identified LCS client or AF is not accessible, the H-GMLC sends aNgmlc_Location_LocationUpdateNotify service response to V-GMLC with an appropriate error cause. Otherwise, the response may include an acknowledgement. The message may specify whether the location estimate of the UE has been handled successfully by the identified LCS client or AF, and if not, the corresponding error cause obtained in step 10. In addition, the H-GMLC may record charging information both for the UE and inter-working revenues charges.

Operation 512: If the V-GMLC receives the MO-LR location information Acknowledgement from the H-GMLC, if the identified LCS client or AF is not accessible, the V-GMLC sends a Ngmlc_Location_LocationUpdateNotify service response to AMF with an appropriate error cause. Otherwise, the response may include an acknowledgement. The message may specify whether the location estimate of the UE has been handled successfully by the identified LCS client or AF, and if not, the corresponding error cause obtained in operation 309 or 310. In addition, the V-GMLC may record charging information both for the UE and inter-working revenue charges.

If the V-GMLC receives LocationUpdateNotify request from the AMF and the V-GMLC is not required to send to any LCS client or AF, the V-GMLC may record charging information for the UE and response the LocationUpdateNotify request to the AMF.

Operation 513: The AMF sends an MO-LR response message included in a DL NAS TRANSPORT message. The response carries any location estimate requested by the UE including the indication received from E-SMLC whether the obtained location estimate satisfies the requested accuracy or not, or an indicator whether a location estimate was successfully transferred to the identified LCS client or AF. If the location estimate was successfully transferred to the identified LCS client or AF, the MO-LR response message may specify whether the location estimate of the UE has been handled successfully by the identified LCS client or AF, and if not, the corresponding error cause obtained in operation 313. In addition, AMF may record charging information.

As illustrated in FIG. 5, in the method of transmitting and receiving information according to various embodiments, the UE may simultaneously or continuously transmit the app ID and the app pos to the AF (UTM) through the UP and the local information (for example, 3GPP network-level information) to the AF (UTM) through the CP using the common key generated by the NW.

Specifically, the UE may simultaneously or continuously transmit the key, the app ID, and the app pos to the AF (UTM) through the UP via the SMF, and the key and the location information (for example, 3GPP network-level information) to the AF (UTM) through the message transmitted to the AF through the CP.

For example, as illustrated in FIG. 5, the UE transmits the key generated by the AMF and the application-level information, for example, the app ID and the app pos through a UP-based message transmitted to the AF (UTM) through the SMF. In this case, the procedure for transmitting UP information through the CP is defined as a special procedure for IoT, and the case using the procedure is described.

Simultaneously therewith, the UE transmits a mobile-originated location request (MO-LR) through a UL NAS transport message, and transmits the key generated by the AMF through a CP-based message transmitted to the AF (UTM) through the GMLC and the NEF.

Specifically, the MO-LR may be included in the UL NAS transport message transmitted from the UE to the AMF, the key generated by the AMF may be included in the Ngmlc_Location_LocationUpdateNotify request message transmitted from the AMF to the GMLC, the key may be included in the Ngmlc_Location_LocationUpdateNotify service request message transmitted from the GMLC to the NEF, and the location information and the key may be included in the CP-based message transmitted from the NEF to the AF (UTM).

That is, the UE may simultaneously or continuously transmit the key generated by the NW and the application-level information, for example, the app ID and the app pos to the AF (UTM) through the SMF and the 3GPP network-level information, for example, the location information and the key generated by the NW to the AF (UTM).

Figure 6A:
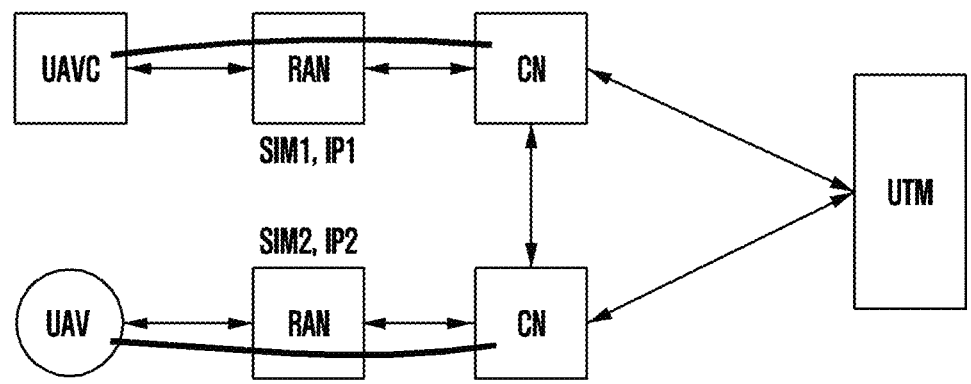
FIG. 6A illustrates an embodiment of an authorization method in a UAS service scenario according to various embodiments.

The UAS service scenario according to various embodiments may include at least one of an authorization method, a regulation method, or a method of transmitting identification (ID) or other information through a local broadcast. FIG. 6A illustrates an embodiment of an authorization method in a UAS service scenario according to various embodiments, FIG. 6B illustrates an embodiment of an authorization method in a UAS service scenario according to various embodiments, FIG. 6C illustrates an embodiment of an authorization method in a UAS service scenario according to various embodiments, and FIG. 6D illustrates an embodiment of an authorization method in a UAS service scenario according to various embodiments.

FIGS. 6A to 6D illustrate a first UAS service scenario according to various embodiments showing four types of authorization situations.

FIG. 6A: 3GPP authorization. The 3GPP NW starts providing the service.

Figure 6B:
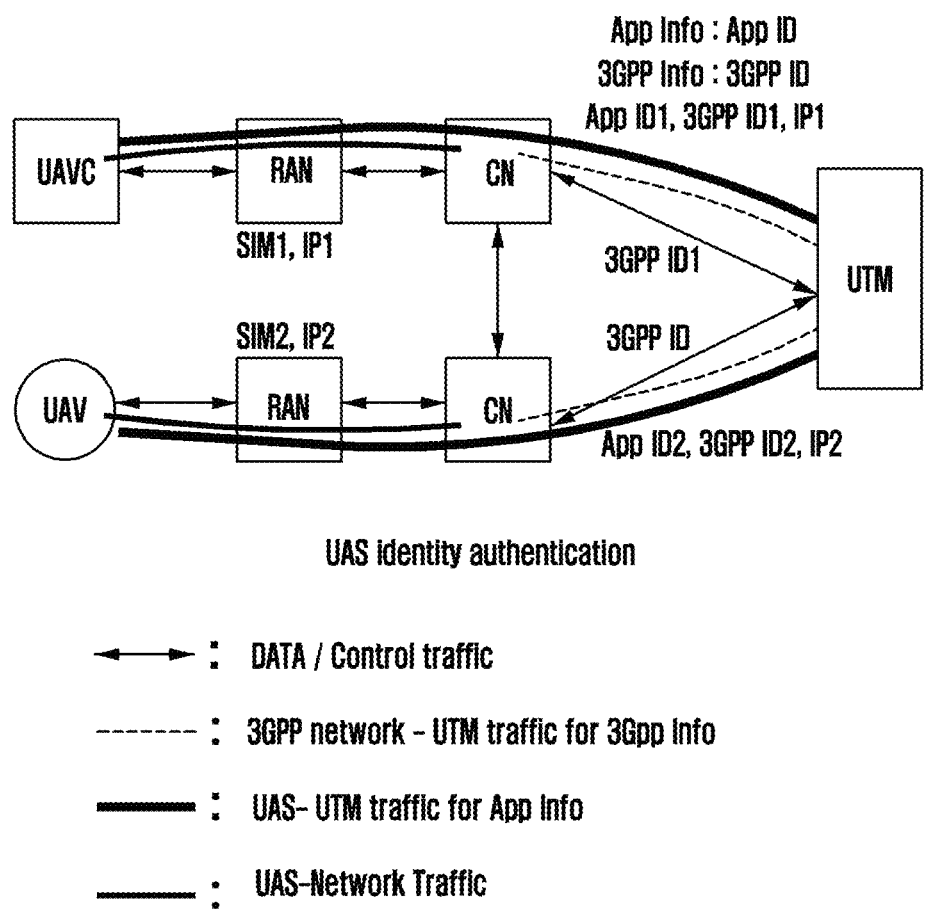
FIG. 6B illustrates an embodiment of an authorization method in a UAS service scenario according to various embodiments.
Figure 6C:
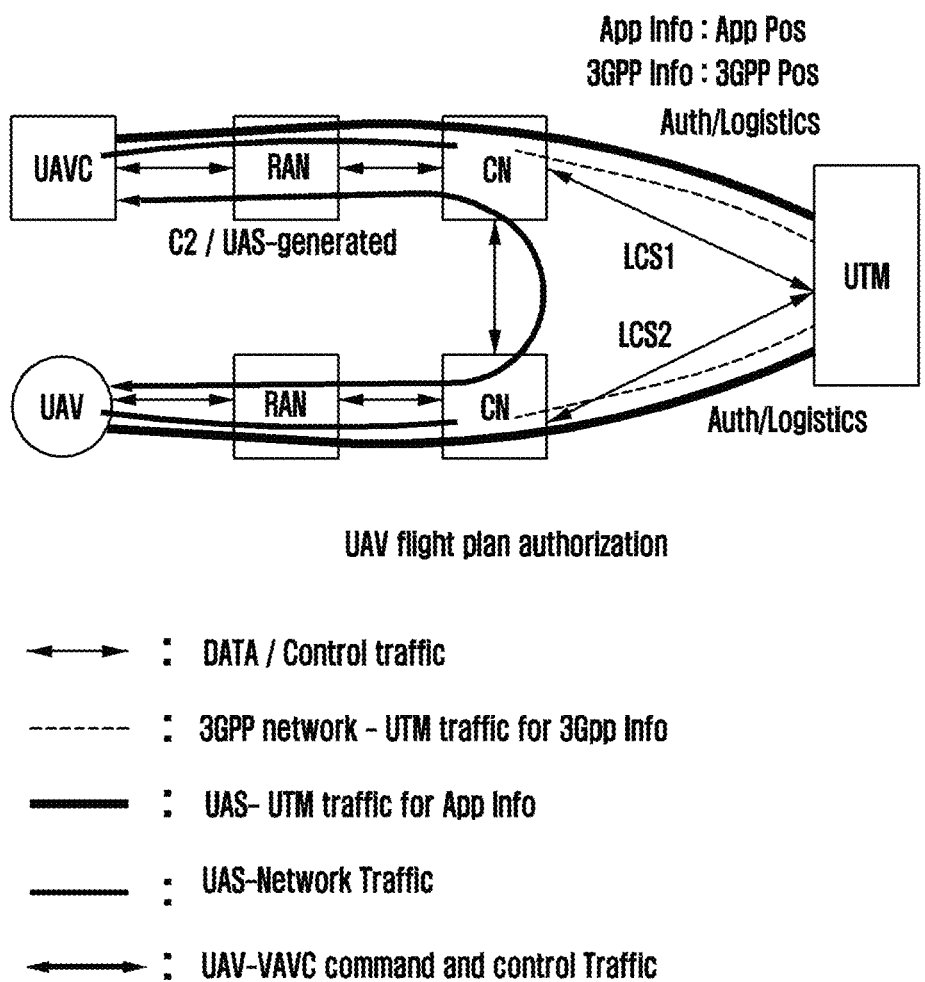
FIG. 6C illustrates an embodiment of an authorization method in a UAS service scenario according to various embodiments.
Figure 6D:
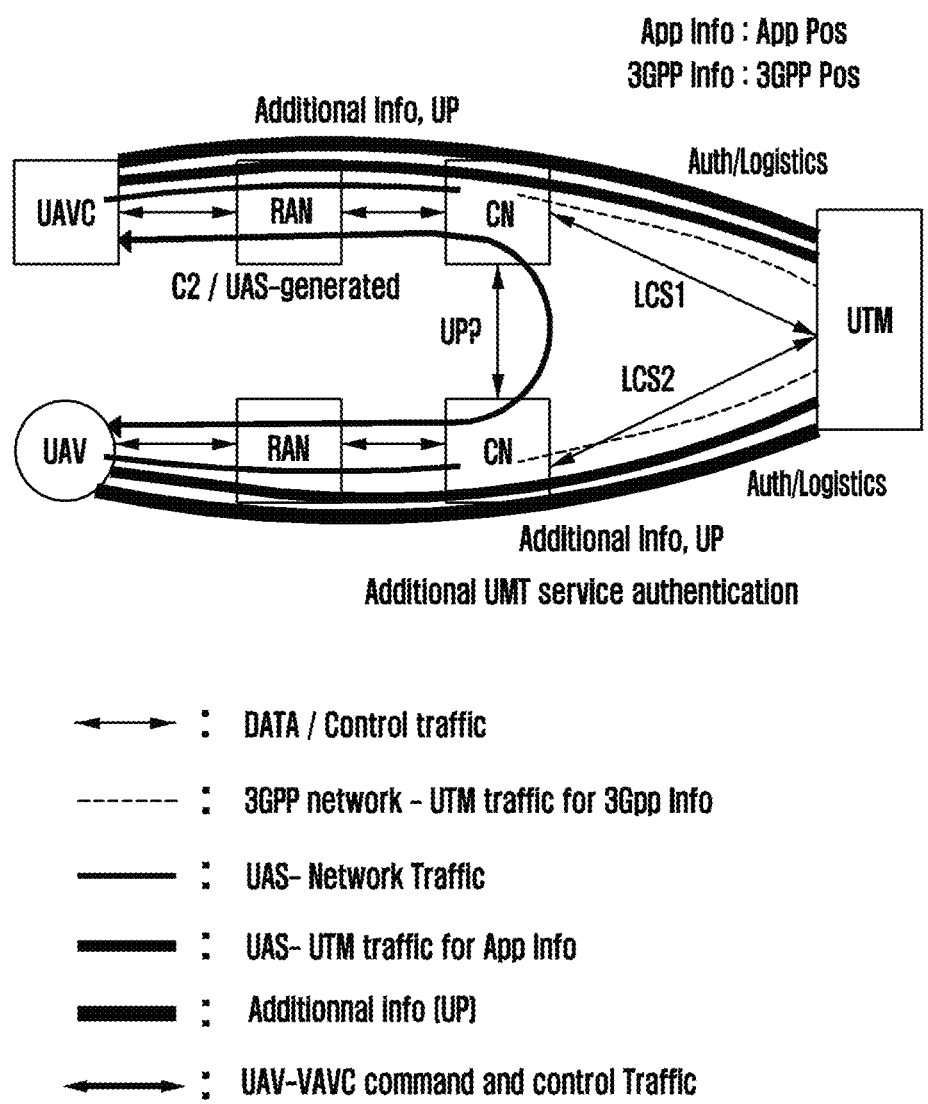
FIG. 6D illustrates an embodiment of an authorization method in a UAS service scenario according to various embodiments.

FIG. 6B: UTM authorization. The 3GPP NW provides the authorization information to the UTM, and the UTM identifies the authorization information at an app level for authorization. The UTM binds a 3GPP ID and an app ID. UAS-UTM communication is allowed after authorization. Comparison between GPS information and LCS is not required herein.

FIG. 6C: The UTM allows a flight plan. The UTM allows the flight plan with reference to whether the UAS is free of problems with regard to authorization at a 3GPP-level and location information. C2 traffic is allowed after the flight plan is allowed. The 3GPP ID is needed for additional identification, and 3GPP LCS information is needed for location verification.

FIG. 6D: refers to a step of providing/verifying a route as an additional/supplementary function. The 3GPP ID is needed for additional identification, and 3GPP LCS information is needed for location verification.

(1) FIG. 6 illustrates an initial network access authentication and authorization process in which an authentication and authorization procedure is performed between the UE and the 3GPP network through initial network access.

As illustrated in FIG. 6A, the UAV and the UAVC may transmit a subscriber identification module (SIM) and an Internet protocol (IP) to the CN. The type of the UAV or the UAVC may be separately subscribed to a 3GPP network operator. The network operator may prepare and provide a required service on the basis of the type.

The CN may perform UAV/UAVC 3GPP authentication. The 3GPP network operator identifies whether to provide a network service to the corresponding UAV or UAVC through CN authentication.

For example, the CN may identify whether the UAV/UAVC type is subscribed through the SIM, and whether to support the UAV/UAVC may be notified through capability signaling.

(2) FIG. 6B illustrates a UAS identity authentication process in which application-level information and 3GPP network-level information are transmitted to provide a UAS identification to the UTM. As illustrated in FIG. 6B, the application-level information may include an app ID, and the 3GPP network-level information may include a 3GPP ID.

Transmission of traffic of only an international mobile equipment identity (IMEI), an international mobile station identity (IMSI), a subscriber identity (MSISDN), an IP address (IPaddr), and a UTM-level ID to the UTM is allowed in the prior art, but the application-level information (app ID1 and app ID2) and the 3GPP network-level information (3GPP ID1 and 3GPP ID2) may also be transmitted as illustrated in FIG. 6B.

For example, a UAS-capable UE may transmit a GPSI (Generic Public Subscription Identifier) and the verification result of the app ID and the 3GPP ID [or the verification result of LCS and GPS] to the UTM.

Further, a non-UAS-capable UE may transmit the application ID, the GPSI, and the GPS to the UTM, and then the UTM may make a request for GPSI verification and the LCS to the NEF.

(3) FIG. 6C illustrates a UAV flight plan authorization process in which information on the UAV and the UAVC is transmitted to the UTM and the UTM allows operation of the UAS on the basis thereof.

As illustrated in FIG. 6C, the application-level information may include app position information, and the 3GPP network-level information may include 3GPP position information. At this time, application-level location information and 3GPP network-level location information may be transmitted to the UTM.

In the prior art, UAV-UAVC traffic can be transmitted for an IMEI, an MSISDN, an IMSI, an Ipaddr, an LCS, or a UTM-level ID only after UAS authentication of FIG. 6B or permission of the UAV flight plan of FIG. 6C, but UAV-UAVC traffic can be transmitted for command and control (C2) and UAS-generated data after permission of the UAV flight plane of FIG. 6C, as illustrated in FIG. 6C.

Meanwhile, the UAS-capable UE may transmit the GPSI, the verification result of the app ID and the 3GPP ID, and the verification result of LCS and GPS to the UTM.

Further, the non-UAS-capable UE may transmit the application ID, the GPSI, and the GPS to the UTM, and then the UTM may make a request for GPSI verification and the LCS to the NEF.

The UAS-capable UE may set a traffic filter for UAV/UAVC traffic in the UPF. For example, the UAS-capable UE may necessarily set the traffic filter for the UAV in the UPF and selectively set the traffic filter for the UAVC in the UPF.

Meanwhile, since it is not possible to guarantee the UAV-UTM, the non-UAS-capable UE cannot perform enforcement in the UPF.

The UAS-capable UE may allow activation of the PDU session, and the non-UAS-capable UE may activate the PDU session of the corresponding DN without any UPF process.

(4) FIG. 6D illustrates an authentication process of the additional UTM service (additional UTM service authentications).

For example, the additional UTM service may include flight monitoring and collision avoidance services.

As illustrated in FIG. 6D, the application-level information may include app position information, and the 3GPP network-level information may include 3GPP position information. At this time, application-level location information and 3GPP network-level location information may be transmitted to the UTM. As illustrated in FIG. 6D, a connection of a traffic path (additional info) for other services can be set at a user plane level according to subscription service information of the UTM, and communication with the UAS is allowed through an application-level IP/port filter.

Figure 7A:
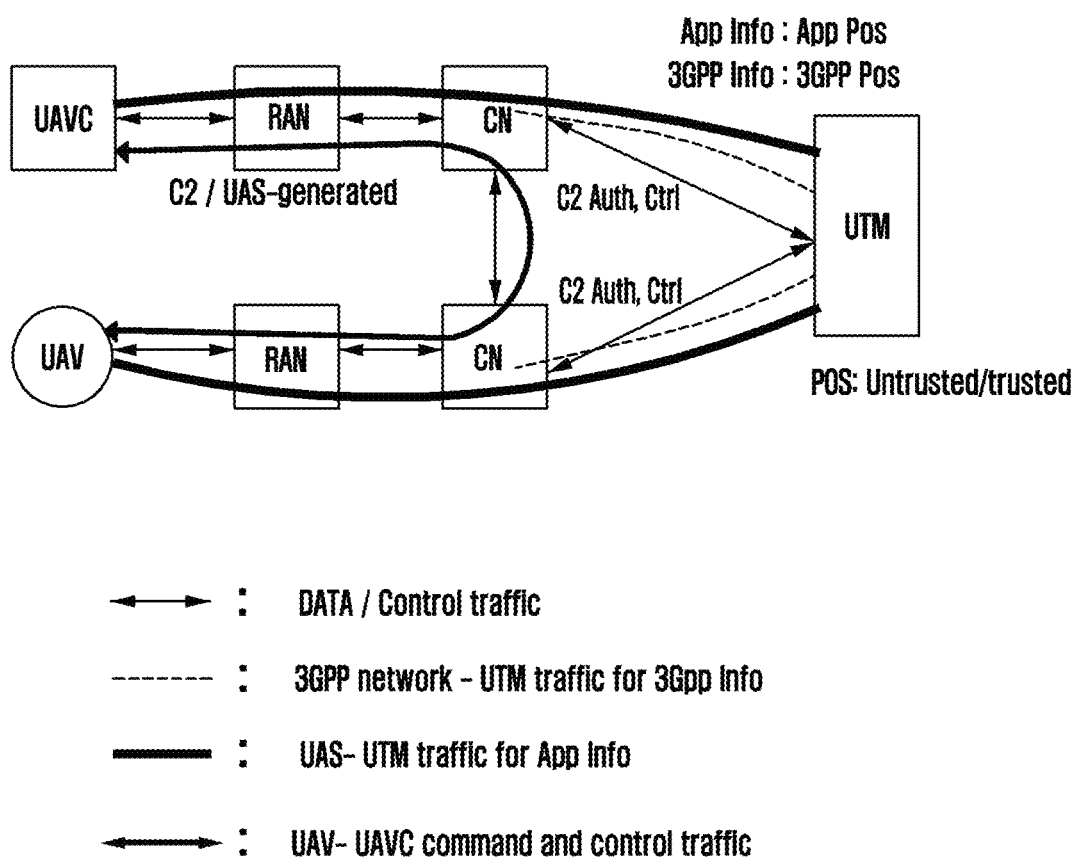
FIG. 7A illustrates an embodiment of a regulation method in a UAS service scenario according to various embodiments.
Figure 7B:
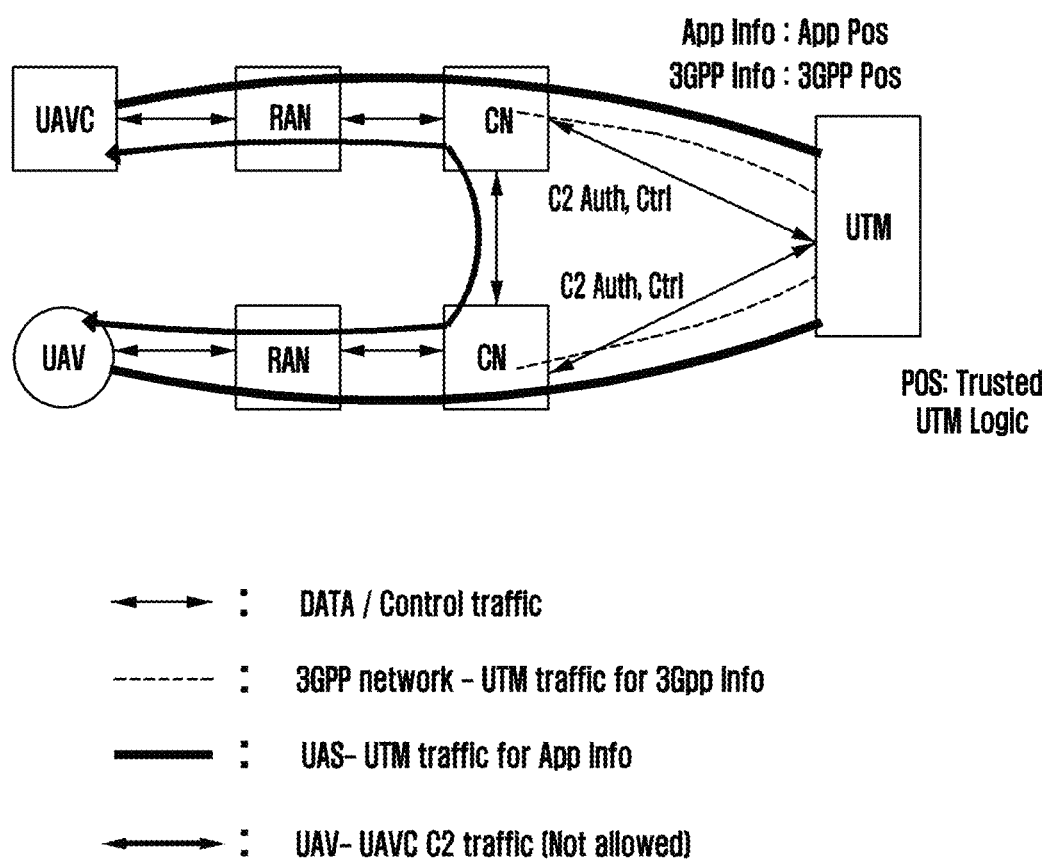
FIG. 7B illustrates an embodiment of a regulation method in a UAS service scenario according to various embodiments.
Figure 7C:
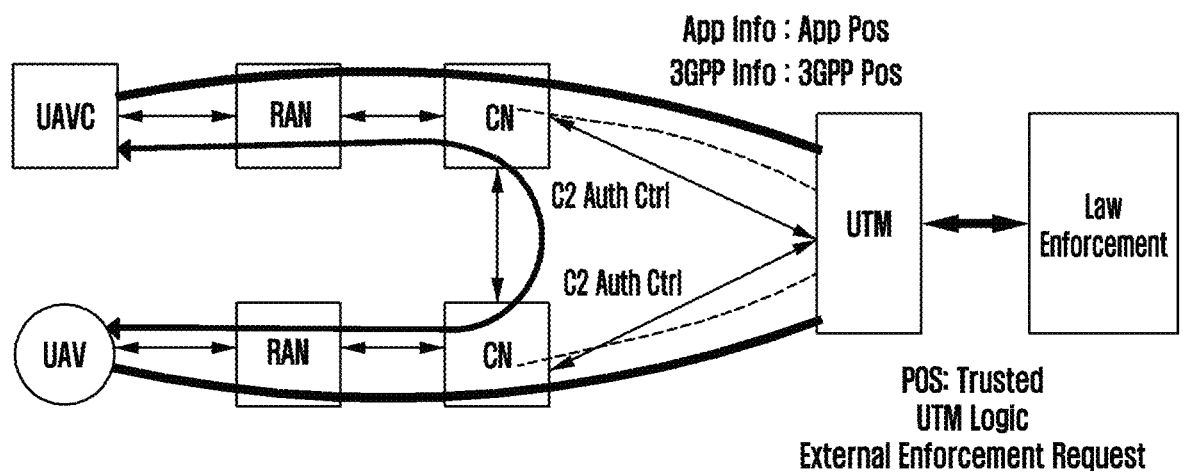
FIG. 7C illustrates an embodiment of a regulation method in a UAS service scenario according to various embodiments.

FIG. 7A illustrates an embodiment of a regulation method in a UAS service scenario according to various embodiments, FIG. 7B illustrates an embodiment of a regulation method in a UAS service scenario according to various embodiments, and FIG. 7C illustrates an embodiment of a regulation method in a UAS service scenario according to various embodiments.

When 3GPP auth is passed in the UAS service scenario according to various embodiments, UAV-UTM traffic and UAVC-UTM traffic may be allowed, but UAV-UAVC traffic may or may not be allowed through the control of the UPF in a predetermined case.

FIG. 7A to FIG. 7C illustrate a second UAS service scenario according to various embodiments, which shows the situation in which the UTM regulates the UAS operation through three types below. As illustrated in FIGS. 7A to 7C, the application-level information may include app position information, and the 3GPP network-level information may include 3GPP position information.

(1) As illustrated in FIG. 7A, application-level location information and 3GPP network-level location information may be transmitted to the UTM. If it is determined that two pieces of information do not match, the information provided by the UAS is classified as untrusted and the UAS operation is regulated.

The UTM may trigger regulation of the UAS operation on the basis of a UAV position or a UAVC position. When regulation is triggered, the UTM may consider the UAV or the UAVC as unauthorized and perform a takeover control operation.

The takeover control operation may include a process of not allowing UAV-UAVC traffic, transmitting a route modification or a route modification notification to the UAVC, and transmitting a route modification to the UAV.

For example, when LCS information of the NW does not match the GPS of the UAV or the UAVC (untrusted area control), the UTM may not allow UAV-UAVC traffic and may transmit the notification to the UAVC and the route modification to the UAV so as to continuously move the UAV according to LCS information until the GPS and the LCS match each other.

(2) As illustrated in FIG. 7B, application-level location information and 3GPP network-level location information may be transmitted to the UTM.

If it is determined that two pieces of information match, the information provided by the UAS may be classified as trusted. If it is determined that UAS location information corresponds to entry into a restricted area managed by the UTM or an area having a high collision risk, the UTM regulates the UAS operation.

(3) As illustrated in FIG. 7C, in cases other than (1) or (2), the corresponding UAS operation may be regulated by a request from an external enforcement organization.

Information related to law enforcement of the external enforcement organization is always accessible.

Figure 8A:
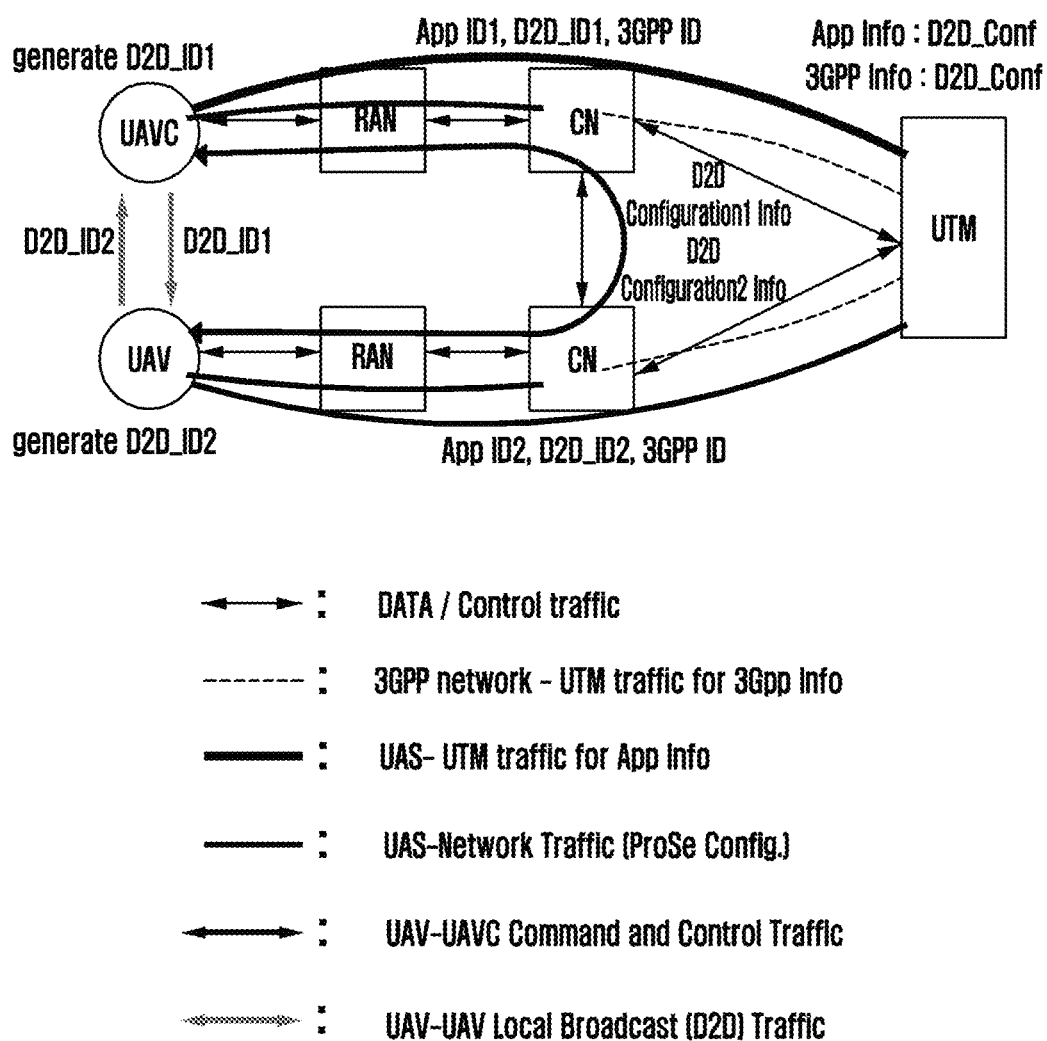
FIG. 8A illustrates an embodiment of a method of transmitting an identification (ID) or other information through a local broadcast between UAVs in a UAS service scenario according to various embodiments.
Figure 8B:
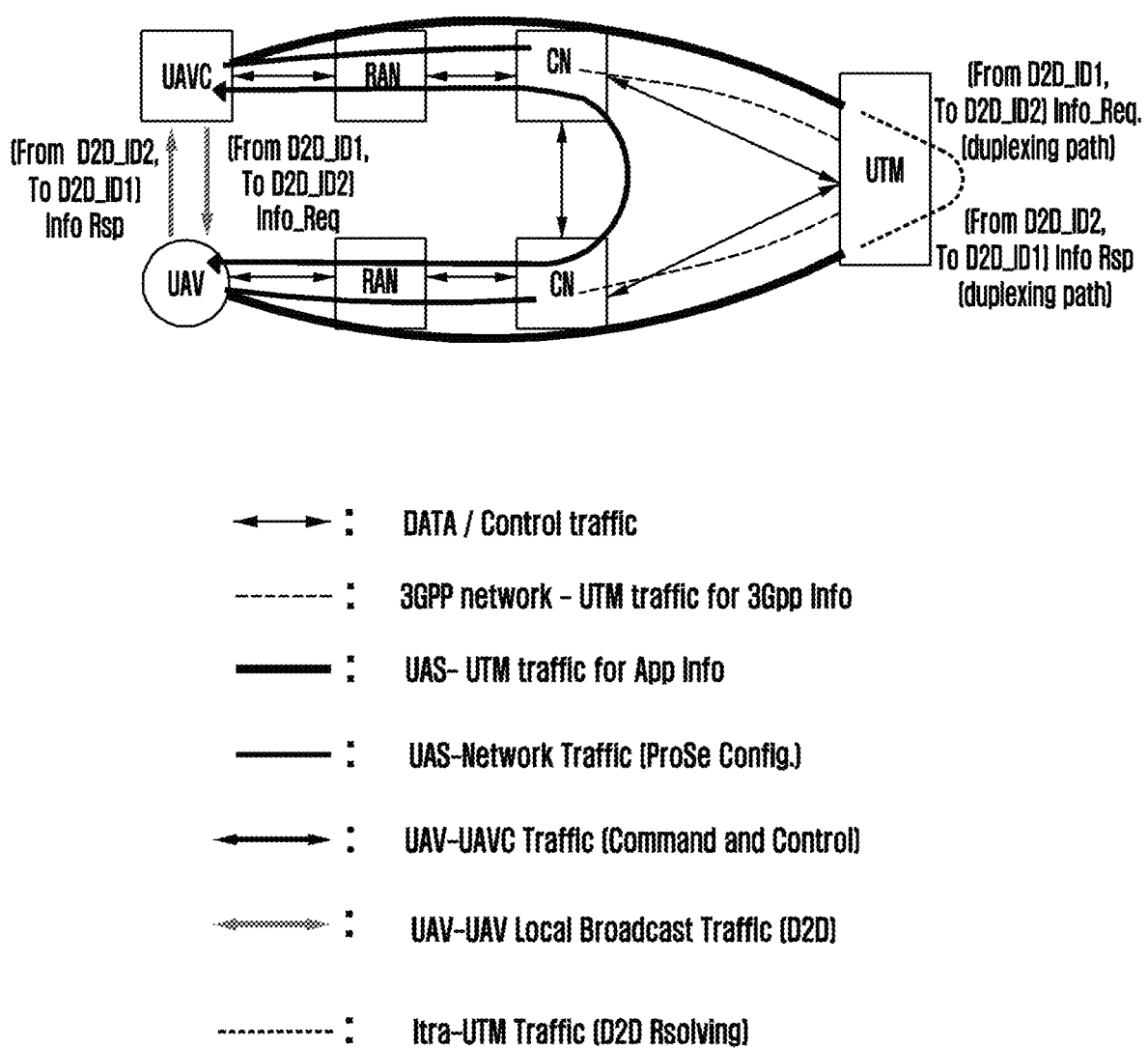
FIG. 8B illustrates an embodiment of a method of transmitting an identification (ID) or other information through a local broadcast between UAVs in a UAS service scenario according to various embodiments.

FIG. 8A illustrates an embodiment of a method of transmitting an identification (ID) or other information through a local broadcast between UAVs in a UAS service scenario according to various embodiments, and FIG. 8B illustrates an embodiment of a method of transmitting an identification (ID) or other information through a local broadcast between UAVs in a UAS service scenario according to various embodiments.

For example, the UAV may broadcast the ID and use the same to prevent collision, and provide information such as an ID, a status, and a flight plan to another UAV through broadcast communication.

FIGS. 8A to 8B illustrate a third UAS service scenario according to various embodiments, which shows a method of receiving not only a D2D_ID broadcasts but also detailed information broadcasts between UAVs belonging to different PLMNs when a UAV transmits the UAV's own D2D_ID in a local broadcast manner through a D2D scheme.

As illustrated in FIG. 8A, the UE may receive a D2D_ID from the UE's own 3GPP network, periodically broadcast the D2D_ID to the vicinity thereof, and use the same to prevent collisions. The UTM may store a D2D_ID, an application-level ID, a GPSI, an IP addr, or an NIDD ID.

Communication between UAVs may be directly performed when the D2D_ID is an application-level ID or after conversion to a layer-2 ID. When the D2D_ID is a layer-2 ID, the application-level ID may be identified after performing resolution through the UTM.

Further, the UAV may provide information such as an ID, a status, and a flight plan through broadcast communication. Collisions may be prevented by provision of information through D2D communication, or D2D communication may be used for police checks.

When UEs belonging to the same PLMN receive the D2D_ID, the UE may make a request for and receive additional information from the corresponding UE, as illustrated in FIG. 8B. At this time, a common ProSe function is used, and the UEs may know D2D configuration information of each other in detail, and thus information exchange is performed according to counterpart D2D configuration on the basis of the corresponding configuration.

However, UEs belonging to different PLMNs cannot receive configuration information from the common ProSe function, and thus the UEs are required to acquire the information through the UTM. Accordingly, the UTM may know the D2D_ID for each UE and configuration information.

Even UEs belonging to different PLMNs may exchange detailed information through local broadcast communication as necessary by identifying D2D configuration information for each D2D_ID through the UTM. When the D2D configuration information is not known, the UE may acquire the D2D_ID from the UE in another PLMN through a periodic frequency search. However, in order to identify detailed information, the UE needs D2D configuration information and thus is required to identify D2D configuration information through the UTM if PLMNs are different.

As described above, the UAV may transmit and receive (send and receive) information through a local broadcast communication transport service.

For example, in V2X, broadcast communication may be performed by performing broadcasting through designation of an entity corresponding to "from/to" on the basis of a layer-2 ID.

Further, the local broadcast communication transport service between UAVs or between the UAV and the UAVC (or between persons) may also be the layer-2 ID.

Meanwhile, when another PLMN frequency is periodically listened through Bcst. Comm. considering the intra-PLMM case, it is required to identify another PLMN configuration for local broadcast communication.

As illustrated in FIG. 8B, in the case of inter-PLMN, the connection to the UTM is made on the basis of a D2D Bcast ID and additional information transmission is needed through UAV-UTM-UAVC or UAV/UAVC/UAVC-UAV direct connection duplexing path.

Figure 9:
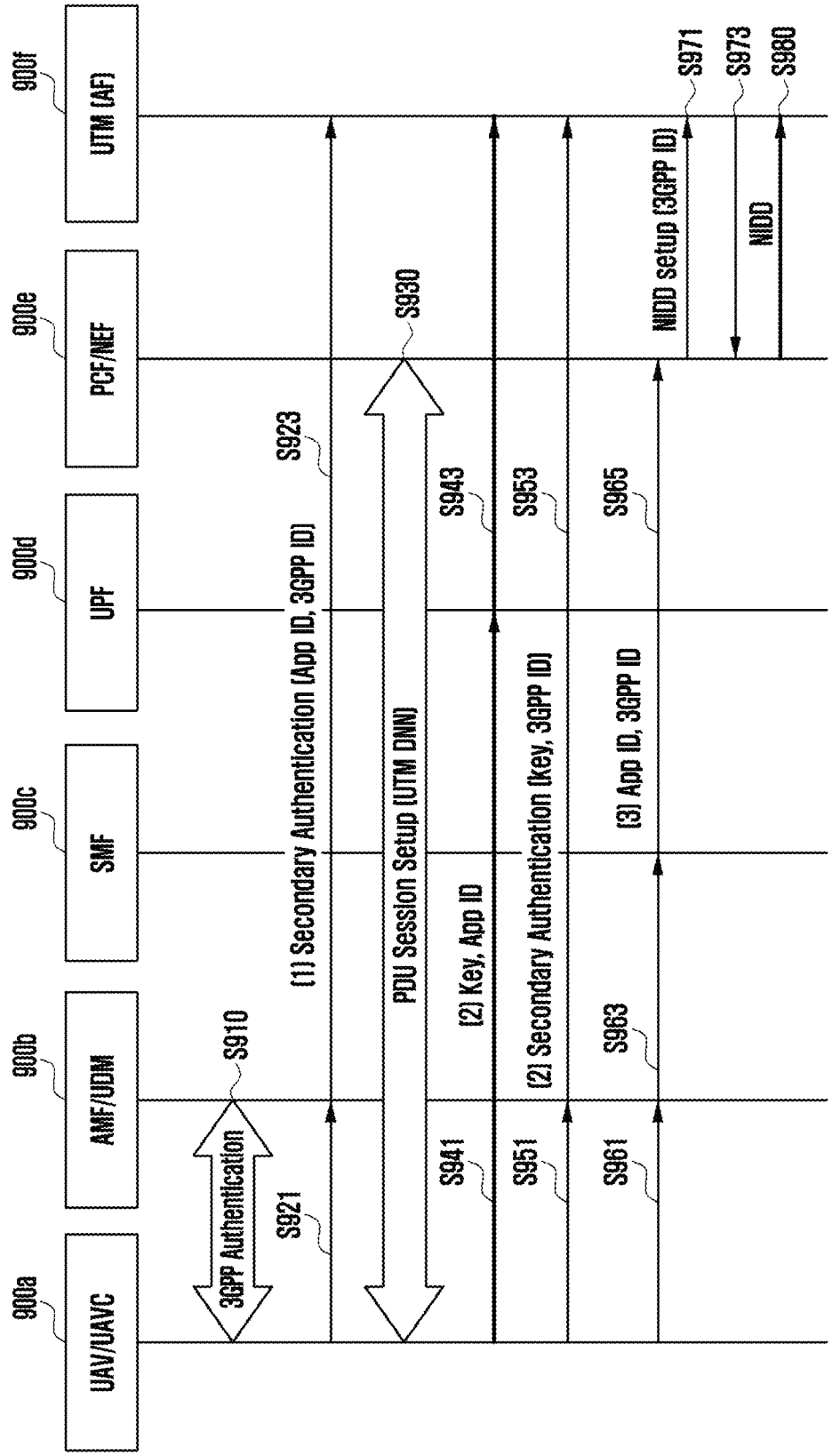
FIG. 9 illustrates an initial network access process in a UAS service scenario according to various embodiments.

FIG. 9 illustrates an initial network access process in a UAS service scenario according to various embodiments.

FIG. 9 illustrates a process corresponding to the scenario of FIG. 6A, and shows the case in which the UAV/UAVC has authentication/authorization for the 3GPP network.

In operation 910, the UAV/UAVC may perform authentication with the 3GPP network on the basis of a SIM.

The UAV/UAVC may transmit a registration message to the UDM. For example, the registration message may include UE capability, and the UE capability may include "UAS-capable" and "UE type=UAV or UAV controller".

For example, "UAS-capable" may mean that the corresponding UE supports a UAS-related function and may be configured in the UE.

For example, "UE type=UAV or UAV controller" may be configured in a USIM as a type field, and may be managed to partition and divide IDs of UEs by service providers.

The UAV/UAVC may receive subscription information from the UDM after authentication based on the SIM. For example, the subscription information may include "UAS-capable support," "LCS support," and "combined delivery support."

For example, "combined delivery support" may use a CP for CIoT, but may mean that CP data can be transmitted using an NIDD procedure defined for transmitting UP data and may be configured in the UE.

When it is identified that the UTM is supported by subscription/capability/type information of the UE, communication between the UAV/UAVC and the UTM may be supported in three types.

(1) The first type is communication between the UAV/UAVC and the UTM through a control plane.

As illustrated in FIG. 9, the UAV/UAVC may transmit an app ID and a 3GPP ID to the UTM (AF) through the AMF/UDM (operation 921) in operation 923.

(2) The second type is communication between the UAV/UAVC and the UTM through a user plane. In this case, the UAV/UAVC communicates with the UTM via the UPF.

As illustrated in FIG. 9, the UAV/UAVC may transmit a key and an app ID to the UTM (AF) through the UPF (operation 941) in operation 943.

Simultaneously or continuously therewith, the UAV/UAVC may transmit the key and a 3GPP ID to the UTM (AF) through the AMF/UDM (operation 951) in operation 953.

(3) The third type is communication using CIoT Optimization. In this case, the UAV/UAVC communicates with the UTM via the NEF. The NEF and the UTM pass through a non-IP data delivery (NIDD) configuration process using a GPSI corresponding to a 3GPP ID.

As illustrated in FIG. 9, the UAV/UAVC may transmit the app ID and the 3GPP ID to the PCF/NEF through the AMF/UDM and the SMF (operation 961 and operation 963) in operation 965.

The NEF and the UTM may pass through a non-IP data delivery (NIDD) configuration process in operations 971 to 973, and may also transmit the 3GPP ID in operation 971, and thus may implicitly transmit the 3GPP ID along with allocation of the NIDD in operation 980.

In an NIDD setup step S971, the 3GPP ID is used. Accordingly, S980 is bound to the 3GPP ID, and the data transmitted therethrough may include and transmit the 3GPP ID without separate mention.

For example, since the 3GPP ID is used when the NIDD is configured, traffic transmitted using a setup API or a tunnel may be implicitly bound to the 3GPP ID. Accordingly, there may be no separate operation for 3GPP ID transmission.

Figure 10:
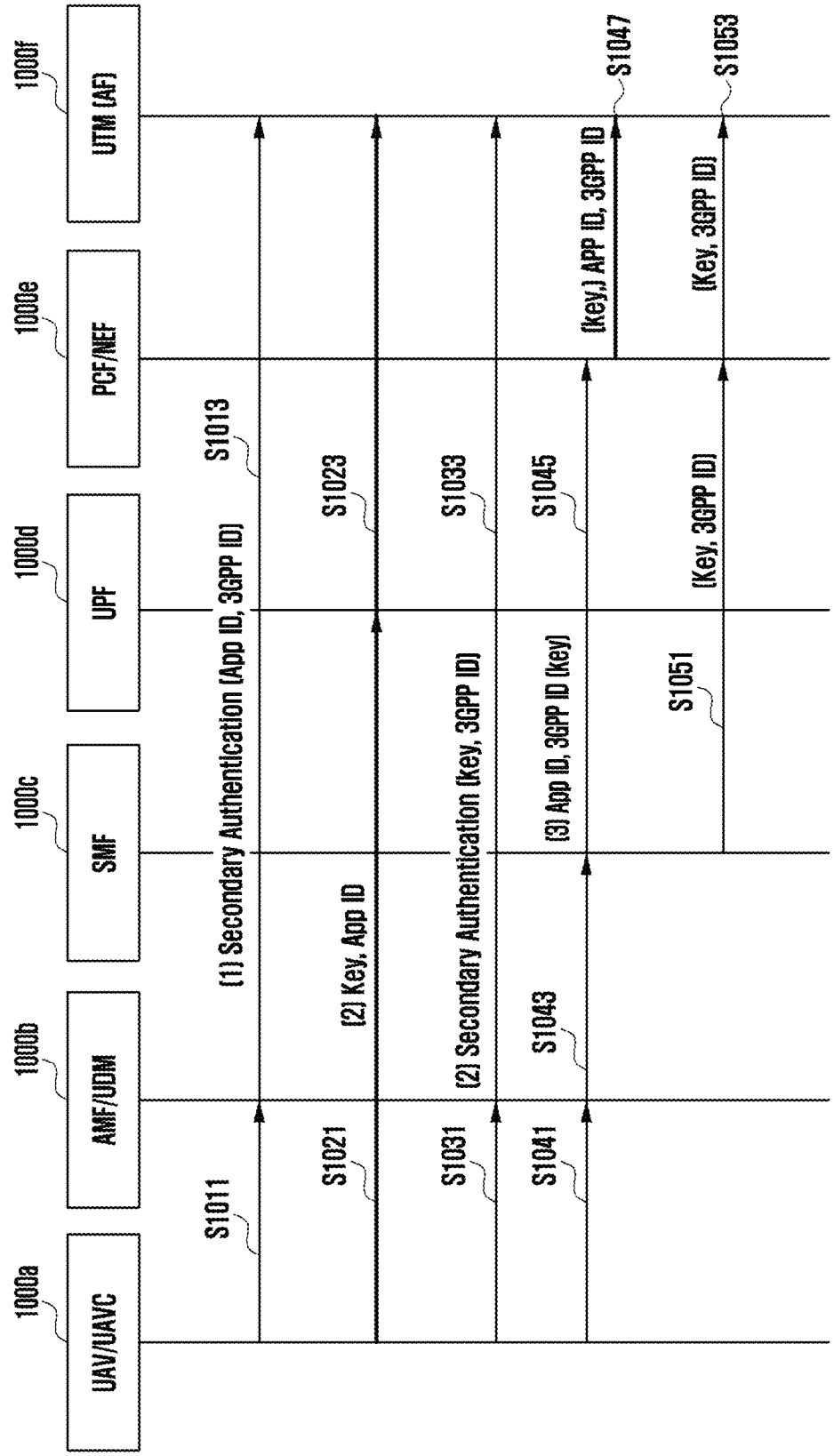
FIG. 10 illustrates a UAS identity authentication process in a UAS service scenario according to various embodiments.

FIG. 10 illustrates a UAS identity authentication process in a UAS service scenario according to various embodiments.

FIG. 10 illustrates that the UAV/UAVC performs authentication in the UTM in the scenario of FIG. 6B.

(1) First, not only a 3GPP ID (IMEI, GPSI/MSISDN, IMSI, and IP address) that is 3GPP network-level information but also an app ID that is application-level information can be directly added to a secondary authorization or DN authorization process of the CP.

As illustrated in FIG. 10, the UAV/UAVC may transmit an app ID and a 3GPP ID to the UTM (AF) through the AMF/UDM (operation 1011) (operation 1013).

That is, the 3GPP NW may transmit app info and 3GPP info to the UTM (AF) through the CP.

(2) Second, the method by which the app ID, which is application-level information, and the 3GPP ID, which is 3GPP network-level information, are simultaneously or continuously transmitted through the UP and the CP on the basis of the common key generated by the UE can be used.

As illustrated in FIG. 10, the UAV/UAVC may transmit the key and the app ID to the UTM (AF) through the UPF (operation 1021) on the basis of the common key generated by the UE (operation 1023).

Simultaneously or continuously therewith, the UAV/UAVC may transmit the key and a 3GPP ID to the UTM (AF) through the AMF/UDM (operation 1031) (operation 1033).

That is, the 3GPP NW may simultaneously or continuously transmit the key and app info to the UTM (AF) through the UP, and the key and the 3GPP ID to the UTM (AF) through the CP.

(3) Third, when the 3GPP ID is specified while the app ID is transmitted through the application-level information in the CIoT 5GS Optimization procedure, the AMF or the SMF generates a common key, transmits the key and the app ID to the UTM through an NIDD path via the NEF, and transmits the key and the 3GPP ID to the UTM through a CP path. At this time, when the 3GPP ID used in the NIDD setup process is the same as the 3GPP ID to be transmitted through a separate CP path, a transmission process using the separate CP path may be omitted. This is because transmission of traffic using the NIDD means that the 3GPP ID has already been included in the transmission process since the NIDD is bound to the 3GPP ID.

As illustrated in FIG. 10, when the UAV/UAVC transmits the app ID and the 3GPP ID via the AMF or the SMF (operation 1041 or 1043), the AMF or the SMF may generate a common key and may simultaneously or continuously transmit the common key and the app ID to the UTM (AF) via the PCF/NEF (operation 1045) (operation 1047), and the common key and the 3GPP ID to the UTM (AF) via the PCF/NEF (operation 1051) (operation 1053).

At this time, when the 3GPP ID used in the NIDD setup process is the same as the 3GPP ID to be transmitted through a separate CP path, a transmission process using the separate CP path may be omitted.

For example, the 3GPP NW may simultaneously transmit the app info and the 3GPP info through the UP (NIDD) using the NAS, and may use the common key provided by the NW. Meanwhile, since the 3GPP ID is used for configuring the NIDD, the 3GPP ID may be used instead of the key. Transmission of traffic using the NIDD means that the 3GPP ID has already been included in the transmission process since the NIDD is bound to the 3GPP ID.

Figure 11:
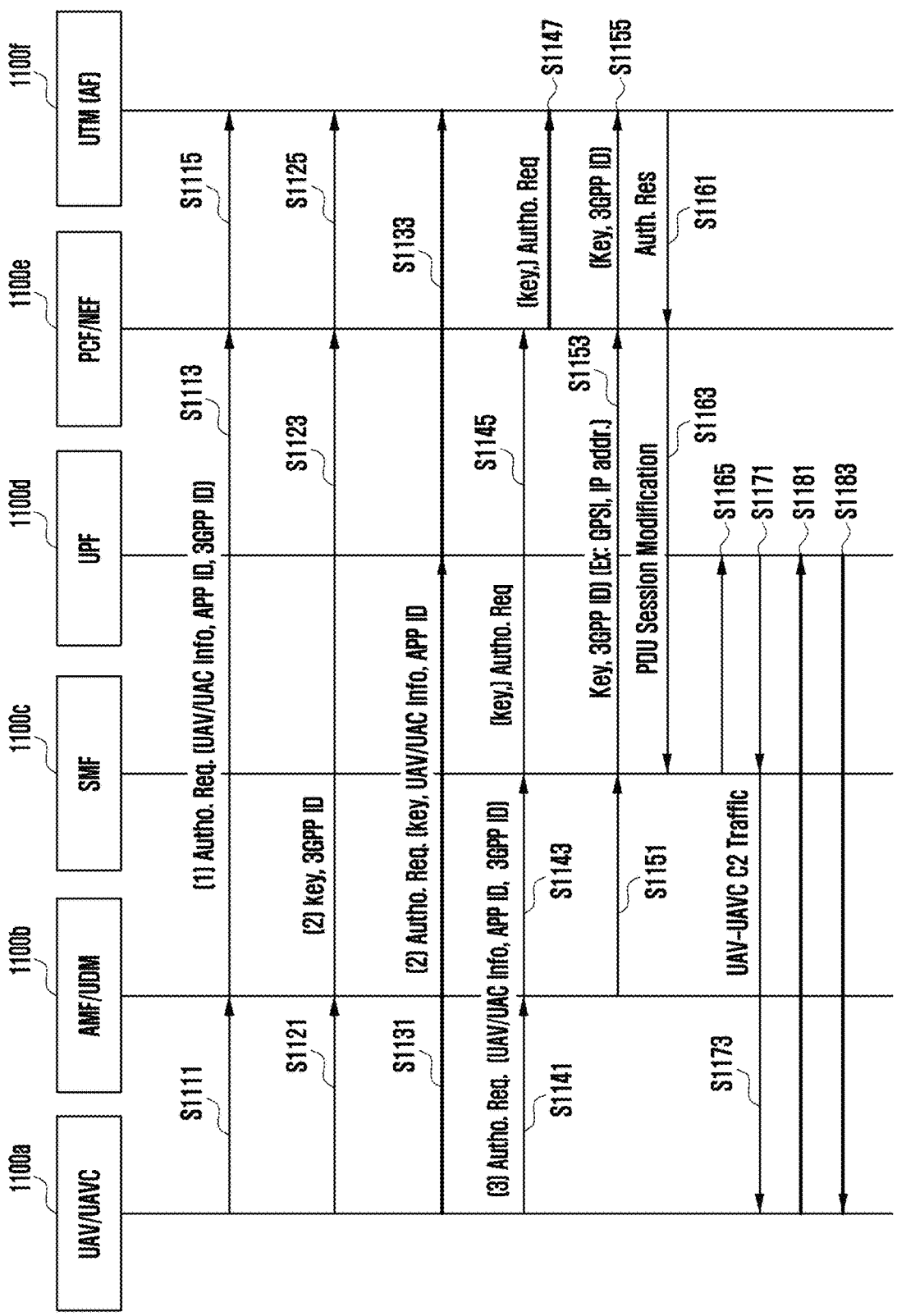
FIG. 11 illustrates a UAV flight plane authentication process in a UAS service scenario according to various embodiments.

FIG. 11 illustrates a UAV flight plan authentication process in a UAS service scenario according to various embodiments.

FIG. 11 illustrates a process in which the UAV/UAVC authenticates a flight plan for the UTM in the scenario of FIG. 6C.

Information on the flight plan transmitted to the UTM is UAV information and UAVC information, and detailed content thereof will be described below. UAV information may include a unique identify (app ID or 3GPP ID), UE capability, a manufacturer & model, a serial number, a take-off weight, a current location, an owner ID, an owner address, an owner contact, owner certification, a take-off location, a mission type, route data, and an operating status (UAV data, which can contain: unique identity (this may be a 3GPP identity), UE capability of the UAV, make & model, serial number, take-off weight, position, owner identity, owner address, owner contact details, owner certification, take-off location, mission type, route data, and operating status).

UAVC information may include an ID (app ID or 3GPP ID), UE capability, a current location, an owner ID, an owner address, an owner contact, owner certification, a UAV operator ID, a UAV operator license, UAV operator certification, a UAV pilot ID, a UAV pilot license, UAV pilot certification, and a flight plan (UAV controller data, which can contain: unique identity (this may be a 3GPP identity), UE capability of the UAV controller, position, owner identity, owner address, owner contact details, owner certification, UAV operator identity, UAV operator license, UAV operator certification, UAV pilot identity, UAV pilot license, UAV pilot certification and flight plan).

When the UTM authorizes the UAV flight plan, the UTM transmits an authorization response to the 3GPP network and allows PDU session traffic between the UAV and the UAVC. A traffic path between the UAV and the UAVC may be at a flow level specifying a source/destination IP/port, a routing filter level specifying only a source/destination IP, a forwarding filter level specifying a source/destination MAC address, a PDU session level, or a DN level specifying a DNN/S-NSSI.

Transmission of information to the UTM may be performed through three methods below.

(1) First, not only a 3GPP ID, which is 3GPP network-level information, but also UAV/UAVC info and an app ID, which are application-level information, can be directly added to a secondary authorization or DN authorization process of the CP.

As illustrated in FIG. 11, the UAV/UAVC performs the secondary authorization by transmitting UAV/UAVC info to the UTM (AF) (operation 1115) via the AMF/UDM (operation 1111) and the PCF/NEF (operation 1113) through the CP.

It may be assumed that dynamic information such as all of the location and the flight plan may be reflected in DN authorization info for PDU session setup.

Verification of the app-level location may be performed on the basis of the 3GPP-level location.

(2) Second, the method by which the UAV/UAVC info and the app ID, which are application-level information, and the 3GPP ID, which is 3GPP network-level information, are simultaneously or continuously transmitted through the UP and the CP on the basis of the common key generated by the UE can be used.

As illustrated in FIG. 11, transmission of the key and the 3GPP ID to the UTM (AF) via the AMF/UDM through the CP and transmission of the key, the UAV/UAVC info, and the app ID to the UTM (AF) via the UPF through the UP may be simultaneously or continuously performed using the common key generated by the UE (operation 1131).

After the UAV/UAVC info is transmitted to the UTM DNN simultaneously or continuously through the UP and the CP, DN authorization may be performed for the C2 DNN in the PDU session setup.

Verification of the app-level location may be performed on the basis of the 3GPP-level location.

(3) Third, when the 3GPP ID is specified while the UAV/UAVC info and the app ID are transmitted through the application-level information in the CIoT 5GS optimization procedure, the AMF or the SMF generates a common key, transmits the key, the UAV/UAVC info, and the app ID to the UTM through an NIDD path via the NEF, and transmits the key and the 3GPP ID to the UTM through a CP path.

As illustrated in FIG. 11, when the UAV/UAVC transmits the UAV/UAVC info, the app ID, and the 3GPP ID via the AMF or the SMF (operation 1141 or 1143), the AMF or the SMF may generate a common key, and simultaneously or continuously transmit the common key, the UAV/UAVC info, and the app ID to the UTM (AF) via the PCF/NEF (operation 1145) (operation 1147), and the common key and the 3GPP ID to the UTM (AF) via the PCF/NEF (operation 1151 to operation 1153) (operation 1155).

At this time, when the 3GPP ID used in the NIDD setup process is the same as the 3GPP ID to be transmitted through a separate CP path, a transmission process using the separate CP path may be omitted. For example, the 3GPP NW may simultaneously transmit the app info and the 3GPP info through the UP (NIDD) using the NAS, and may use the common key provided by the NW. Meanwhile, since the 3GPP ID is used for configuring the NIDD, the 3GPP ID may be used instead of the key. Transmission of traffic using the NIDD means that the 3GPP ID has already been included in the transmission process since the NIDD is bound to the 3GPP ID.

After the UAV/UAVC info is transmitted to the UTM DNN through the NIDD UP, DN authorization may be performed for the C2 DNN in the PDU session setup.

Verification of the app-level location may be performed on the basis of the 3GPP-level location.

Figure 12:
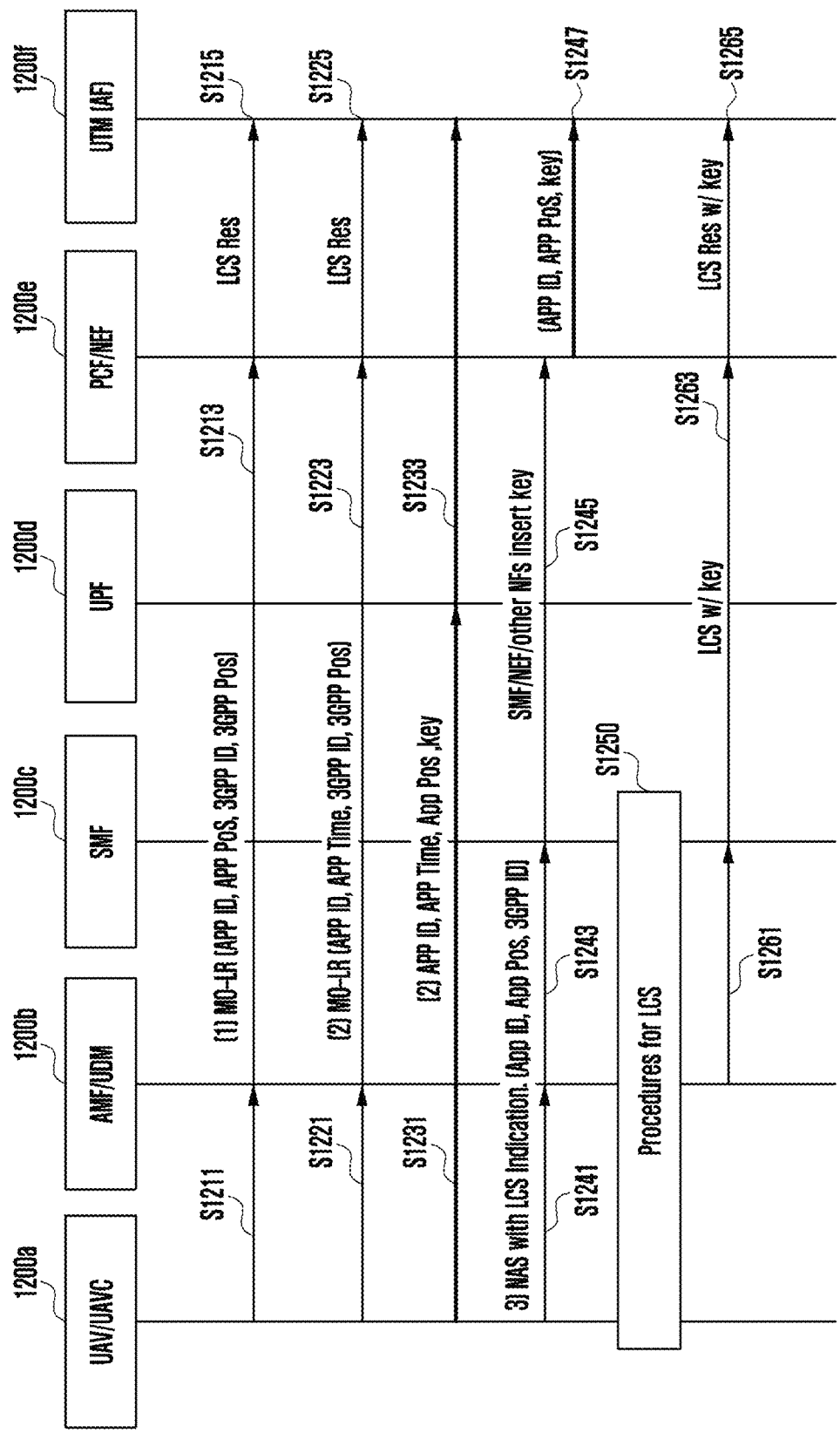
FIG. 12 illustrates a process of identifying UAS location information for a UAV flight plan authorization process in a UAS service scenario according to various embodiments.

FIG. 12 illustrates a process of identifying UAS location information for a UAV flight plan authorization process in a UAS service scenario according to various embodiments.

FIG. 12 illustrates a process of verifying location information as well as an ID in the process of FIG. 11. Similar to FIG. 11, three approaches are also possible.

(1) First, an app ID and an app pos, which are application-level information, may be directly added in a mobile-originated location request process of the CP.

As illustrated in FIG. 12, the 3GPP NW may transmit app info and 3GPP info to the UTM (AF).

The app info may include an app ID and an app loc (pos), and the 3GPP info may include a 3GPP ID and a 3DPP loc (pos).

For example, the UAV/UAVC may transmit the app ID, the app pos, the 3GPP ID, and the 3GPP pos to the UTM (AF) as LCS res. via the AMF/UDM (operation 1211) and the PCF/NEF (operation 1213) (operation 1215).

(2) Second, the method by which the app ID and the app pos, which are application-level information, and the 3GPP ID, which is 3GPP network-level information, are simultaneously or continuously transmitted through the UP and the CP on the basis of the common key generated by the UE can be used.

As illustrated in FIG. 12, the 3GPP NW may simultaneously transmit the app info and the 3GPP info through the CP and the UP (including an NIDD) and may use the common key generated by the UE.

For example, the key (for example, app ID and app time) and the app loc may be transmitted through the UP, and the key (for example, app ID and app time), the 3GPP ID, and the 3GPP loc may be transmitted through the CP.

As illustrated in FIG. 12, the LCS res. operation (operation 1225), corresponding to transmission of the key, the 3GPP ID, and the 3GPP pos to the UTM (AF) via the AMF/UDM and the PCF/NEF through the CP (operations 1221 to 1223) and transmission of the key, the app ID, the app time, and the app pos to the UTM (AF) via the UPF through the UP (operation 1231) may be simultaneously or continuously performed using the common key generated by the UE (operation 1233).

(3) Third, when the LCS is specified while the app ID and the app pos are transmitted through the application-level information in a CIoT 5GS optimization procedure, the AMF or the AMF generates a common key, transmits the key, the app ID, and the app pos to the UTM through an NIDD path via the NEF, and transmits the key, the 3GPP ID, and the 3GPP location to the UTM through a CP path.

For example, LCS information may include the 3GPP ID and the 3GPP location.

As illustrated in FIG. 12, 3GPP combined info delivery may be performed. For example, when an LCS indication is added to a UP delivery NAS message for the NIDD, the AMF, the SMF, or another NF may generate a common key, and the 3GPP NW may insert the common key into the UP-based app ID and app pos and CP-LCS information and transmit the same to the NEF.

As illustrated in FIG. 12, when the UAV/UAVC specifies the LCS while transmitting the app ID, the app pos, and the 3GPP ID through the NAS message in operation 1241, the AMF, the SMF, or another NF may generate a common key, and simultaneously or continuously transmit the key, the app ID, and the app pos to the UTM (AF) via the PCF/NEF (operation 1243) (operation 1245) and the common key and the LCS res. to the UTM (AF) via the PCF/NEF (operation 1263) (operation 1265).

Figure 13:
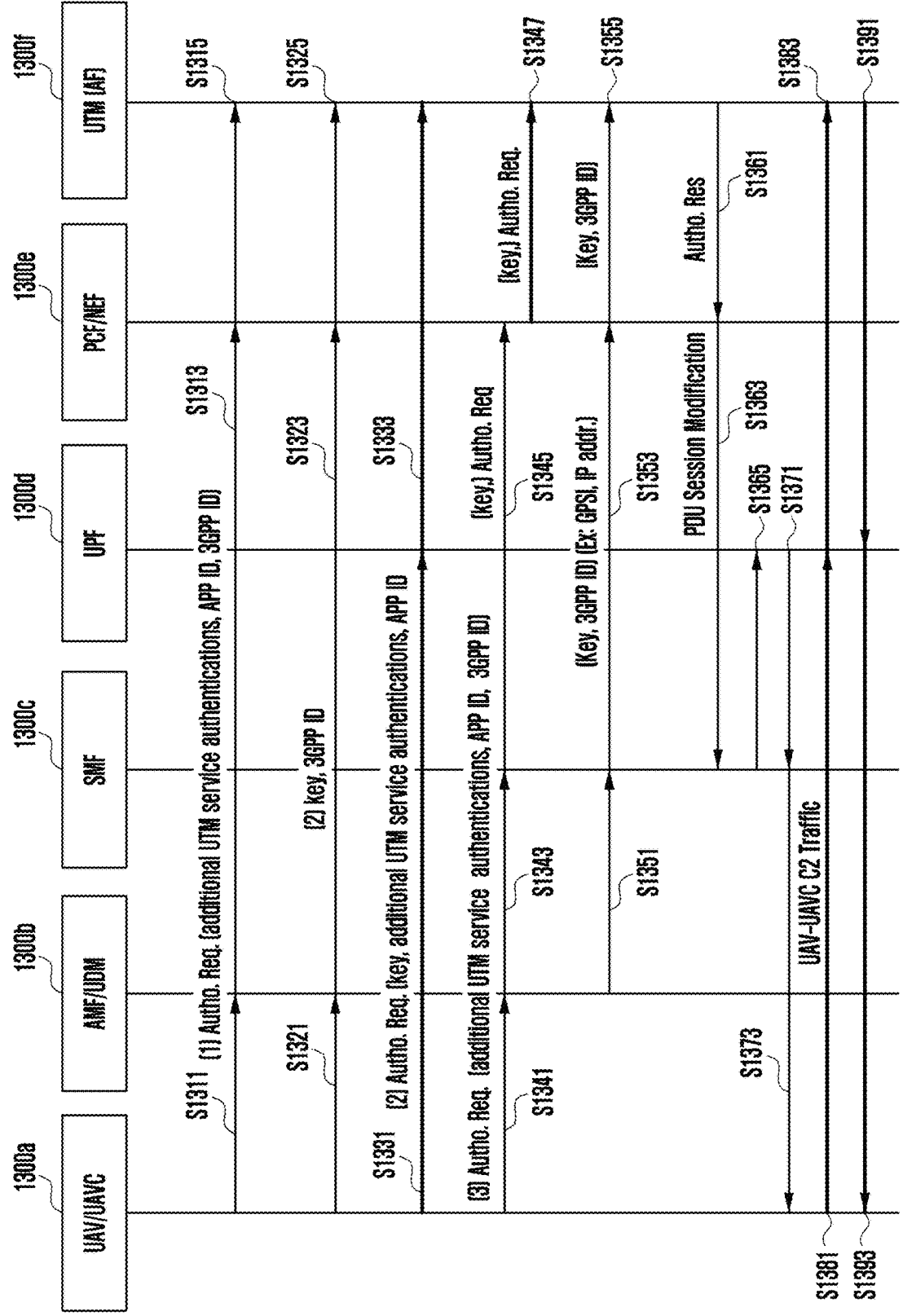
FIG. 13 illustrates a process of authenticating an additional UTM service in a UAS service scenario according to various embodiments.

FIG. 13 illustrates a process of authenticating an additional UTM service in a UAS service scenario according to various embodiments.

FIG. 13 illustrates a process of performing authentication for an additional UTM service in the scenario of FIG. 6D. The control of an information transmission path between the UAV/UAVC and the UTM after authentication may be applied at various levels, as illustrated in FIG. 11. As illustrated in FIG. 11, three methods may be applied to verify identification information.

(1) In a first method, not only a 3GPP ID, which is 3GPP network-level information, but also UTM Service Auth. Info and an app ID, which are application-level information, can be directly added in a secondary authorization or DN authorization process of the CP.

As illustrated in FIG. 13, the 3GPP NW may perform secondary authorization by additional UTM service authentication through the CP, and verification of the app-level location may be performed on the basis of the 3GPP-level location.

As illustrated in FIG. 13, the UAV/UAVC performs the secondary authorization by transmitting UAV/UAVC info to the UTM (AF) (operation 1311) via the AMF/UDM (operation 1313) and the PCF/NEF (operation 1315) through the CP.

(2) In a second method, the method of simultaneously or continuously transmitting additional UTM Service Auth. Info and the app ID, which are application-level information, and the 3GPP ID, which is 3GPP network-level information, through the UP and the CP on the basis of the common key generated by the UE can be used.

As illustrated in FIG. 13, after additional UTM service authentications are performed through the UTM DNN, DN authorization may be performed for the additional DNN in PDU session setup, and then the app-level location may be verified on the basis of the 3GPP-level location.

As illustrated in FIG. 13, transmission of the key and the 3GPP ID to the UTM (AF) via the AMF/UDM and the PCF/NEF (operation 1321 and operation 1323) through the CP and transmission of the key, additional UTM service authentications, and the app ID to the UTM (AF) via the UPF through the UP (operation 1331) may be simultaneously or continuously performed using the common key generated by the UE (operation 1333).

(3) In a third method, when the 3GPP ID is specified while the additional UTM Service Auth. Info and the app ID are transmitted through the application-level information in the CIoT 5GS Optimization procedure, the AMF or the SMF generates a common key, transmits the key, UAV/UAVC info, and the app ID to the UTM through an NIDD path via the NEF, and transmits the key and the 3GPP ID to the UTM through a CP path. At this time, when the 3GPP ID used in the NIDD setup process is the same as the 3GPP ID to be transmitted through a separate CP path, a transmission process using the separate CP path may be omitted.

As illustrated in FIG. 13, after additional UTM service authentications are performed through the NIDD UP, DN authorization may be performed for the additional DNN in PDU session setup, and then the app-level location may be verified on the basis of the 3GPP-level location.

As illustrated in FIG. 13, when the UAV/UAVC transmits the additional UTM service authentications, the app ID, and the 3GPP ID via the AMF or the SMF (operation 1341 or 1343), the AMF or the SMF may generate a common key, and simultaneously or continuously transmit the common key, the additional UTM service authentications, and the app ID to the UTM (AF) via the PCF/NEF (operation 1345) (operation 1347), and the common key and the 3GPP ID (for example, GPSI or IP addr) to the UTM (AF) via the PCF/NEF (operation 1353) (operation 1355).

At this time, when the 3GPP ID used in the NIDD setup process is the same as the 3GPP ID to be transmitted through a separate CP path, a transmission process using the separate CP path may be omitted. For example, the 3GPP NW may simultaneously transmit the app info and the 3GPP info through the UP (NIDD) using the NAS, and may use the common key provided by the NW. Meanwhile, since the 3GPP ID is used for configuring the NIDD, the 3GPP ID may be used instead of the key.

Transmission of traffic using the NIDD means that the 3GPP ID has already been included in the transmission process since the NIDD is bound to the 3GPP ID.

Figure 14:
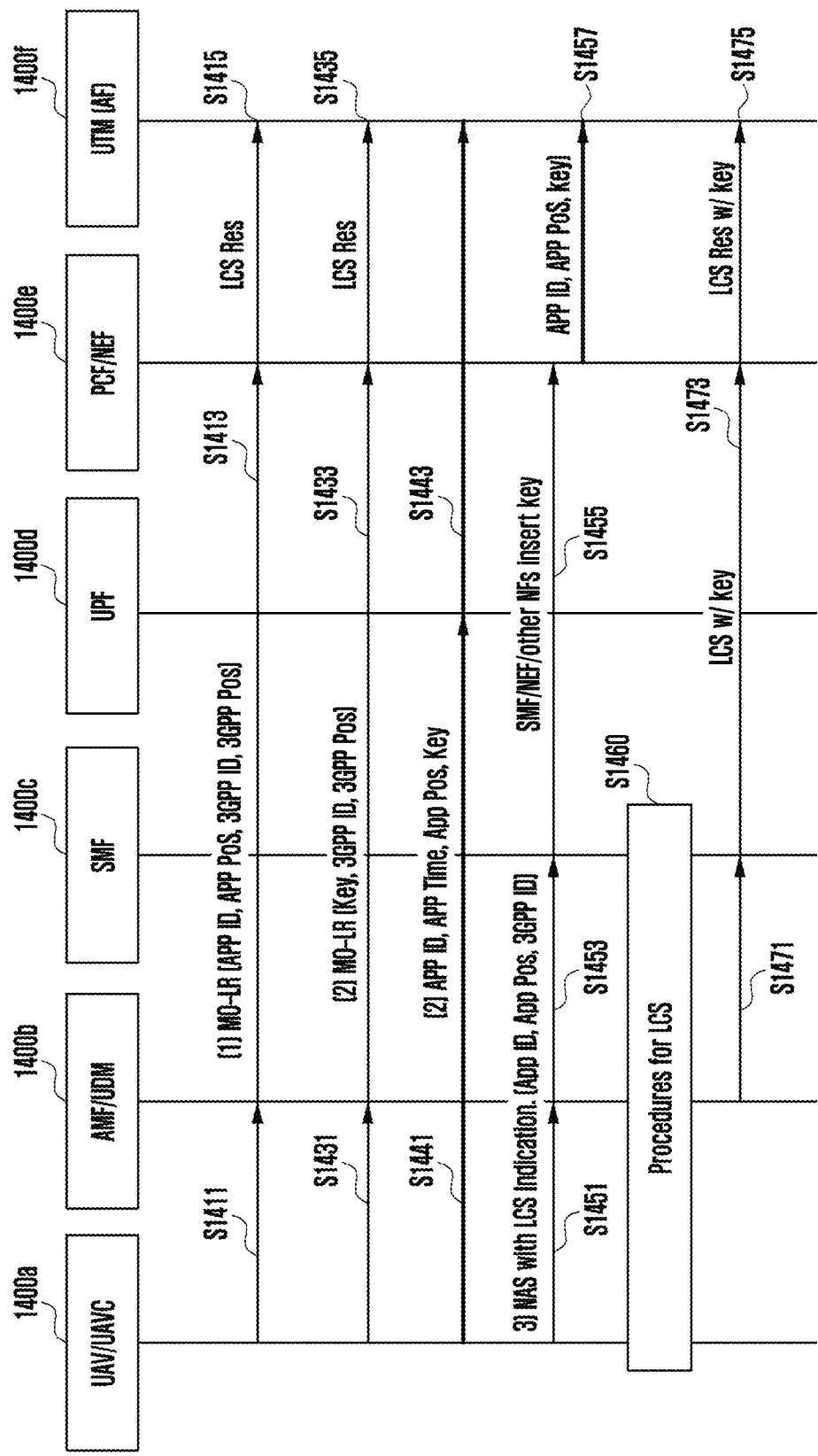
FIG. 14 illustrates a process of identifying location information of the UAS during an authentication process of an additional UTM service in a UAS service scenario according to various embodiments.

FIG. 14 illustrates a process of identifying location information of the UAS during a process of authenticating an additional UTM service in a UAS service scenario according to various embodiments.

FIG. 14 illustrates a process of verifying location information as well as an ID in the process of FIG. 13. To this end, the three methods below may be applied.

(1) In the first method, an app ID and an app pos, which are application-level information, may be directly added in a mobile-originated location request process of the CP.

As illustrated in FIG. 14, the 3GPP NW may transmit app info and 3GPP info to the UTM (AF).

The app info may include an app ID and an app loc (pos), and the 3GPP info may include a 3GPP ID and a 3DPP loc (pos).

For example, the UAV/UAVC may transmit the app ID, the app pos, the 3GPP ID, and the 3GPP pos to the UTM (AF) as LCS res. via the AMF/UDM (operation 1411) and the PCF/NEF (operation 1413) (operation 1415).

(2) In a second method, the method by which the app ID and the app pos, which are application-level information, and the 3GPP ID, which is 3GPP network-level information, are simultaneously or continuously transmitted through the UP and the CP on the basis of the common key generated by the UE can be used.

As illustrated in FIG. 14, the 3GPP NW may simultaneously transmit the app info and the 3GPP info through the CP and the UP (including an NIDD) and may use the key generated by the UE.

For example, the key (for example, app ID and app time) and the app loc may be transmitted through the UP, and the key (for example, app ID and app time), the 3GPP ID, and the 3GPP loc may be transmitted through the CP.

As illustrated in FIG. 14, the LCS res. operation (operation 1435) corresponding to transmission of the key, the 3GPP ID, and the 3GPP pos to the UTM (AF) via the AMF/UDM and the PCF/NEF through the CP (operations 1431 to 1433) and transmission of the key, the app ID, the app time, and the app pos to the UTM (AF) via the UPF through the UP may be simultaneously or continuously performed using the common key generated by the UE (operation 1441) (operation 1443).

(3) In a third method, when the LCS is specified while the app ID and the app pos are transmitted through the application-level information in a CIoT optimization procedure, the method by which the AMF or the SMF generates a common key, transmits the key, the app ID, and the app pos to the UTM through an NIDD path via the NEF, and transmits the key, the 3GPP ID, and the 3GPP location to the UTM through a CP path can be used.

For example, LCS information may include the 3GPP ID and the 3GPP location.

As illustrated in FIG. 14, 3GPP combined info delivery may be performed. For example, when an LCS indication is added to a UP delivery NAS message for the NIDD, the AMF, the SMF, or another NF may generate a common key, and the 3GPP NW may insert the common key into the UP-based app ID and app pos and CP-LCS information, and transmit the same to the NEF.

As illustrated in FIG. 14, when the UAV/UAVC specifies the LCS while transmitting the app ID, the app pos, and the 3GPP ID through the NAS message (operation 1453), the AMF, the SMF, or another NF may generate a common key, and simultaneously or continuously transmit the key, the app ID, and the app pos to the UTM (AF) via the PCF/NEF (operation 1455) (operation 1457) and transmit the common key and LCS res. to the UTM (AF) via the PCF/NEF (operation 1471 to operation 1473) (operation 1475)

Figure 15:
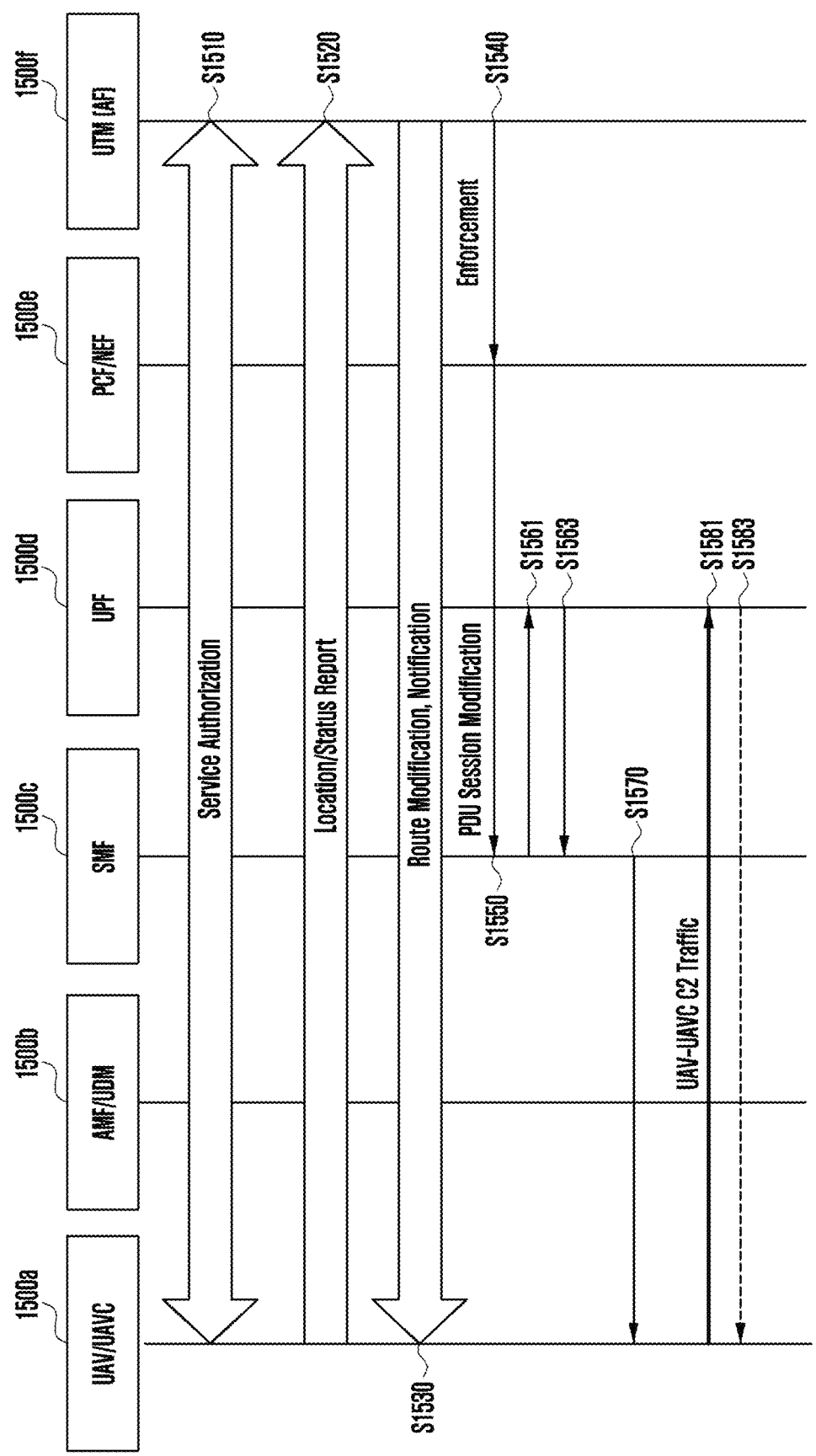
FIG. 15 illustrates a reinforcement process for applying regulation in a UAS service scenario according to various embodiments.

FIG. 15 illustrates a reinforcement process for applying regulation in a UAS service scenario according to various embodiments.

FIG. 15 illustrates a process of supporting the scenario of FIGS. 7A to 7C.

In operation 1510, the UAV may transmit additional UTM service authentications to the UTM through the UP.

After service authentication is completed, monitoring may be performed in operation 1520, and modification/notification may be performed in operation 1530.

In operation 1520, the UAV periodically monitors the location and the status and reports the same to the UTM.

For example, in order to make the location satisfy a live update condition, reports may be more frequently transmitted to the UTM during fast flight.

In operation 1530, the UTM may control the route of the UAV, or the connection through which the UTM notifies the UAVC of route modification may always be maintained, regardless of the command & control (C2) connection between the UAV and the UAVC.

The UTM may transmit the regulation result to the 3GPP NW through the CP.

The 3GPP NW may deactivate a PDU session of the C2 DN through the CP.

For example, when regulation is applied, a request from the UTM may deactivate a traffic path between the corresponding UAV and the corresponding UAVC via the NEF.

For example,

Area Control:
1) The UTM may trigger regulation of the UAS operation on the basis of a UAV position.
2) When regulation is triggered, the UTM may transmit a route modification or a route modification notification to the UAVC and transmit a route modification to the UAV
3) The UTM may perform takeover control and perform processes of not allowing UAV-UAVC traffic and transmitting a notification to the UAVC and a route modification to the UAV.

Untrusted Area Control:
1) When LCS information of the NW and a GPS of the UAV do not match, the UTM may not authorize (unauthorized) a UAS C2 DNN.
2) When LCS information of the NW and the GPS of the UAV do not match after the UAS C2 DNN authorization, a notification may be transmitted to the UAVC for a predetermined period.
3) When the limit is exceeded, the UTM may consider that the UAV is unauthorized and perform takeover control. For example, takeover control may include a process of not allowing UAV-UAVC traffic, transmitting a notification to the UAVC, and transmitting a route modification to the UAV.

For example, when the LCS information of the NW and the GPS of the UAV or the UAVC do not match (untrusted area control), the UTM may control the UAV to continuously move according to the LCS information until the GPS and the LCS match each other.

Figure 16:
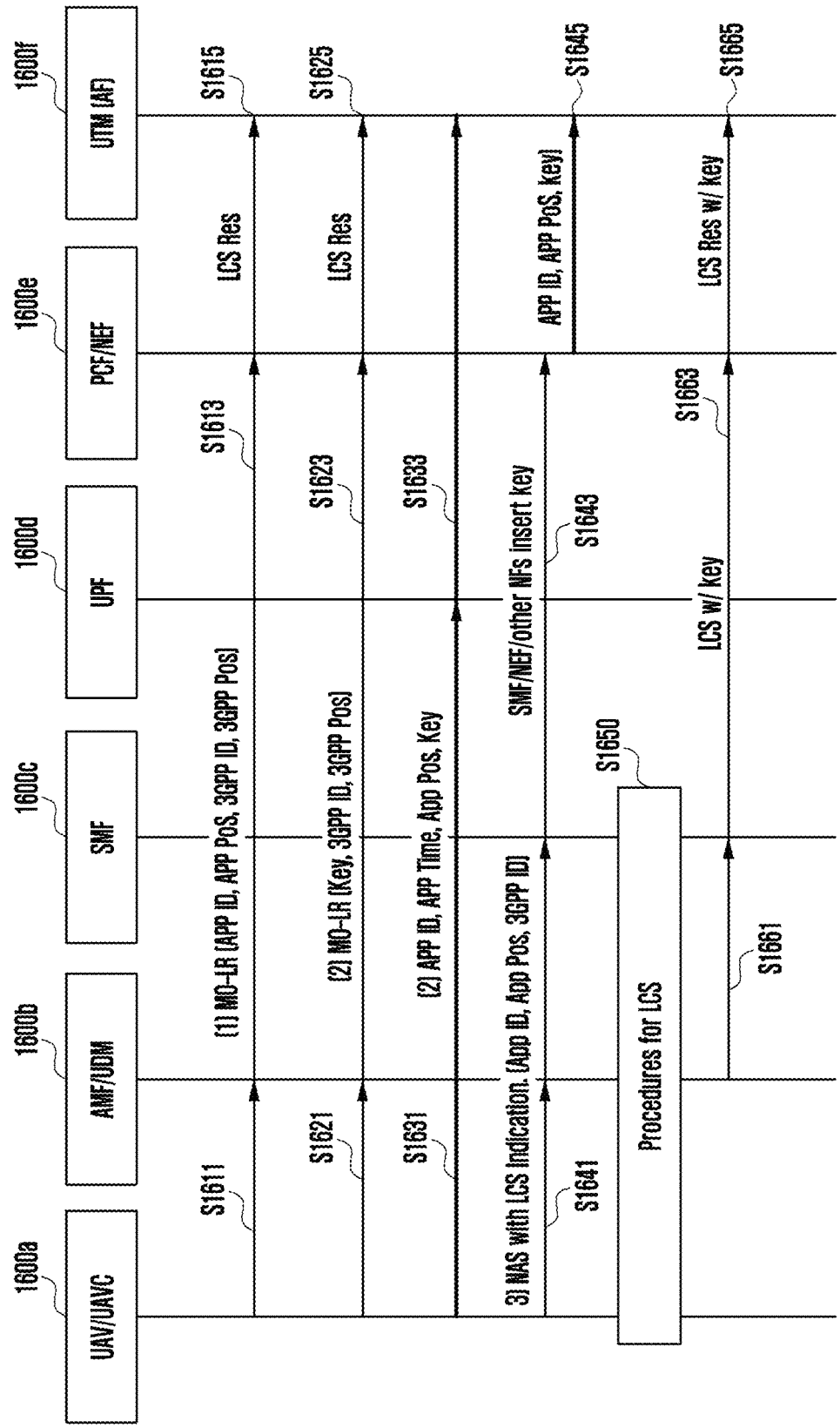
FIG. 16 illustrates a process of identifying the UAS location in a reinforcement process for applying regulation in a UAS service scenario according to various embodiments.

FIG. 16 illustrates a process of identifying the UAS location in a reinforcement process for applying regulation in a UAS service scenario according to various embodiments.

FIG. 16 illustrates a process of updating location information in the process of FIG. 15. To this end, the three methods below may be applied.

(1) In the first method, an app ID and an app pos, which are application-level information, may be directly added in a mobile-originated location request process of the CP.

As illustrated in FIG. 16, the 3GPP NW may transmit app info and 3GPP info to the UTM (AF).

The app info may include an app ID and an app loc (pos), and the 3GPP info may include a 3GPP ID and a 3DPP loc (pos).

For example, the UAV/UAVC may transmit the app ID, the app pos, the 3GPP ID, and the 3GPP pos to the UTM (AF) as LCS res. via the AMF/UDM (operation 1611) and the PCF/NEF (operation 1613) (operation 1615).

(2) In a second method, the method by which the app ID and the app pos, which are application-level information, and the 3GPP ID, which is 3GPP network-level information, are simultaneously or continuously transmitted through the UP and the CP on the basis of the common key generated by the UE can be used.

As illustrated in FIG. 16, the 3GPP NW may simultaneously transmit the app info and the 3GPP info through the CP and the UP (including an NIDD) and may use the key generated by the UE.

For example, the key (for example, app ID and app time) and the app loc may be transmitted through the UP, and the key (for example, app ID and app time), the 3GPP ID, and the 3GPP loc may be transmitted through the CP.

As illustrated in FIG. 16, the LCS res. operation (operation 1625) corresponding to transmission of the key, the 3GPP ID, and the 3GPP pos to the UTM (AF) via the AMF/UDM and the PCF/NEF through the CP (operations 1621 to 1623) and transmission of the key, the app ID, the app time, and the app pos to the UTM (AF) via the UPF through the UP (operation 1631) may be simultaneously or continuously performed using the common key generated by the UE (operation 1633).

(3) In a third method, when the LCS is specified while the app ID and the app pos are transmitted through the application-level information in a CIoT optimization procedure, the method by which the AMF or the SMF generates a common key, transmits the key, the app ID, and the app pos to the UTM through an NIDD path via the NEF, and transmits the key, the 3GPP ID, and the 3GPP location to the UTM through a CP path can be used.

For example, LCS information may include the 3GPP ID and the 3GPP location.

As illustrated in FIG. 16, 3GPP combined info delivery may be performed. For example, when an LCS indication is added to a UP delivery NAS message for the NIDD, the AMF, the SMF, or another NF may generate a common key, and the 3GPP NW may insert the common key into the UP-based app ID and app pos, and CP-LCS information, and transmit the same to the NEF.

As illustrated in FIG. 16, when the UAV/UAVC specifies the LCS while transmitting the app ID, the app pos, and the 3GPP ID through the NAS message (operation 1641), the AMF, the SMF, or another NF may generate a common key, and simultaneously or continuously transmit the key, the app ID, and the app pos to the UTM (AF) via the PCF/NEF (operation 1643) (operation 1645) and the common key and the LCS res. to the UTM (AF) via the PCF/NEF (operation 1663) (operation 1665).

Figure 17:
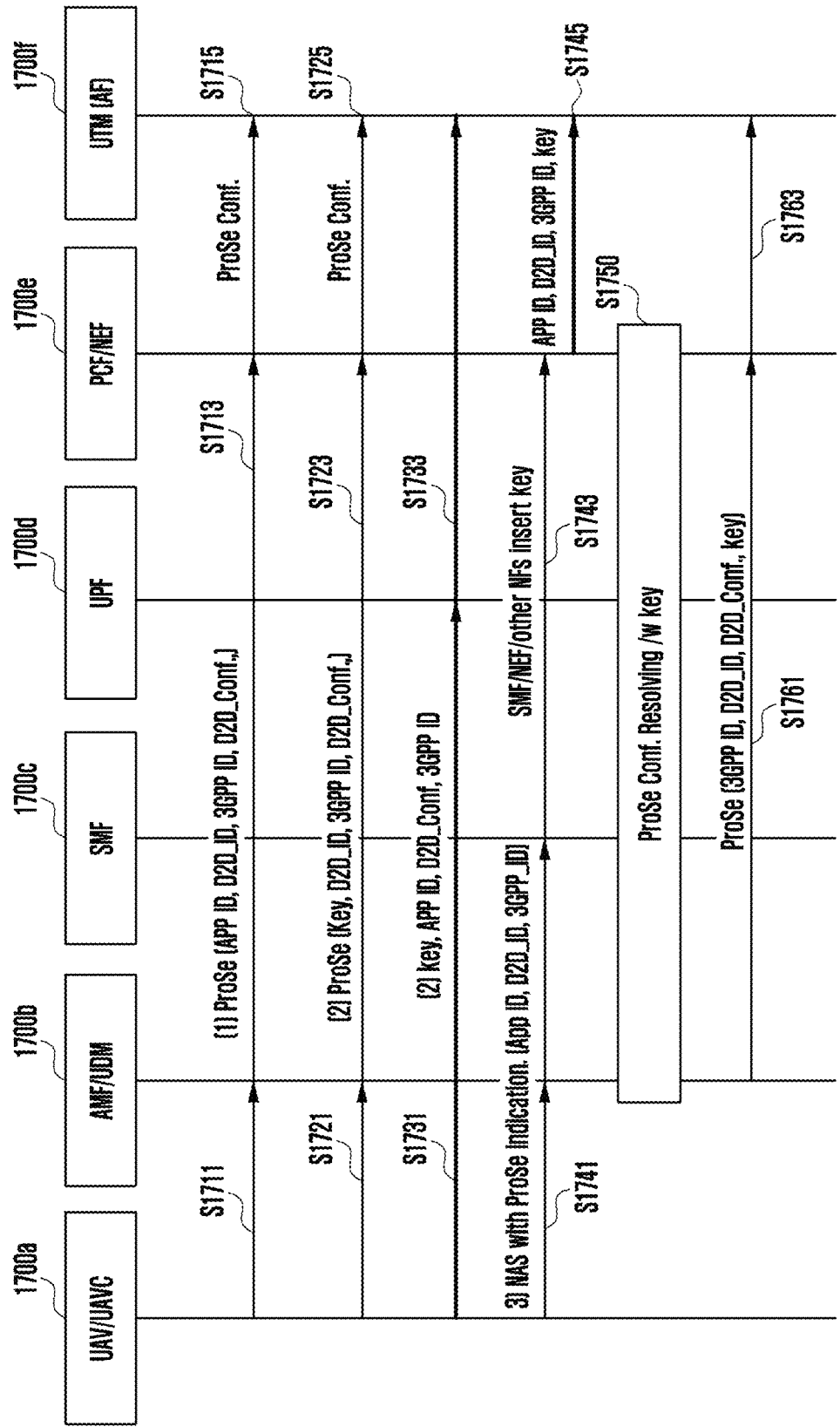
FIG. 17 illustrates a process of transmitting proximity-based service (ProSe) configuration information to the UTM for an ID broadcast and broadcast communication in a UAV service scenario according to various embodiments.

FIG. 17 illustrates a process of transmitting proximity-based service (ProSe) configuration information to the UTM for an ID broadcast and broadcast communication in a UAV service scenario according to various embodiments.

FIG. 17 illustrates a process of supporting the scenario of FIGS. 8A to 8B. The UTM is required to store a D2D_ID of the UE and D2D configuration, which can also be supported by three methods.

(1) In a first method, an app ID, which is application-level information, may be directly added in a ProSe configuration request process informing of a 3GPP ID, which is 3GPP network-level information, the D2D_ID, and D2D_Conf. Info.

As illustrated in FIG. 17, the 3GPP NW may transmit app info and 3GPP info to the UTM (AF). The app info may include the app ID, and the 3GPP info may include the 3GPP ID, the D2D_ID, and D2D_Conf.

For example, the UAV/UAVC may transmit the app ID, the D2D_ID, the 3GPP ID, and the D2D_Conf. to the UTM (AF) as ProSe configuration via the AMF/UDM (operation 1711) and the ProSe/NEF (operation 1713) (operation 1715).

(2) In a second method, the method by which the app ID, which is application-level information, the 3GPP ID, which is 3GPP network-level information, the D2D_ID, and the D2D_Conf. info are simultaneously or continuously transmitted through the UP and the CP on the basis of the common key generated by the UE can be used.

As illustrated in FIG. 17, the 3GPP NW may simultaneously transmit the app info and the 3GPP info through the CP and the UP (including an NIDD) and may use the key generated by the UE.

For example, the key (for example, app ID and app time) and the D2D_Conf. may be transmitted through the UP, and the key (for example, app ID and app time), the 3GPP ID, and the D2D_Conf. may be transmitted through the CP.

(3) In a third method, when the ProSe indication is specified while the app ID is transmitted through the application-level information in a CIoT 5GS optimization procedure, the AMF or the SMF generates a common key, transmits the key and the app ID to the UTM through an NIDD path via the NEF, and transmits the key, the 3GPP ID, the D2D_ID, and the D2S configuration to the UTM through a CP path.

As illustrated in FIG. 17, 3GPP combined info delivery may be performed.

For example, when the D2D indication is added to a UP delivery NAS message for the NIDD, the AMF, the SMF, the NEF, or another NF may generate a common key, and the 3GPP NW may insert the common key into the UP-based app ID, the CP-based 3GPP ID, D2D_ID, and D2D_Conf information, and transmit the same to the NEF.

As illustrated in FIG. 17, when the UAV/UAVC specifies ProSe while transmitting the app ID, the D2D_ID, and the 3GPP ID through the NAS message (operation 1741), the AMF, the SMF, or another NF may generate a common key and simultaneously or continuously transmit the key and the app ID to the UTM (AF) via the PCF/NEF (operation 1743) (operation 1745) and the common key, the 3GPP ID, the D2D_ID, and the D2D_Conf information to the UTM (AF) via the PCF/NEF (operation 1761) (operation 1763).

For example, it is necessary to transmit the D2D_ID to the UTM in operation 1745. The reason is that the UAS knows the D2D_ID and the 3GPP NW also knows the D2D_ID, and thus both the UAS and the 3GPP NW may transmit the same D2D_ID to the network device performing UTM, and the network device performing UTM may determine that the information is reliable. That is, the app may necessarily transmit the app ID and the D2D_ID to the network device performing UTM, and the 3GPP may necessarily transmit the 3GPP ID and the D2D_ID to the network device performing UTM.

That is, the correlation between the two transmissions may mean that binding between the app ID and the 3GPP ID may be determined to be reliable, a separate common key may be provided for the correlation, or the common key may be the 3GPP ID.

For example, in operation 1745, the app ID and the D2D_ID are necessary, and the 3GPP ID or the key is information for linking with CP-level information. When there is a key, the 3GPP ID may not exist. D2D information transmitted at the app level may be confirmed as 3GPP-level information. The 3GPP ID and the D2D_ID may be transmitted to the UTM using the app ID and the key alone, but confirmation of the UTM corresponding to the same/difference as/from that known by the application may be weaker.

Figure 18:
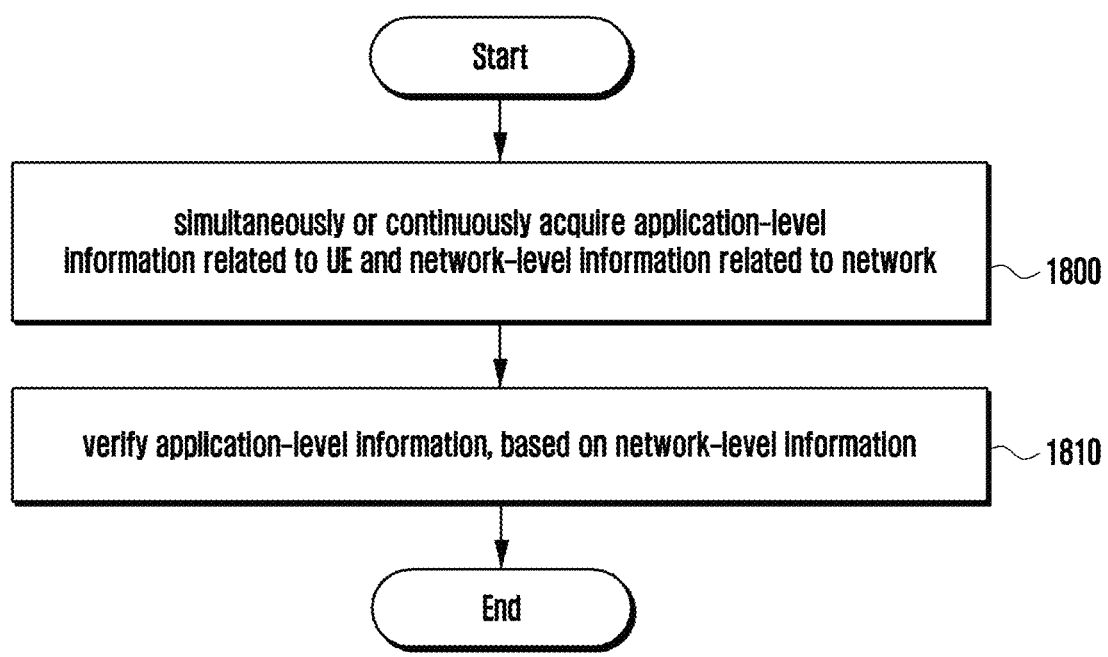
FIG. 18 is a flowchart illustrating a process of the network device performing an unmanned aerial system (UAS) traffic management (UTM) function in a wireless communication system according to various embodiments.

FIG. 18 is a flowchart illustrating a process of the network device performing an unmanned aerial system (UAS) traffic management (UTM) function in a wireless communication system according to various embodiments.

In operation 1800, the network device performing UTM may simultaneously or continuously acquire application-level information related to the UE and network-level information related to the network.

The network-level information may be received from the network device performing a network exposure function (NEF) included in the wireless communication system.

For example, the application-level information and the network-level information may be simultaneously received from the network device performing the NEF through a control plane (CP).

For example, the application-level information may be received along with a common key from the network device performing a user-plane function (UPF) or the network device performing the NEF through the user plane (UP), and the network-level information may be received along with the common key from the network device performing the NEF through the control plane (CP).

The common key according to various embodiments may be generated by the UE or the network device performing another NF included in the wireless communication system.

For example, the common key generated by the UE may be received along with the application-level information from the network device performing the UPF through the user plane (UP).

Further, the common key generated by the network device performing another NF may be received along with the application-level information from the network device performing the NEF through the user plane (UP).

In operation 1810, the network device performing UTM may verify the application-level information on the basis of the network-level information.

Figure 19:
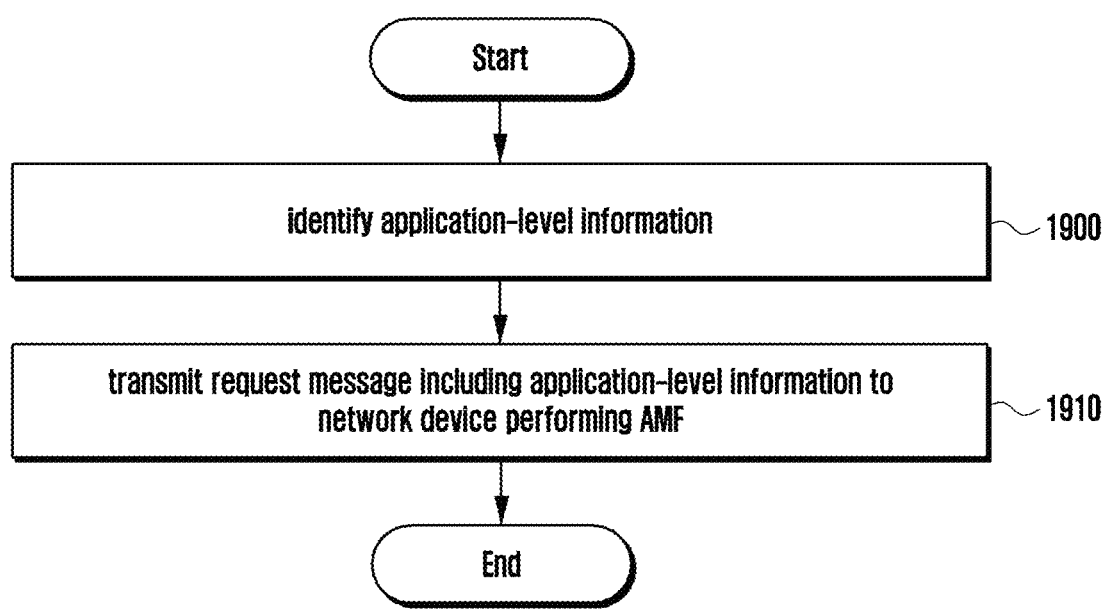
FIG. 19 is a flowchart illustrating a process in which the UE transmits unmanned aerial system (UAS) information in a wireless communication system.

FIG. 19 is a flowchart illustrating a process in which the UE transmits unmanned aerial system (UAS) information in a wireless communication system.

In operation 1900, the UE may identify application-level information.

In operation 1910, the UE may transmit a request message including the application-level information to the network device performing an access and mobility management function (AMF).

The request message according to various embodiments may include information making a request for network-level information, and may be transmitted through a control plane (CP).

The application-level information and the network-level information may be simultaneously or continuously acquired from the network device performing a UAS traffic management (UTM) function included in the wireless communication system.

The application-level information and the network-level information may be simultaneously transmitted from the network device performing a network exposure function (NEF) included in the wireless communication system to the network device performing the UAS traffic management (UTM) function through the control plane (CP) on the basis of the request message.

A common key may be generated by the network device performing the AMF on the basis of the request message. In this case, the common key and the application-level information may be transmitted from the network device performing the network exposure function (NEF) included in the wireless communication system to the network device performing the UAS traffic management (UTM) function through the user plane (UP), and the key and the network-level information may be transmitted from the network device performing the NEF to the UTM through the control plane (CP).

Figure 20:
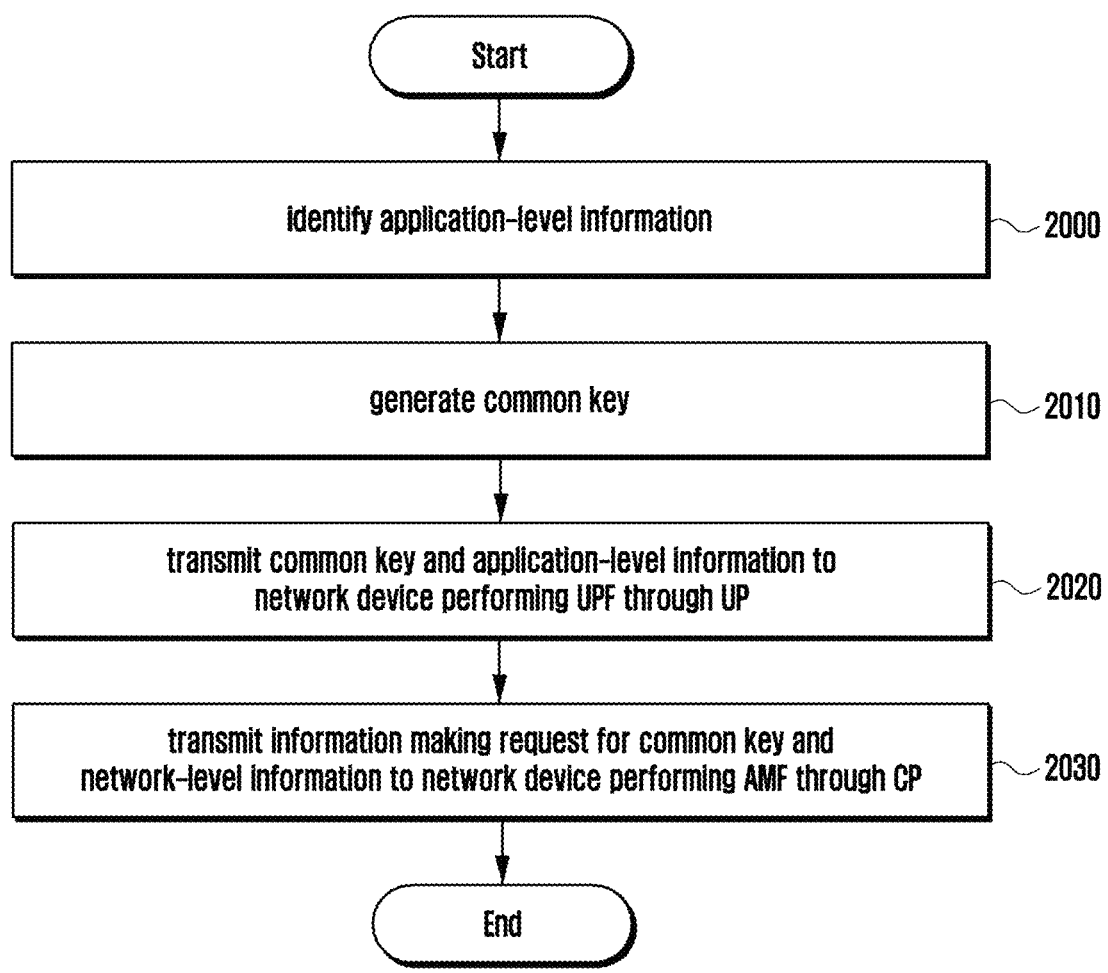
FIG. 20 is a flowchart illustrating a process in which the UE transmits unmanned aerial system (UAS) information in a wireless communication system.

FIG. 20 is a flowchart illustrating a process in which the UE transmits unmanned aerial system (UAS) information in a wireless communication system.

In operation 2000, the UE may identify application-level information.

In operation 2010, the UE may generate a common key.

In operation 2020, the UE may transmit the common key and the application-level information to the network device performing a user-plane function (UPF) through a user plane (UP).

The common key and the application-level information may be transmitted to the network device performing the UAS traffic management (UTM) function from the user-plane function (UPF) through a user plane (UP).

In operation 2030, the UE may transmit information making a request for the common key and the network-level information to the network device performing the access and mobility management function (AMF) through the control plane (CP).

The common key and the network-level information may be transmitted from the network device performing the network exposure function (NEF) included in the wireless communication system to the network device performing the UAS traffic management (UTM) function through the control plane (CP) on the basis of the information.

Figure 21:
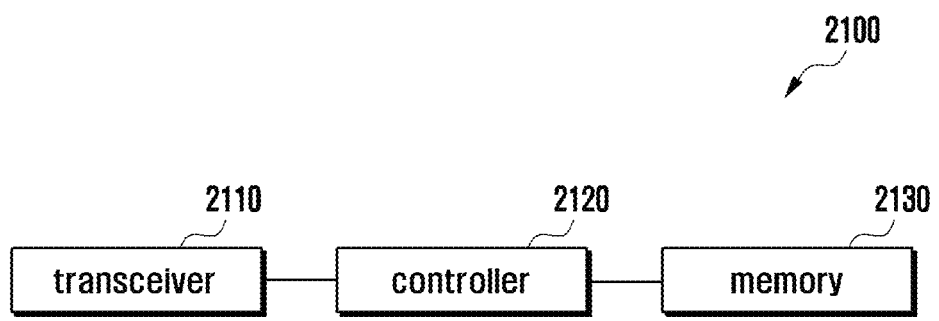
FIG. 21 is a block diagram illustrating a network device performing a UAS traffic management (UTM) function according to various embodiments.

FIG. 21 is a block diagram illustrating a network device 2100 performing a UAS traffic management (UTM) function according to various embodiments.

As illustrated in FIG. 21, the network device performing the UTM according to various embodiments may include a transceiver 2110, a controller 2120, and a storage unit 2130 (e.g., memory). In the disclosure, the controller 2120 may be defined as a circuit, an application-specific integrated circuit, or at least one processor.

Hereinafter, the elements will be sequentially described.

The transceiver 2110 according to various embodiments may transmit and receive signals, information, and data according to various embodiments to and from another network entity.

The transceiver 2110 according to various embodiments may receive application-level information or 3GPP network-level information from a network entity and receive a common key generated by the UE or the network entity.

Further, the transceiver 2110 may receive a message related to ID broadcast/broadcast communication from the network entity through authorization/regulation/local broadcast in a UAS service scenario.

For example, the transceiver 2110 may receive network-level information from the network device performing a network exposure function (NEF) included in the wireless communication system from the network device.

The transceiver 2110 may simultaneously receive the application-level information and the network-level information from the network device performing the NEF through a control plane (CP).

A common key may be generated by the UE or the network device performing another NF included in the wireless communication system.

In this case, the transceiver 2110 may receive the application-level information and the common key generated by the user device from the network device performing a user-plane function (UPF) through a user plane (UP).

Further, the transceiver 2110 may receive the application-level information and the common key generated by the network device performing the NF from the network device performing the NEF through the user plane (UP).

In addition, the transceiver 2110 may receive the network-level information and the common key from the network device performing the NEF through the control plane (CP).

The controller 2120 according to various embodiments may control the overall operation of the network device performing UTM according to various embodiments, provided by the disclosure.

For example, the controller 2120 may control signal flow between blocks to perform the operations according to the above-described flowchart.

At least one controller 2120 according to various embodiments may simultaneously or continuously acquire application-level information related to the UE and network-level information related to the network.

At least one controller 2120 according to various embodiments may verify the application-level information on the basis of the network-level information.

The memory 2130 according to various embodiments may store at least one piece of information transmitted and received through the transceiver 2110 and information generated through the controller 2120. For example, the memory 2130 provides identification of the UAS, tracking of the UAS, authorization, enforcement, and regulation of the operation of the UAS, and store information required for the operation of the UAS. Further, the memory 2130 may store a D2D_ID, an application-level ID, a GPSI, an IP addr, or an NIDD ID.

For example, the memory 2130 may include a memory, and may store data such as a basic program, an application, and configuration information for the operation of the network device performing UTM according to various embodiments. Further, the memory may include at least one type of storage medium among a flash memory type, a hard-disk type, a multimedia card micro type, a card-type memory (for example, an SD memory, an XD memory or the like), a magnetic memory, a magnetic disk, an optical disk, a random access memory (RAM), a static RAM (SRAM), a read-only memory (ROM), a programmable read-only memory (PROM), and an electrically erasable programmable ROM (EEPROM). The processor may perform various operations using a variety of programs, content, and data stored in the memory.

Although not illustrated, each network entity according to an embodiment may also include at least one of a transceiver, a controller, or a memory.

Figure 22:
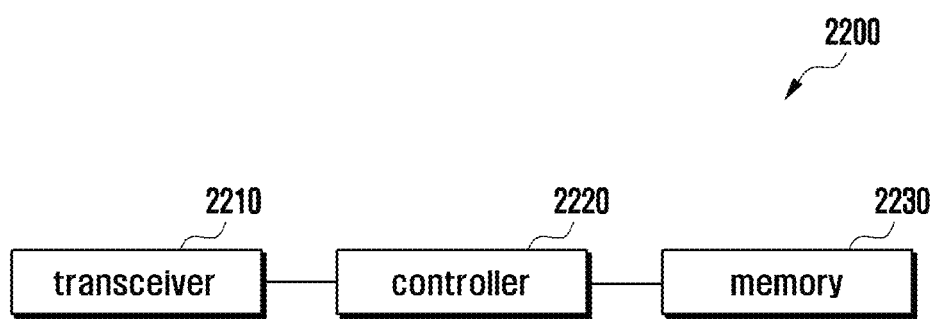
FIG. 22 is a block diagram illustrating a user equipment (UE) according to various embodiments.

FIG. 22 is a block diagram illustrating a user equipment (UE) according to various embodiments.

The UE may include an unmanned aerial vehicle (UAV) or a UAV controller (UAVC).

As illustrated in FIG. 22, a UE 2200 according to various embodiments may include a transceiver 2210, a controller 2220, and a memory 2230. In the disclosure, the controller 2220 may be defined as a circuit, an application-specific integrated circuit, or at least one processor.

Hereinafter, the elements will be sequentially described.

The transceiver 2210 according to various embodiments may transmit and receive signals, information, and data according to various embodiments to and from another network entity.

The transceiver 2210 according to various embodiments may transmit application-level information or 3GPP network-level information to a network entity, and may transmit a common key generated by the UE.

Further, the transceiver 2210 may transmit a message related to ID broadcast/broadcast communication to the network entity through authorization/regulation/local broadcast in a UAS service scenario.

The controller 2220 according to various embodiments may control the overall operation of the UE according to various embodiments provided by the disclosure.

For example, the controller 2220 may control signal flow between blocks to perform the operations according to the above-described flowchart.

The controller 2220 according to various embodiments may identify application-level information.

The controller 2220 according to various embodiments may perform control to transmit a request message including the application-level information to the network device performing an access and mobility management function (AMF).

In this case, the request message may include information making a request for network-level information, and may be transmitted through a control plane (CP).

The application-level information and the network-level information according to various embodiments may be simultaneously or continuously acquired by the network device performing an unmanned aerial system (UAS) traffic management (UTM) function included in the wireless communication system.

For example, the application-level information and the network-level information may be simultaneously transmitted from the network device performing a network exposure function (NEF) included in the wireless communication system to the network device performing the UAS traffic management (UTM) function through the control plane (CP) on the basis of the request message.

For example, a common key may be generated by the network device performing the AMF on the basis of the request message. In this case, the common key and the application-level information may be transmitted from the network device performing the network exposure function (NEF) included in the wireless communication system to the network device performing the UAS traffic management (UTM) function through the user plane (UP), and the key and the network-level information may be transmitted from the network device performing the NEF to the network device performing the UTM through the control plane (CP).

The controller 2220 according to various embodiments may generate a common key.

The controller 2220 according to various embodiments may perform control to transmit the common key and the application-level information to the network device performing a user-plane function (UPF) through the user plane (UP). In this case, the common key and the application-level information may be transmitted to the network device performing the UAS traffic management (UTM) function from the user-plane function (UPF) through the user plane (UP).

The controller 2220 according to various embodiments may control the transceiver 2210 to transmit information making a request for the common key and the network-level information to the network device performing the access and mobility management function (AMF) through the control plane (CP). In this case, the common key and the network-level information may be transmitted from the network device performing the network exposure function (NEF) included in the wireless communication system to the network device performing the UAS traffic management (UTM) function through the control plane (CP) on the basis of the information.

The memory 2230 according to various embodiments may store at least one piece of information transmitted and received through the transceiver 2210 and information generated through the controller 2220.

For example, the memory 2230 may store data such as a basic program, an application, and configuration information for the operation of the UE according to various embodiments. Further, the memory may include at least one type of storage medium among a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). The processor may perform various operations using a variety of programs, content, and data stored in the memory.

Methods according to embodiments stated in the claims or specifications of the disclosure may be implemented in hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to perform methods according to embodiments stated in the claims or specifications of the disclosure.

The programs (software modules or software) may be stored in nonvolatile memory including random access memory, flash memory, read-only memory (ROM), electrically erasable programmable read-only memory (EEPROM), a magnetic disc storage device, a compact disc ROM (CD-ROM), digital versatile discs (DVDs), other types of optical storage devices, or a magnetic cassette. Alternatively, the programs may be stored in a memory configured by a combination of some or all of the listed components. Further, the number of configured memories may be plural.

In addition, the programs may be stored in an attachable storage device which may access the electronic device through communication networks such as the Internet, an Intranet, a local area network (LAN), wireless LAN (WLAN), and a storage area network (SAN) or a combination thereof. The storage device may access a device implementing embodiments through an external port. Further, a separate storage device in a communication network may access the device implementing embodiments.

In the above-described detailed embodiments, the number of elements included in the disclosure is expressed in the singular or the plural according to the presented detailed embodiment. However, the singular form or plural form is selected for suitability of description of the presented situation, and various embodiments are not limited to a single element or multiple elements thereof. Further, either multiple elements expressed in the description may be configured into a single element, or a single element in the description may be configured into multiple elements.

Meanwhile, although the concrete embodiments of the disclosure have been described in the detailed description of the disclosure, various modifications can be made without departing from the scope of the disclosure. Therefore, the scope of the disclosure should not be defined as being limited to the embodiments, but should be defined by the appended claims and equivalents thereof.

It should be understood that the disclosure is not intended to be limited to various embodiments and terms used herein, but includes various modifications, equivalents, and/or alternatives of the corresponding embodiments. In describing the drawings, similar reference numerals may be used to designate similar elements. A singular expression may include a plural expression unless they are definitely different in context. In the disclosure, the expression "A or B", "at least one of A and/or B", "A, B, or C", or "at least one of A, B, and/or C" may include all available combinations of the listed items. The expression "first" or "second" may modify the corresponding element regardless of the order or importance thereof, and is used only to distinguish one component from another component, rather than to limit the corresponding component. When it is stated that any (for example, a first) component is "(functionally or communicatively) coupled" or "connected" to another (for example, a second)

component, the component may be directly coupled to the other component, or may be connected through yet another component (for example, a third component).

The term "module" used in the disclosure may include a unit including hardware, software, or firmware, and may be compatible with terms such as "logic", "logical block", "component", or "circuit". The module may be an integral component, a minimum unit performing one or more functions, or a part thereof. For example, the module may be implemented as an application-specific integrated circuit (ASIC).

Various embodiments of the disclosure may be embodied by software (for example, a program) including instructions stored in a machine-readable (for example, computer-readable) storage medium (for example, internal memory or external memory). The device may load the stored instructions from the storage medium and may operate according to the loaded instructions, and may include an auxiliary BS or a UE according to various embodiments. When the instructions are executed by a processor (for example, the controller 2120 or 2220 of FIG. 21 or 22), the processor may directly perform a function corresponding to the instructions, or the function may be performed through other components under the control of the processor. The instructions may include code generated or executed by a complier or an interpreter.

The machine-readable storage medium may be provided in the form of a nonvolatile storage medium. The term "nonvolatile" means that the storage medium does not include a signal and is tangible, but does not include distinguishing between semi-permanent storage and temporary storage of data in the storage medium.

The method according to various embodiments may be provided in the state of being included in a computer program product. The computer program product may be traded as a product between a seller and a buyer. The computer program product may be distributed in the form of a machine-readable storage medium (for example, a compact disc read-only memory (CD-ROM)) or online through an application store (for example, Play Store™). In the case of online distribution, at least some of the computer program products may be at least temporarily stored in a storage medium such as a memory of a server of a manufacturer server, a server of an application store, or a relay server, or may be temporarily generated.

Each of the components (for example, a module or a program) according to various embodiments may be configured as a single entity or a plurality thereof, and some of the corresponding sub components may be omitted, or other sub components may be further included in various embodiments. Alternatively or additionally, some components (for example, a module or a program) may be integrated into one entity and equally or similarly perform the function performed by the corresponding components before the integration. Operations performed by a module, a program, or other elements according to various embodiments may be executed sequentially, in parallel, repeatedly, or in a heuristic manner. At least some operations may be executed according to another sequence, may be omitted, or may further include other operations.

The methods according to various embodiments described with reference to FIGS. 1 to 22 may include methods performed through a combination of one or more of the figures according to various implementations.

For example, FIGS. 1 to 22 illustrate operations related to a method of transmitting and receiving application-level information or 3GPP network-level information, and may include methods that combine one or more figures according to various implementations.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) entity in a wireless communication system, the method comprising:
    receiving, from a user equipment (UE), a registration request message including an identification (ID) of an unmanned aerial vehicle (UAV), the UE being the UAV or an UAV controller (UAVC) related to the UAV;
    receiving, from an unified data management (UDM) a subscription data of the UE;
    performing an authentication for the UAV; and
    determining whether an unmanned aircraft system (UAS) traffic management (UTM) service supplier (USS) UAV authorization/authentication mobility management (UUAA-MM) for the UAV is required in case that the UE has a valid aerial subscription information, or the UE has provided the ID of the UAV.

2. A method performed by an unmanned aerial system-network function (UAS-NF) entity in a wireless communication system, the method comprising:
    receiving, from an access and mobility management function (AMF) entity, an authentication request message including a generic public subscription identifier (GPSI) and unmanned aerial vehicle (UAV) identification (ID); and
    transmitting, to an unmanned aircraft systems traffic management (UTM) entity, the authentication request message including the GPSI and UAV ID.

3. The method of claim 2, wherein the authentication request message further includes user location information.

4. The method of claim 3, wherein the user location information is cell ID.

5. A method performed by an authorization for a network exposure function (NEF) entity in a wireless communication system, the method comprising:
    receiving, from a session management function (SMF) an authentication request message including service level information; and
    transmitting, to an unmanned aerial system (UAS) entity, the authentication request message.

6. The method of claim 5, wherein the service level information is an unmanned aerial vehicle (UAV) identification (ID) of an UAV.

7. A method performed by an authorization for a session management function (SMF) entity in a wireless communication system, the method comprising:
    receiving, from an unmanned aerial vehicle (UAV), an authentication request message including an UAV ID and information related to a command and control (C2) communication;
    performing an authentication procedure for an unmanned aircraft systems traffic management (UTM) entity and the UAV; and
    receiving, from the UTM entity, authorization information for the C2 communication including an IP address of a UAV controller (UAVC).

8. The method of claim 7, wherein the information related to the C2 communication includes flight authorization information.

9. The method of claim 7, wherein the authentication request message further includes unmanned aerial system (UAS) information,
  wherein the UAS information includes a cell ID indicating a location of the UAV.

10. A method performed by a session management function (SMF) entity in a wireless communication system, the method comprising:
  receiving, from a terminal, a request message for a command and control (C2) communication including an unmanned aerial vehicle (UAV) identification (ID);
  transmitting, to an unmanned aircraft systems traffic management (UTM) entity, an authentication request message including an address of an UAV; and
  receiving, from the UTM entity, authorization information for the C2 communication including an IP address of an UAV controller (UAVC).

11. The method of claim 10, wherein the UAV address is an IP address of the UAV.

12. The method of claim 10, wherein the authorization information further includes location information of the UAV,
  wherein the location information of the UAV is a cell ID.

* * * * *